US011220581B2

(12) United States Patent
Almohsin et al.

(10) Patent No.: US 11,220,581 B2
(45) Date of Patent: Jan. 11, 2022

(54) POLYMER GEL WITH CROSSLINKER AND FILLER

(71) Applicant: Saudi Arabian Oil Company, Dhahran (SA)

(72) Inventors: Ayman Mohammed Almohsin, Doha (SA); Edreese Alsharaeh, Riyadh (SA)

(73) Assignee: Saudi Arabian Oil Company, Dhahran (SA)

( * ) Notice: Subject to any disclaimer, the term of this patent is extended or adjusted under 35 U.S.C. 154(b) by 227 days.

(21) Appl. No.: 16/674,638

(22) Filed: Nov. 5, 2019

(65) Prior Publication Data
US 2021/0130555 A1    May 6, 2021

(51) Int. Cl.
| | | |
|---|---|---|
| C08L 33/26 | (2006.01) | |
| C08J 3/075 | (2006.01) | |
| C08J 3/24 | (2006.01) | |
| C08K 3/22 | (2006.01) | |
| C08K 3/04 | (2006.01) | |
| C08K 5/17 | (2006.01) | |
| C08K 5/08 | (2006.01) | |
| C08K 5/00 | (2006.01) | |

(52) U.S. Cl.
CPC ............... *C08J 3/075* (2013.01); *C08J 3/24* (2013.01); *C08K 3/042* (2017.05); *C08K 3/22* (2013.01); *C08K 5/08* (2013.01); *C08K 5/17* (2013.01); *C08L 33/26* (2013.01); *C08J 2333/26* (2013.01); *C08K 5/0025* (2013.01); *C08K 2003/2244* (2013.01); *C08K 2201/005* (2013.01)

(58) Field of Classification Search
CPC ... C08J 3/075; C08J 3/24; C08L 33/26; C08K 3/22; C08K 3/042; C08K 5/0025; C08K 5/08; C08K 2003/2244; C08K 5/17
See application file for complete search history.

(56) References Cited

U.S. PATENT DOCUMENTS

| | | | | |
|---|---|---|---|---|
| 5,617,920 A * | 4/1997 | Dovan | ............... | B01J 13/0065 166/295 |
| 8,557,916 B1 | 10/2013 | Alsharaeh et al. | | |
| 9,475,981 B2 * | 10/2016 | Abivin | ............... | C09K 8/706 |
| 10,774,211 B2 * | 9/2020 | Almohsin | ............... | C08L 33/26 |
| 10,920,063 B2 * | 2/2021 | Almohsin | ............... | C08K 3/04 |
| 11,015,050 B2 * | 5/2021 | Almohsin | ............... | C08K 3/22 |
| 2004/0154799 A1 | 8/2004 | Powell | | |
| 2009/0221453 A1 | 9/2009 | Mukhopadhyay et al. | | |
| 2010/0055458 A1 | 3/2010 | Jang et al. | | |
| 2013/0149211 A1 | 6/2013 | Bielawski et al. | | |
| 2016/0344035 A1 | 11/2016 | Zhamu et al. | | |
| 2019/0214647 A1 * | 7/2019 | Arsalan | ............... | H01M 4/587 |

FOREIGN PATENT DOCUMENTS

| | | | | |
|---|---|---|---|---|
| EP | 3331964 | | 6/2018 | |
| EP | 3331964 A1 * | | 6/2018 | ............. C09K 8/887 |
| WO | WO 2019075314 | | 4/2019 | |
| WO | WO-2019075314 A1 * | | 4/2019 | ........... C09K 8/5045 |

OTHER PUBLICATIONS

PCT Invitation to Pay Additional Fees and, Where Applicable, Protest Fees, issued in International Application No. PCT/US2018/055590 on Dec. 18, 2018, 13 pages.
International Search Report and Written Opinion issued in International Application No. PCT/US2018/055590 dated Mar. 8, 2019, 21 pages.
Al-Muntasheri et al., "Investigation of a High Temperature Organic Water Shutoff Gel: Reaction Mechanisms," SPE 97530, presented at the SPE International Improved Oil Recovery Conference, Dec. 5-6, 2005, 9 pages.
Alsharaeh et al., "Evaluation of nanomechanical properties of (styrene-methyl methacrylate) copolymer composites containing graphene sheets," Industrial & Engineering Chemistry Research, Nov. 2013, 11 pages.
Alsharaeh et al., "Microwave Irradiation Effect on the Dispersion and Thermal Stability of RGO Nanosheets within a Polystyrene Matrix," Materials vol. 7, Issue 7, Jul. 2014, 23 pages.
Chen et al., "Polyacrylamide and its derivatives for oil recovery," Dissertation for the degree of Doctor of Philosophy, Missouri University of Science and Technology, Fall 2016, 226 pages.
Dovan et al., "Delaying Geletion of Aqueous Polymers at Elevated Temperatures Using Novel Organic Crosslinkers," SPE-37246-MS, Society of Petroleum Engineers, presented at the International Symposium on Oilfield Chemistry, Feb. 18-21, 1997, 11 pages.
Khan et al., "Graphene based metal and metal oxide nanocomposites: synthesis, properties and their applications," Journal of Materials Chemistry A, vol. 3, No. 37, Jan. 1, 2015, 57 pages.
Kumar et al., "Nanostructured zirconia decorated reduced graphene oxide based efficient biosensing platform for non-invasive oral cancer detection," Biosensors and Bioelectronics, vol. 78, Apr. 1, 2016, 8 pages.
Li et al., "Fabrication and properties of machinable 3Y-Zr0"2/BN nanocomposites," Materials Science and Engineering: A, Elsevier, Amsterdam, vol. 397, No. 1-2, Apr. 25, 2005, 6 pages.
Liu et al., "Microwave-assisted synthesis of TiO2-reduced graphene oxide composites for the photocatalytic reduction of Cr(vi)," RSC Advances, vol. 1, No. 7, Jan. 1, 2011, 5 pages.
Liu et al., "Photolatently modulable hydrogels using unilamellar titania nanosheets as photocatalytic crosslinkers," Nature Communications, vol. 4, No. 1, Jun. 18, 2013, 7 pages.

(Continued)

*Primary Examiner* — Robert D Harlan
(74) *Attorney, Agent, or Firm* — Fish & Richardson P.C.

(57) ABSTRACT

An aqueous dispersion includes polyacrylamide, a crosslinker, and a filler. The crosslinker includes at least one of hydroquinone or hexamethylenetetramine. The filler includes at least one of a metal oxide or a nanomaterial. The metal oxide includes at least one of zirconium oxide, zirconium hydroxide, or titanium oxide. The nanomaterial includes at least one of graphene, graphene oxide, or boron nitride. In some cases, the filler is a nanocomposite of the metal oxide and the nanomaterial.

18 Claims, 45 Drawing Sheets

(56) References Cited

OTHER PUBLICATIONS

Liu et al., "Tough and highly stretchable graphene oxide/polyacrylamide nanocomosite hydrogels," Journal of Materials Chemistry, vol. 22, No. 28, Jan. 1, 2012, 8 pages.

Mahdavi et al., "Polyacrylamide/reduced graphene oxide-Ag nanocomposite as highly efficient antibacterial transparent film," Iranian Chemical Society, Journal, vol. 14, No. 1, Aug. 6, 2016, 10 pages.

Michael et al., "Enhanced Polyacrylamide Polymer Gels using Zirconium Hydroxide Nanoparticles from Water Shutoff at High Temperatures: The Thermal and Rheological Investigations," Ind. Eng. Chem, Res., vol. 57, No. 48, Nov. 6, 2018, 27 pages.

Mordina et al., "Impact of graphene oxide on the magnetorheological behaviour of BaFe12019nanoparticles filled polyacrylamide hydrogel," Polymer, Elsevier Science Publishers B.V., GB, vol. 97, May 11, 2016, 15 pages.

Shan et al., "Graphene oxide enhanced polyacrylamide-alginate aerogels catalysts," Carbohydrate Polymers, vol. 203, Jan. 1, 2019, 26 pages.

Song et al., "Plasma-induced grafting polyacrylamide on graphene oxide nanosheets for simultaneous removal of radionuclides," Physical Chemistry Chemical Physics (RSC Publishing), Jan. 1, 2015, 24 pages.

Stengl et al., "h-BN-TiO 2 Nanocomposite for Photocatalytic Applications," Journal of Nanomaterials, vol. 2016, Jan. 1, 2016, 12 pages.

Taha and Lee, "Nano Graphene Application Improving Drilling Fluids and performance," IPTC 18539-MS, presented at the International petroleum Technology Conference, Dec. 6-9, 2015, 16 pages.

Tongwa et al., "Evaluation of a Nanocomposite Hydrogel for Water Shut-Off in Enhanced Oil Recovery Applications: Design, Synthesis and Characterization," Journal of Applied Polymer Science, Jul. 17, 2012, 8 pages.

Zhang et al., "Engineering the Unique 2D Mat of Graphene to Achieve Graphene-TiO 2 Nanocomposite for Photocatalytic Selective Transformation: What Advantage does Graphene Have over Its Forebear Carbon Nanotube?" ACS NANO, vol. 5, No. 9, Sep. 27, 2011, 10 pages.

Zhang et al., "TiO 2-Graphene Nanocomposites for Gas-Phase Photocatalyptic Degradation of Volatile Aromatic Pollutant: Is TiO 2-Graphene Turley Different from Other TiO 2-Carbon Composite Materials?" ACS NANO, vol. 4, No. 12, Dec. 28, 2010, 12 pages.

Zhou et al., "Preparation of a reduced graphene oxide/zirconia nanocomposite and its application as a novel lubricant oil additive," RSC Advances, vol. 5, No. 111, Jan. 1, 2015, 11 pages.

Zolfaghari et al., "Preparation and Characterization of Nanocomposite Hydrogels Based on polyacrylamide for Enhanced Oil Recovery Applications," Feb. 17, 2006, 8 pages.

PCT International Search Report and Written Opinion in International Appln. No. PCT/US2020/059038, dated Feb. 19, 2021, 13 pages.

\* cited by examiner

PAM

PAM-Zr(OH)$_4$

PAM

PAM-Zr(OH)$_4$

PAM

PAM-ZrO$_2$

PAM

PAM-ZrG5

PAM

PAM-ZrG5

PAM

PAM-ZrO$_2$-rGO

PAM 1 wt. %

PAM 2 wt. %

PAM 4 wt. %

POLYMER GEL WITH CROSSLINKER AND FILLER

TECHNICAL FIELD

This disclosure relates to a polymer gel for well operations.

BACKGROUND

Excess water production can limit the lifetime of an oil or gas well, and poses technical, economical, and environmental challenges. Water production is also a factor in oil and gas field damage mechanisms including as scale deposition, corrosion, sand production, and mineral dissolution.

SUMMARY

In a first general aspect, an aqueous dispersion includes polyacrylamide, a crosslinker, and a filler. The crosslinker includes at least one of hydroquinone or hexamethylenetetramine. The filler includes a metal oxide. The metal oxide is selected from the group consisting of zirconium oxide, zirconium hydroxide, and titanium oxide.

In a second general aspect, an aqueous dispersion includes polyacrylamide, a crosslinker, and a filler. The crosslinker includes at least one of hydroquinone or hexamethylenetetramine. The filler includes a two-dimensional (2D) nanosheet. The 2D nanosheet includes at least one of graphene, graphene oxide, or boron nitride.

In a third general aspect, an aqueous dispersion includes polyacrylamide, a crosslinker, and a filler. The crosslinker includes at least one of hydroquinone or hexamethylenetetramine. The filler includes a metal oxide and a nanomaterial. The metal oxide is selected from the group consisting of zirconium oxide, zirconium hydroxide, and titanium oxide. The nanomaterial is selected from the group consisting of graphene, graphene oxide, and boron nitride.

Implementations of the first, second, and third general aspects may include one or more of the following features.

In some implementations, a weight concentration of the filler is in a range of from about 0.1 weight percent (wt. %) to about 1 wt. %. In some implementations, the weight concentration of the filler is in a range of from about 0.1 wt. % to about 0.5 wt. %.

In some implementations, a weight concentration of the polyacrylamide is in a range of from about 0.5 wt. % to about 6 wt. %, and a weight concentration of the crosslinker is in a range of from about 0.1 wt. % to about 1 wt. %.

In some implementations, the crosslinker includes hydroquinone and hexamethylenetetramine, and a weight ratio of hydroquinone to hexamethylenetetramine is in a range of from about 1:2 to about 1:1.

In some implementations, the filler includes a mixture of the metal oxide and the nanomaterial. For example, the filler can be a mixture of zirconium hydroxide and graphene oxide. A weight concentration of the metal oxide in the aqueous dispersion can be in a range of from about 0.1 wt. % to about 1 wt. %, and a weight concentration of the nanomaterial in the aqueous dispersion can be in a range of from about 0.01 wt. % to about 0.1 wt. %.

In some implementations, the filler is a nanocomposite of zirconium hydroxide and graphene oxide.

In some implementations, the filler is a nanocomposite of zirconium oxide and graphene oxide.

The details of one or more implementations of the subject matter of this specification are set forth in the accompanying drawings, the Detailed Description, and the claims. Other features, aspects, and advantages of the subject matter will become apparent from the Detailed Description, the claims, and the accompanying drawings.

DETAILED DESCRIPTION

When water production from an oil well exceeds a certain limit, oil production from that field can become uneconomical. In such a case, an enhanced oil recovery (EOR) method can be implemented to reduce the water cut to economically acceptable levels. Water can also be responsible for many oilfield related issues. For example, water can cause corrosion and scale. In some cases, produced water necessitates the construction of water handling facilities. Processes to handle produced water can include lifting the excess water with the oil from the producing well, separating water from oil and gas in a gas oil separation plant (GOSP), de-oiling the water and filtering suspended solids from the water, and pumping the water into water injection or disposal wells.

Polymer gels, due to their versatile nature, can be suitable for reducing water production from oil and gas fields. Treatments utilizing polymer gels are often called water shut-off improvement treatments (WSITs). Depending on the type of the crosslinker used, polymer gels can be classified as inorganically crosslinked or organically crosslinked. Polymer thermal stability, compatibility with mixing waters, correct identification of the water production mechanism, and gelation time are parameters that affect the success of such polymer gel WSITs.

Figure 1:
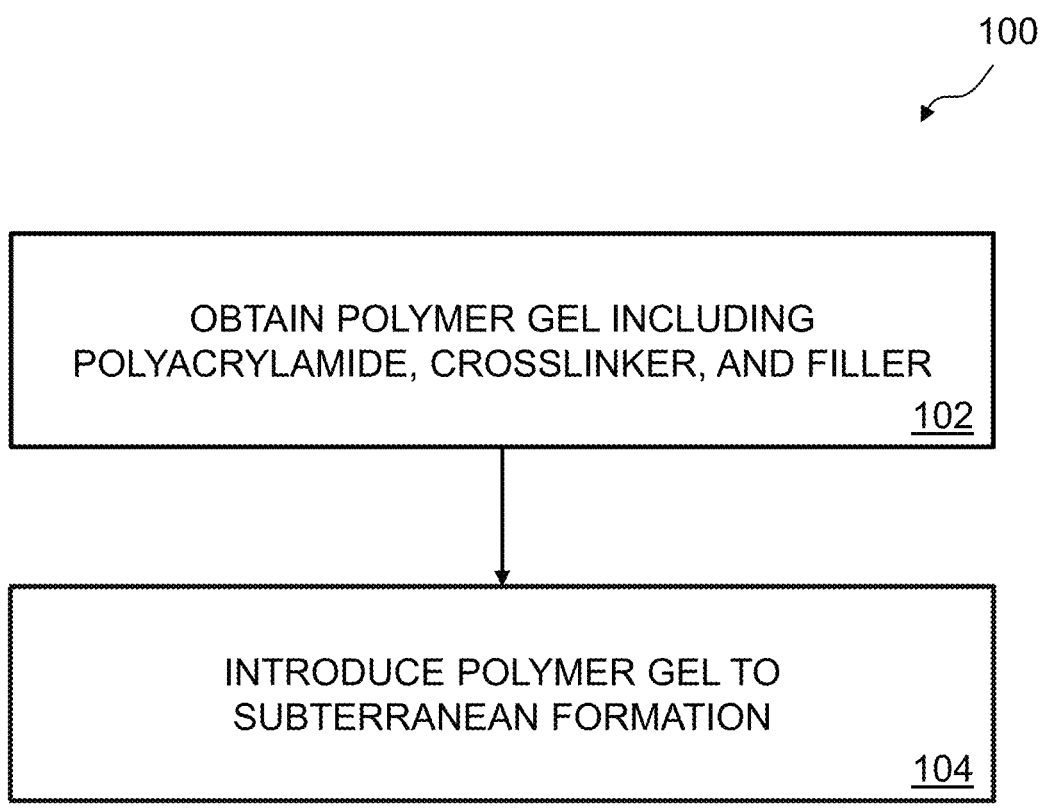
FIG. 1 is a flow chart for an example method of treating a subterranean formation.

FIG. 1 is a flow chart for an example method 100 for treating a subterranean formation. At step 102, a polymer gel including polyacrylamide (PAM), crosslinker, and filler is obtained. Polyacrylamide (PAM) polymer gels formed with a crosslinker and a filler, as described in this disclosure, demonstrate temperature stability, mechanical stability, and salinity resistance and can be widely applied as treatments for wells, for example, for water shutoff treatments for wells with excess water production. At step 104, the polymer gel is introduced to the subterranean formation.

The crosslinker can include an organic crosslinker, for example, hydroquinone, hexamethylenetetramine, or both. The filler can include a metal oxide, a nanomaterial, a combination of both, or a hybrid that includes both a metal oxide and a nanomaterial (also referred to as a nanocomposite). The nanomaterial can be in the form of a two-dimensional (2D) nanosheet. Some non-limiting examples of suitable metal oxides include zirconium oxide (also referred to as zirconia), zirconium hydroxide, and titanium oxide (also referred to as titania). Some non-limiting examples of suitable nanomaterial include graphene, graphene oxide (GO), a derivative of graphene oxide, boron nitride (BN), and combinations of these. The nanocomposite can include a hybrid of any of the aforementioned metal oxides and any of the aforementioned nanomaterials. As used in this disclosure, the term "derivative" refers to chemically or thermally modified. For example, a derivative of graphene oxide can be graphene oxide that is modified with at least one functional group. Suitable examples of functional groups include carboxy group, amido group, imino group, and alkyl group. The chemical modification can include covalent bonding, non-covalent bonding, or both. Some examples of non-covalent bonding include electrostatic interactions, hydrophobic interactions, and Van der Waals forces. In one example, the term "derivative of graphene oxide" refers to a reduced graphene oxide (rGO), such as graphene oxide that is reduced with a hydrazine hydrate.

The filler can be prepared, for example, by a facile, cost-effective, eco-friendly, and scalable chemical reduction method assisted by in situ microwave irradiation (MWI). In some implementations, the filler is prepared by forming an aqueous dispersion of 2D nanosheets and metal oxide (for example, in the form of nanoparticulates), combining a reducing agent with the dispersion, and irradiating the dispersion with microwave radiation. The microwave radiation is typically in a range of 500 watts (W) to 1000 W, with a reaction time ranging from 1 minute to 5 minutes. In one example, the 2D nanosheets are RGO, the nanoparticulate metal oxide is zirconia, and the reducing agent is hydrazine hydrate. Irradiating the dispersion with microwave radiation reduces the graphene oxide to graphene, yielding a suspension of a nanocomposite including graphene and zirconia. The nanocomposite is separated from the suspension, for example, by centrifugation, and dried.

A polymer gel precursor solution can be prepared by combining the filler and polyacrylamide in water to yield an aqueous dispersion. The aqueous dispersion can be heated to yield a polymer gel. Heating the dispersion to yield a polymer gel can include heating at a temperature of about 300 degrees Fahrenheit (° F.) (for example, 310° F.) for a length of time sufficient to form a gel (for example, 2 hours to 4 hours). The heated aqueous dispersion can form a stable gel and can withstand shear stress of 2,000 pounds per square inch gauge (psig). The formed polymer gel can exhibit improved viscosity (for example, a 50-fold increase) in comparison to conventional polymer gels that do not include all of the components described (that is, polyacrylamide, crosslinker, and filler). The formed polymer gel can be thermally stable even at elevated temperatures. In some implementations, the formed polymer gel has a degradation temperature greater than 310° F. (for example, up to 370° F.). The formed polymer gel can be thermally and mechanically stable at various potentials of hydrogen (pH). In some implementations, the formed polymer gel is thermally and mechanically stable at a basic pH (for example, a pH in a range of from about 8 to about 12).

In some implementations, the base fluid of the aqueous dispersion is saltwater. For example, the base fluid of the aqueous dispersion is seawater. In some implementations, the base fluid of the aqueous dispersion is treated water. For example, the base fluid of the aqueous dispersion is deionized water or treated wastewater. In some implementations, the aqueous dispersion includes dissolved salt, for example, in the form of monovalent ions, divalent ions, or both. For example, one or more salts can be dissolved in deionized water to form the base fluid of the aqueous dispersion. For example, the aqueous dispersion can include dissolved potassium chloride. For example, the aqueous dispersion can include dissolved magnesium chloride. In some implementations, the aqueous dispersion has a salt concentration of about 2 weight percent (wt. %).

In some implementations, the aqueous dispersion includes from about 0.5 wt. % to about 6 wt. % of polyacrylamide or a derivative of polyacrylamide. For example, the aqueous dispersion includes about 4 wt. % of polyacrylamide.

In some implementations, the aqueous dispersion includes from about 0.1 wt. % to about 1 wt. % of the crosslinker. For example, the aqueous dispersion includes about 0.3 wt. % of the crosslinker. In some implementations, the crosslinker includes a mixture of hydroquinone and hexamethylenetetramine. In some implementations, a weight ratio of hydroquinone to hexamethylenetetramine is in a range of from about 1:2 to about 1:1. For example, the crosslinker can include equal parts of hydroquinone and hexamethylenetetramine. As another example, the crosslinker can include two parts hexamethylenetetramine to one part hydroquinone.

In some implementations, the aqueous dispersion includes from about 0.1 wt. % to about 1 wt. % of the filler. In some implementations, the aqueous dispersion includes from about 0.1 wt. % to about 1 wt. % of the metal oxide. In some implementations, the aqueous dispersion includes from about 0.1 wt. % to about 0.5 wt. % of the nanomaterial.

As mentioned previously, the filler can include a mixture of both the metal oxide and the nanomaterial. In such implementations, the aqueous dispersion can include from about 0.1 wt. % to about 1 wt. % of the metal oxide and from about 0.01 wt. % to about 0.1 wt. % of the nanomaterial.

As mentioned previously, the filler can include a nanocomposite of the metal oxide and the nanomaterial. In such implementations, the aqueous dispersion can include from about 0.1 wt. % to about 1 wt. % of the nanocomposite, and a weight ratio of metal oxide to nanomaterial in the nanocomposite can be in a range of from about 99:1 to about 9:1. For example, the filler can be a nanocomposite of zirconium hydroxide and graphene oxide with a zirconium hydroxide to graphene oxide ratio of 95:5 (19:1).

This paragraph describes an example method for preparing graphene oxide as the filler. Sulfuric acid solution can be added to graphite to oxidize the graphite. Potassium permanganate can then be added to the mixture of sulfuric acid and graphite. The solution including potassium permanganate, sulfuric acid, and graphite can be maintained at a temperature that is cooler than 68° F. This solution can then be stirred for 1 hour at a temperature of 95° F. After stirring, the solution can be left to sit, for example, for 1 hour or 2 hours. The solution can then be washed with hydrogen peroxide and water. After washing, the solution can be filtered to isolate the graphene oxide. The isolated graphene oxide can be dried, for example, at a temperature of 175° F. to obtain a dried powder of graphene oxide. The graphene oxide can be reduced by mixing with a reducing agent (for example, hydrazine hydrate) to form reduced graphene oxide (rGO).

This paragraph describes an example method for preparing the metal oxide as the filler. This method can be implemented, for example, to prepare zirconium hydroxide, zirconium oxide, or titanium oxide. Tetra-n-butylammonium bromide (TBAB) can be dissolved in ammonia. For example, 20 grams (g) of TBAB can be dissolved in 250 milliliters (mL) of 25% ammonia at a temperature of 175° F. A metal oxide precursor can then be mixed with the solution of TBAB and ammonia. For example, the solution including TBAB, ammonia, and metal oxide precursor can be stirred at room temperature until the solution becomes transparent (for example, 3 hours). The transparent solution can then be aged in a water bath to form a gel. For example, the metal oxide solution can be aged for 24 hours at a temperature of 210° F. in a water bath to form a sol-gel. The sol-gel can be deposited on zirconyl chloride ($ZrOCl_2$) in TBAB template and then filtered and dried, for example, for 2 days at a temperature of 176° F. in an oven. This zirconia support can be heated, for example, at a temperature increase rate of 2° F. per minute until reaching 932° F. and then calcinated at this temperature, for example, for 3 hours to form the dried metal oxide.

Some non-limiting examples of metal oxide precursor for zirconium hydroxide include zirconium halide ($ZrX_n$), zirconium carbonate ($ZrCO_3$), zirconium (IV) oxychloride ($ZrOCl_2 \cdot 8H_2O$), and zirconium (IV) oxynitrate hydrate ($ZrO(NO_3)_2 \cdot 2H_2O$). Some non-limiting examples of metal oxide precursor for zirconium oxide include zirconium hydroxide ($Zr(OH)_4$), zirconium propoxide ($Zr(C_3H_7O)_4$), zirconium butoxide ($Zr(C_4H_9O)_4$), zirconium acetate ($Zr(C_2H_3O_2)_4$), zirconium acetylacetonate ($Zr(C_{20}H_{28}O_8)$), and zirconyl chloride octahydrate ($ZrOCl_2 \cdot 8H_2O$). Some non-limiting examples of metal oxide precursor for titanium oxide include titanium (IV) tetrachloride ($TiCl_4$), titanium (IV) isopropoxide ($TiC_{12}H_{28}O_4$), and titanium (IV) butoxide ($TiC_{16}H_{36}O_4$).

Metal oxide precursor in liquid phase (for example, zirconium propoxide, zirconium butoxide, titanium (IV) tetrachloride, titanium (IV) isopropoxide, and titanium (IV) butoxide) can be prepared as a solution in methanol, for example, in a concentration from about 2 wt. % to about 20 wt. %.

This paragraph describes an example method for preparing a nanocomposite as the filler, in which the nanocomposite includes both a metal oxide and a nanomaterial. A dried nanomaterial (for example, formed by implementation of one of the methods described previously) can be mixed with water to form a homogeneous dispersion. For example, 400 milligrams (mg) of dried graphene oxide can be mixed with 20 mL of deionized water to form a homogeneous dispersion with a yellow color. A dried metal oxide (for example, formed by implementation of the method described in the previous paragraph) can be mixed into the homogeneous dispersion of the nanomaterial. For example, zirconium oxide can be mixed into the homogeneous dispersion of graphene oxide in water. In some implementations, a reducing agent (for example, 40 microliters of hydrazine hydrate) can be added to the mixture. The mixture can then be microwaved (for example, in a microwave oven). For example, the mixture can be placed within a microwave oven, and the microwave oven can be operated at full power (for example, 1,000 W) with 2.45 gigaHertz (GHz) frequency in 30 second cycles (consisting of 10 seconds of microwaving followed by 20 seconds of stirring while the microwave is paused) for a total reaction time of 1 to 2 minutes. This microwaving process can cause the dispersion to change color from yellow to black. After the microwaving process, the nanocomposite can be separated from the mixture, for example, by centrifugation. For example, the mixture can be centrifuged at a speed of 5,000 revolutions per minute (rpm) for 15 minutes. The nanocomposite separated by centrifugation can then be dried, for example, overnight under vacuum to form a dried nanocomposite.

In some implementations, the filler is dispersed in water, and polyacrylamide is then added to the dispersion, followed by the crosslinker (and in some cases, salt). In some implementations, the crosslinker (and in some cases, salt) is mixed with water, and the filler is then dispersed in the water, followed by polyacrylamide. Allowing the crosslinker to interact with the filler (before the addition of polyacrylamide) can, in some cases, promote covalent bonding of polyacrylamide chains when forming the polymer gel.

EXAMPLES

1. Metal Oxide

The weight concentration of metal oxide in the aqueous dispersion was varied from 0.1 wt. % to 1 wt. % in the examples for Sections 1.1, 1.2, and 1.3, while the weight concentrations of PAM, crosslinker, and potassium chloride were maintained at 4 wt. %, 0.3 wt. %, and 2 wt. %, respectively. The results of the thermal stability tests (thermogravimetric analysis (TGA) and differential scanning calorimetry (DSC)) and viscoelastic property tests (dynamic mechanical analysis (DMA)) of the PAM polymer gels developed from the aqueous dispersions will be described. Fourier transform infrared (FTIR) spectroscopy, x-ray diffraction (XRD), optical microscopy, and scanning electron microscopy (SEM) images are also provided.

1.1. Zirconium Hydroxide ($Zr(OH)_4$)

Figure 2:
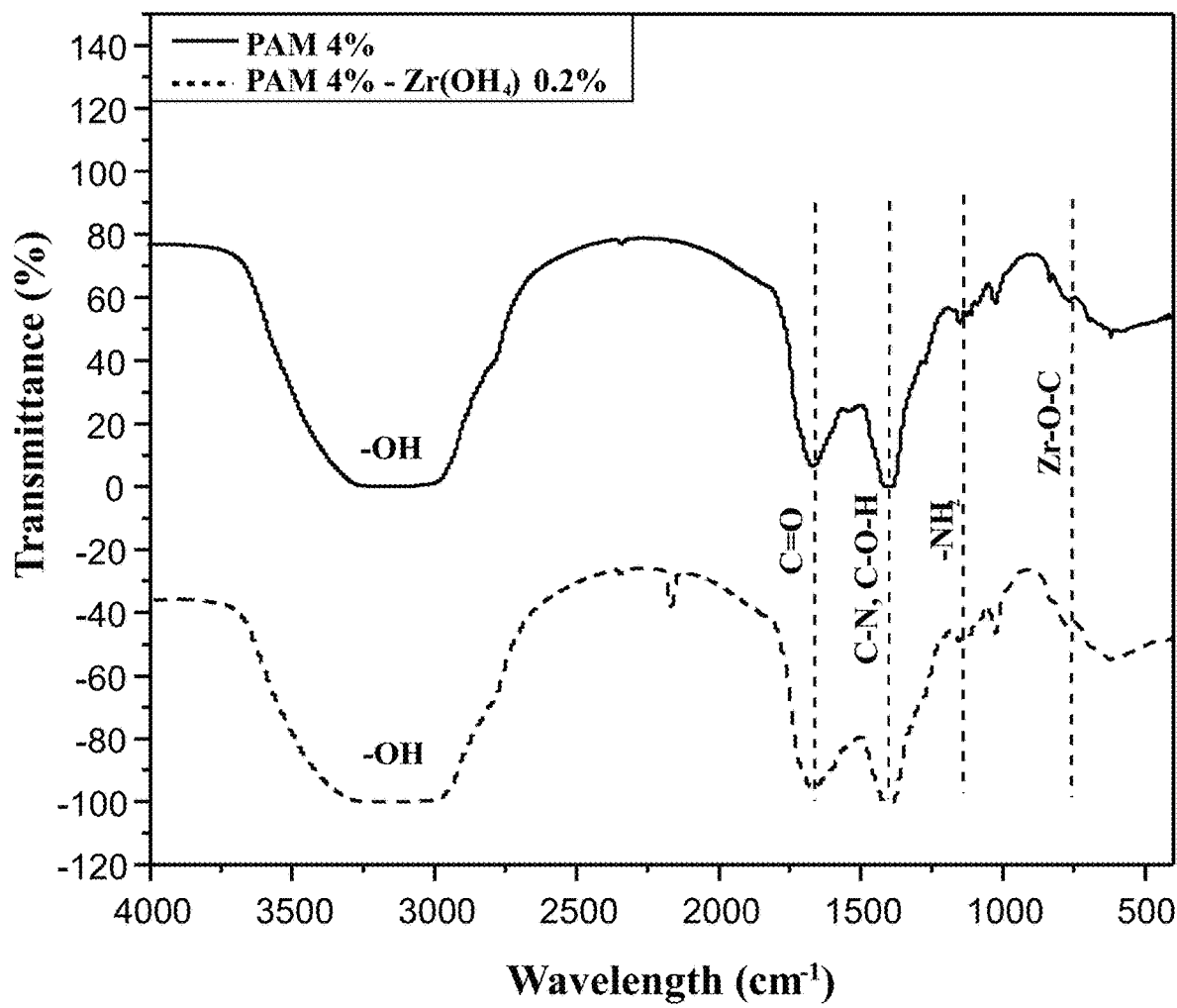
FIG. 2 shows a Fourier transform infrared (FTIR) spectrum of polyacrylamide (PAM) polymer gels with and without zirconium hydroxide as filler.

The filler in this example was zirconium hydroxide with a weight concentration of 0.2 wt. % in the aqueous dispersion. FIG. 2 shows the FTIR spectrum of PAM polymer gels with and without zirconium hydroxide as filler. Both gels exhibited similarly shaped spectrum peaks. Stretching vibration peaks for the PAM polymer gels, such as C=O and primary amide C—N were detected at 1667 inverse centimeters ($cm^{-1}$) and 1390 $cm^{-1}$, respectively. A wide bandwidth was detected at 3150 $cm^{-1}$, representing the stretching vibrations of the hydroxyl group (—OH) due to the presence of water in the PAM polymer gels. In other studies, the Zr—O stretching vibrations for zirconium hydroxide and zirconium oxide were typically detected around the fingerprint regions 505 $cm^{-1}$, 590 $cm^{-1}$, and 750 $cm^{-1}$. The slight shift in the Zr—O peak detected at 786 $cm^{-1}$ in this example can be attributed to Zr—O—C due to the interaction with the crosslinker.

Figure 3:
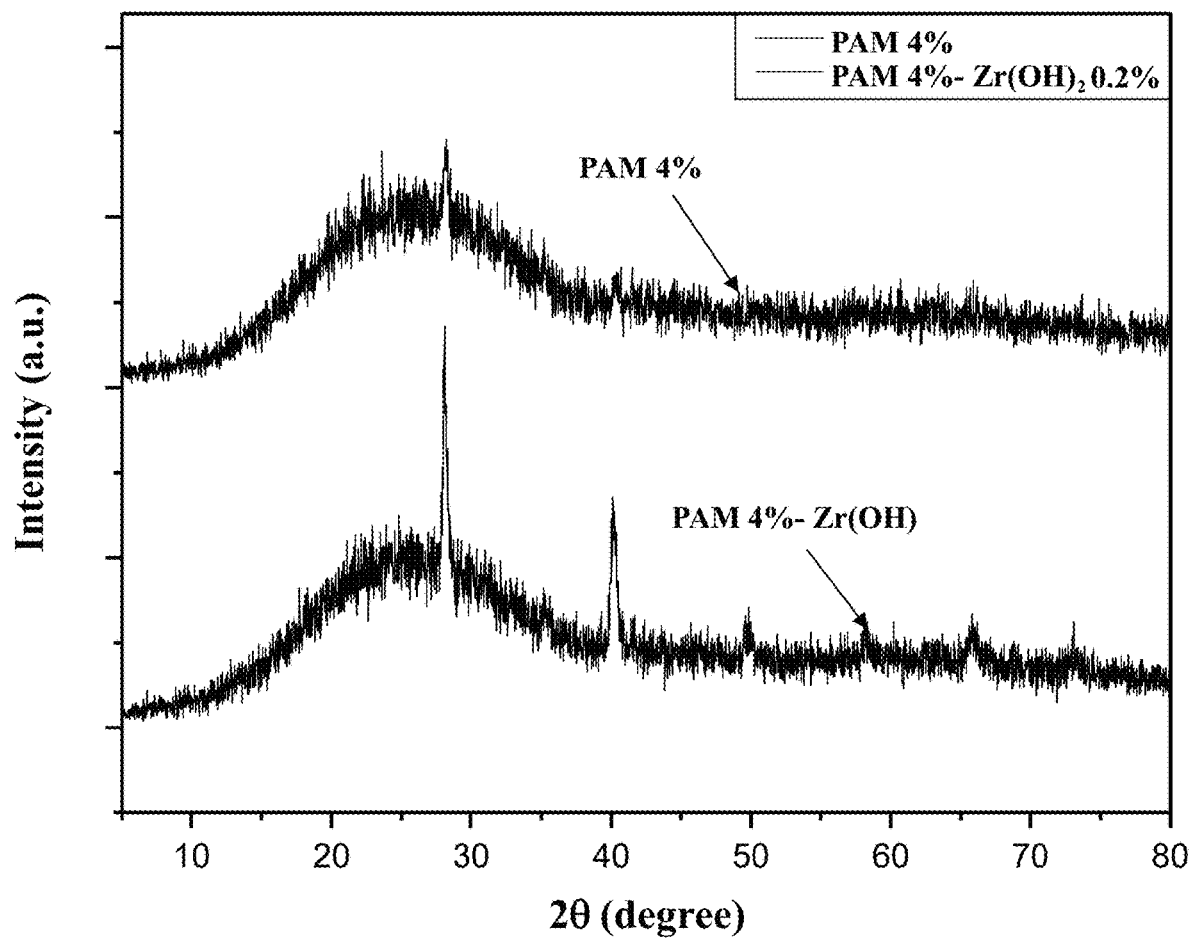
FIG. 3 shows x-ray diffraction (XRD) patterns of PAM polymer gels with and without zirconium hydroxide as filler.

FIG. 3 shows XRD patterns of PAM polymer gels with and without zirconium hydroxide as filler. The PAM polymer gel including zirconium hydroxide as filler displayed an amorphous nature with sharp peaks detected at 28°, 40°, 50°, and 66°. The peak at 28° for the PAM polymer gel including zirconium hydroxide corresponded to the peak found in the PAM polymer gel without filler, whereas the rest of the peaks were not detected in the PAM polymer gel without filler. This difference can be attributed to the fact that PAM and the filler have an amorphous nature, which is proven by the widespread peaks detected at the range of 20° to 40°.

Figure 4:
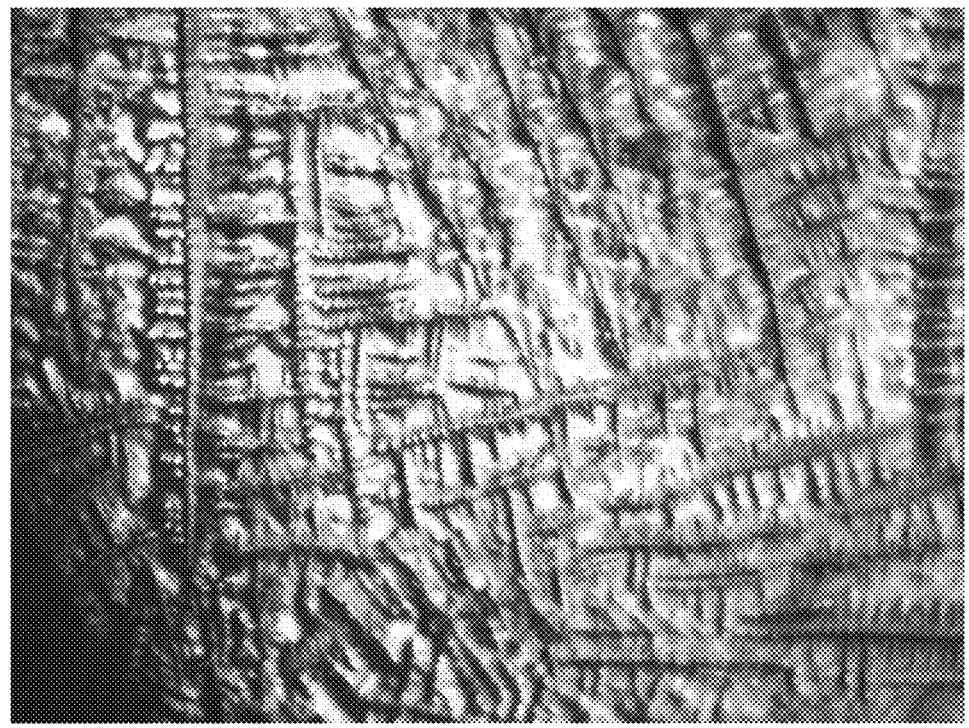
FIG. 4 shows optical microscope images of PAM polymer gels with and without zirconium hydroxide as filler.
Figure 4:
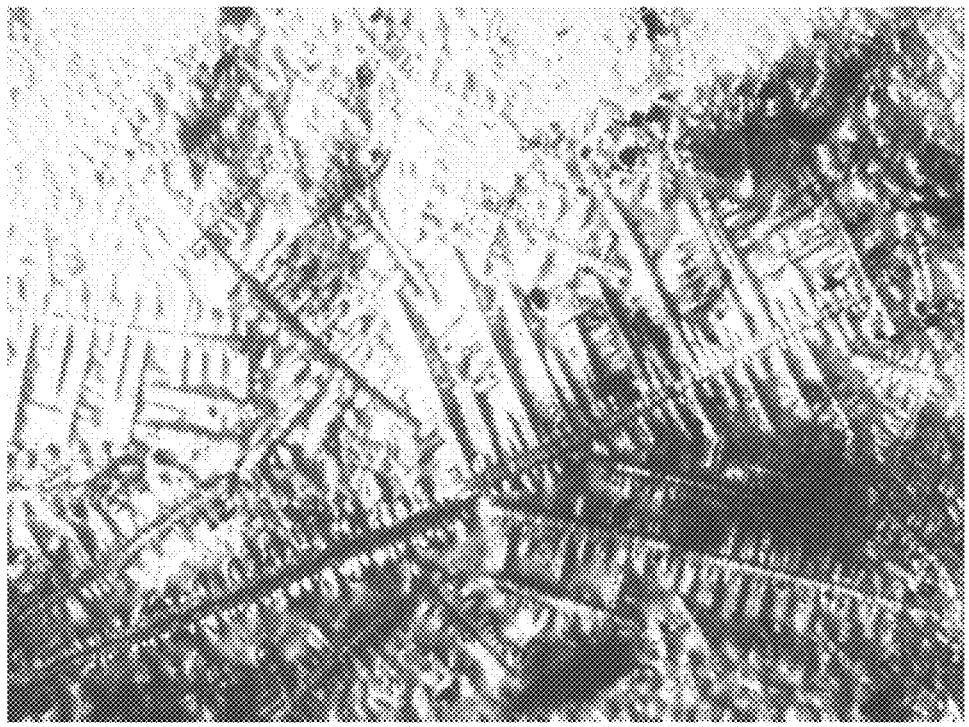

FIG. 4 shows the optical microscope images of PAM polymer gels with and without zirconium hydroxide as filler. As shown in FIG. 4, longer and more entangled chains are present in the PAM polymer gel including zirconium hydroxide in comparison to the PAM polymer gel without filler. This indicates that the PAM and the filler are well crosslinked in the PAM polymer gel including zirconium hydroxide.

Figure 5:
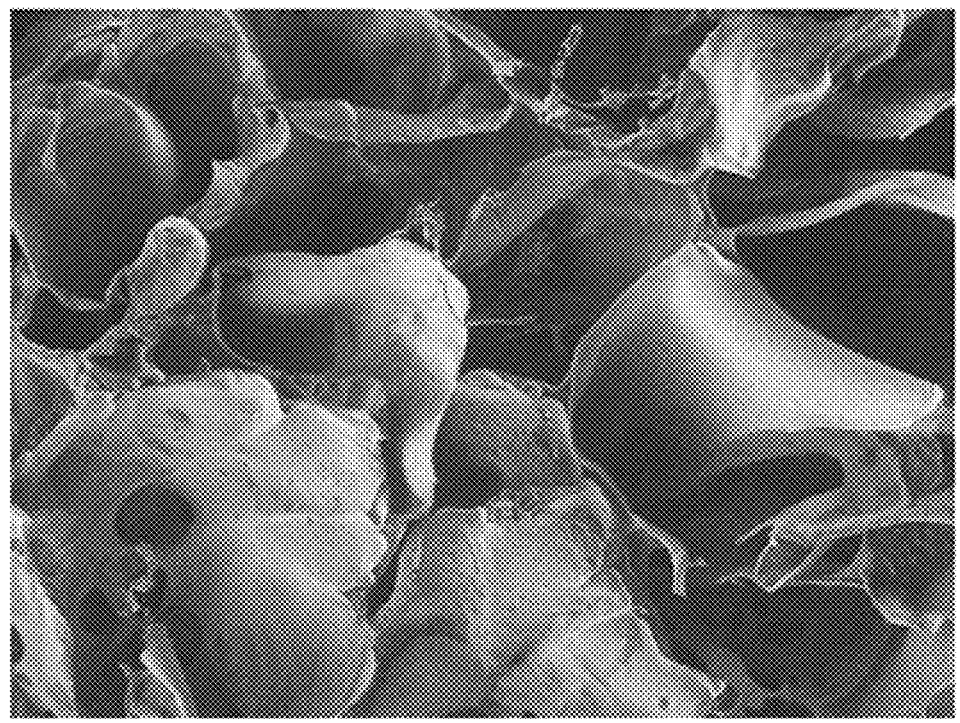
FIG. 5 shows scanning electron microscopy (SEM) images of PAM polymer gels with and without zirconium hydroxide as filler.
Figure 5:
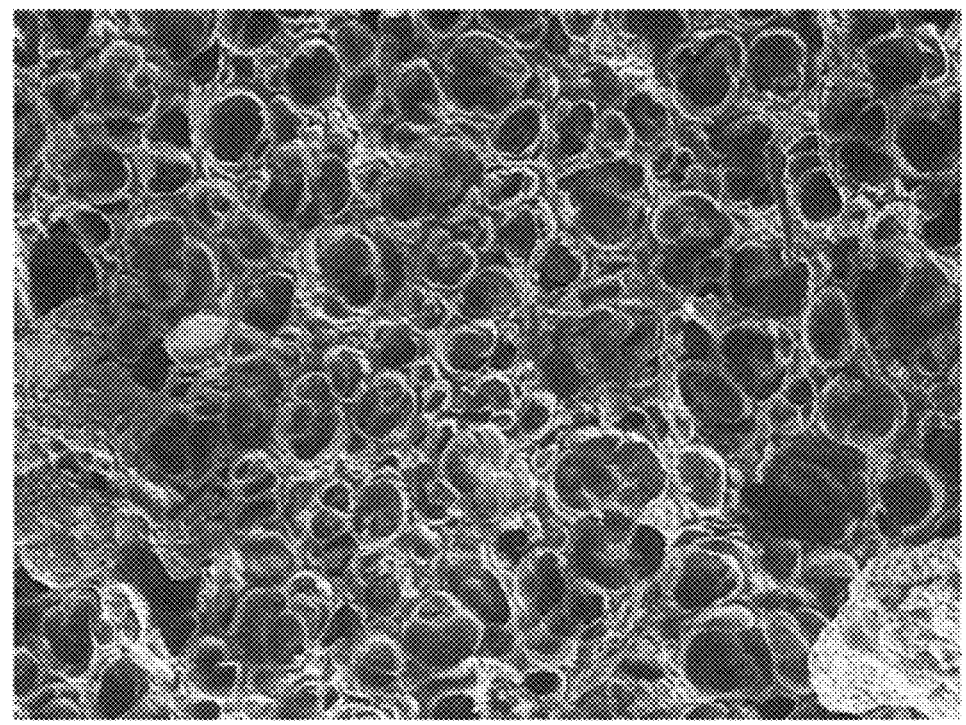

FIG. 5 shows the SEM microstructural images of PAM polymer gels with and without zirconium hydroxide as filler. Both SEM images show porous structure. The PAM polymer gel without filler exhibited larger pores in comparison to the PAM polymer gel including zirconium hydroxide. The presence of these pores is a factor for the water holding capacity of the PAM polymer gels during the gelation process. The PAM polymer gel without filler, with its larger pores, is expected to hold more water within its crosslinked structure and therefore exhibit less thermal stability and less desirable viscoelastic properties in comparison to the PAM polymer gel including zirconium hydroxide.

Figure 6:
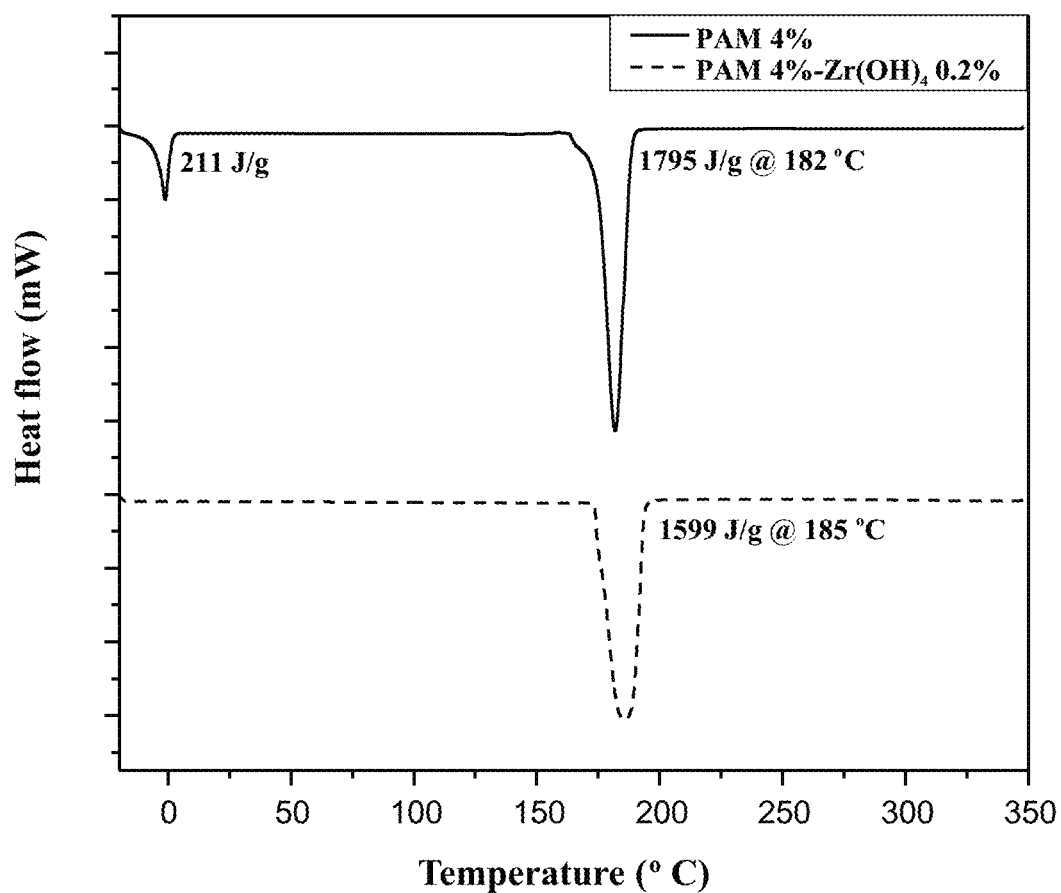
FIG. 6 shows differential scanning calorimetry (DSC) thermograms of PAM polymer gels with and without zirconium hydroxide as filler.

FIG. 6 shows the DSC thermograms of PAM polymer gels with and without zirconium hydroxide as filler. The degradation temperature of the PAM polymer gel is shifted by an increase of 3° C. for the PAM polymer gel including zirconium hydroxide in comparison to the PAM polymer gel without filler. In addition, the PAM polymer gel including zirconium hydroxide recorded decreased degradation enthalpies in comparison to the PAM polymer gel without filler. This difference indicates that less energy was required to break the bond between PAM and the filler. Additionally, the 100% bound water attained by the PAM polymer gel including zirconium hydroxide suggests that PAM and the filler directly interacted with the water molecules, thus encouraging the crosslinking of PAM and the filler through hydrogen bonding instead of covalent bonding.

Figure 7:
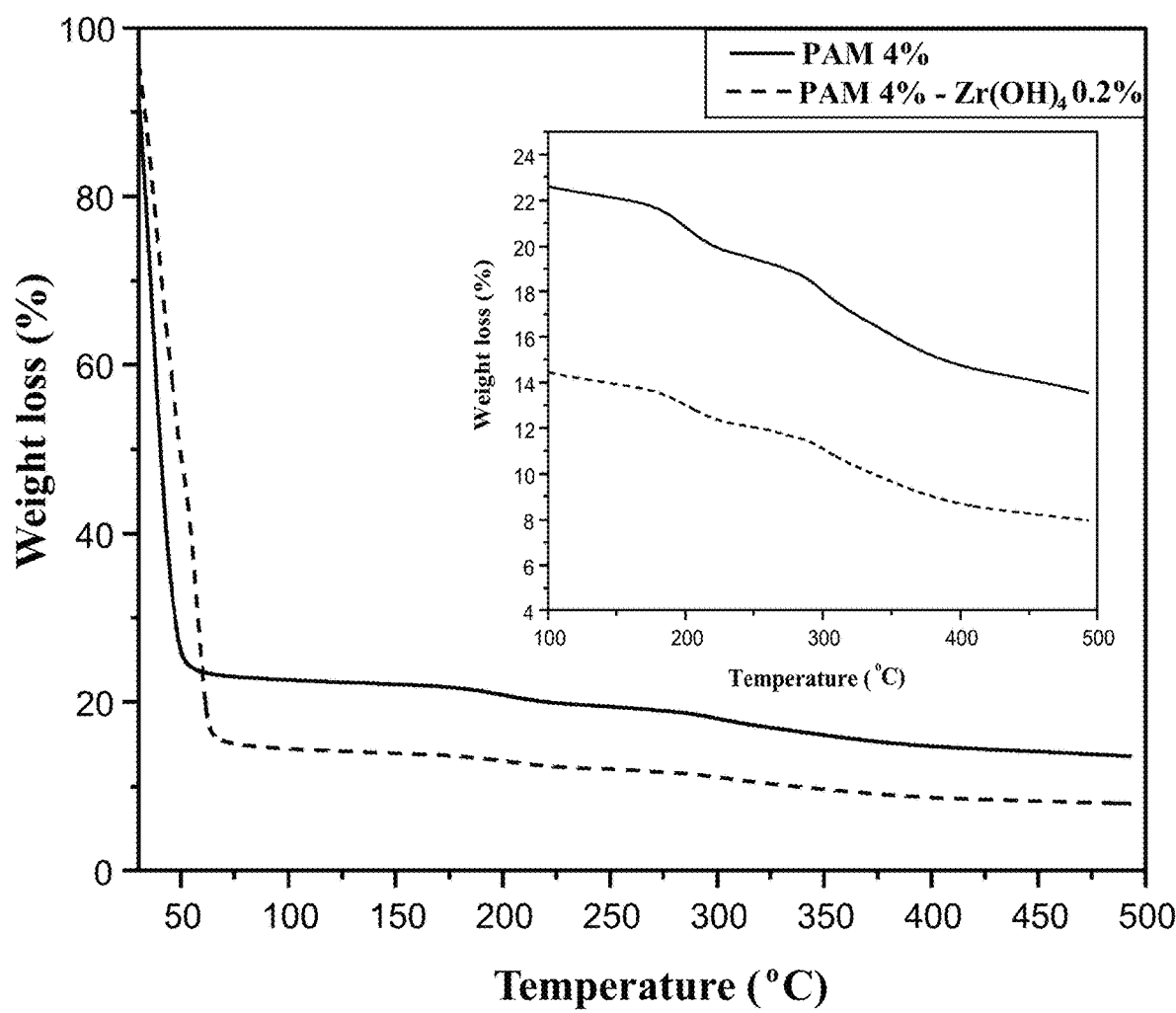
FIG. 7 shows thermogravimetric analysis (TGA) thermograms of PAM polymer gels with and without zirconium hydroxide as filler.

FIG. 7 shows the TGA thermograms of PAM polymer gels with and without zirconium hydroxide as filler. Maximum weight loss was recorded at about 100° C. due to the evaporation of water for both PAM polymer gels. The PAM polymer gel including zirconium hydroxide recorded a greater water loss in comparison to the PAM polymer gel without filler. The dried PAM polymer gel including zirconium hydroxide (beyond 100° C.) recorded less weight loss (−6%) in comparison to the dried PAM polymer gel without filler (−8%). This difference indicates that the thermal stability of the PAM polymer gel including zirconium hydroxide was greater than that of the PAM polymer gel without filler.

Figure 8:
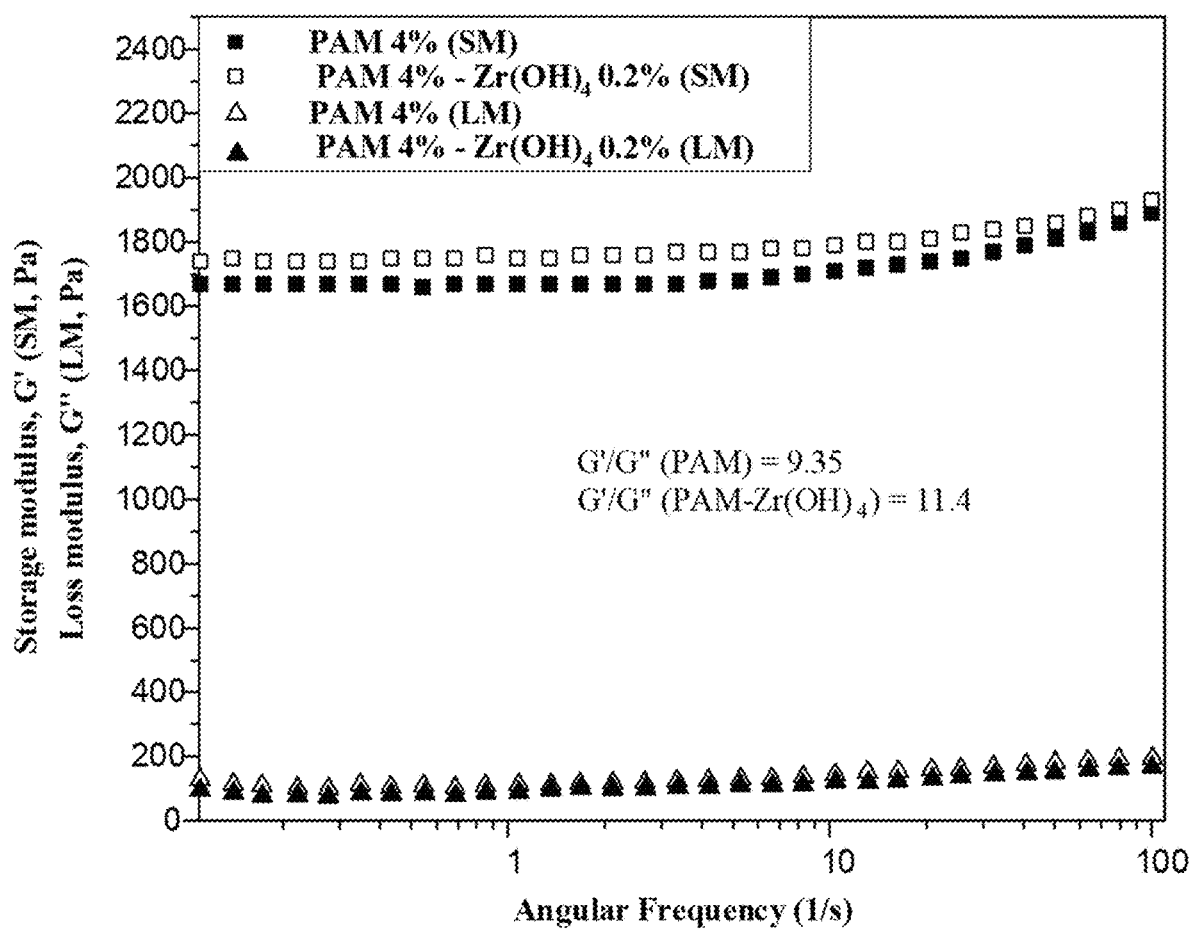
FIG. 8 shows results of a dynamic mechanical analysis (DMA) of PAM polymer gels with and without zirconium hydroxide as filler.

FIG. 8 is a plot showing the results of a DMA of PAM polymer gels with and without zirconium hydroxide as filler. The elasticity (G') and gel strength (G'/G") of the PAM polymer gel including zirconium hydroxide was greater than those of the PAM polymer gel without filler. This difference can be attributed to the reinforcement, entanglement, or both of PAM with the filler.

1.2. Zirconium Oxide ($ZrO_2$)

Figure 9:
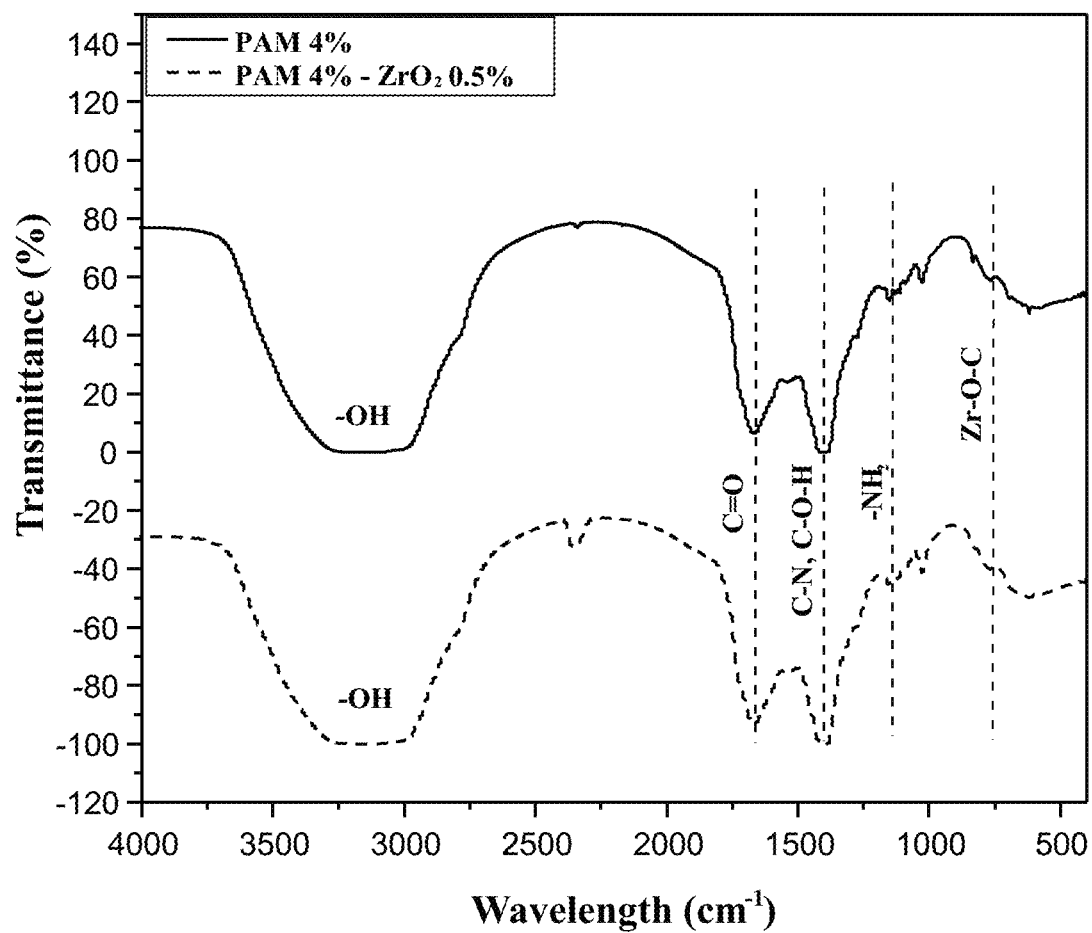
FIG. 9 shows an FTIR spectrum of the PAM polymer gels with and without zirconium oxide as filler.

The filler in this example was zirconium oxide with a weight concentration of 0.5 wt. % in the aqueous dispersion. FIG. 9 shows the FTIR spectrum of the PAM polymer gels with and without zirconium oxide as filler. Both gels exhibited similarly shaped spectrum peaks. Stretching vibration peaks for the PAM polymer gels, such as C=O and primary amide C—N were detected at 1667 $cm^{-1}$ and 1390 $cm^{-1}$, respectively. A wide bandwidth was detected at 3150 $cm^{-1}$, representing the stretching vibrations of the hydroxyl group (—OH) due to the presence of water in the PAM polymer gels. In other studies, the Zr—O stretching vibrations for the zirconium hydroxide and zirconium oxide were typically detected around the fingerprint regions 505 $cm^{-1}$, 590 $cm^{-1}$, and 750 $cm^{-1}$. The slight shift in the Zr—O peak detected at 786 $cm^{-1}$ in this example can be attributed to Zr—O—C due to the interaction with the crosslinker.

Figure 10:
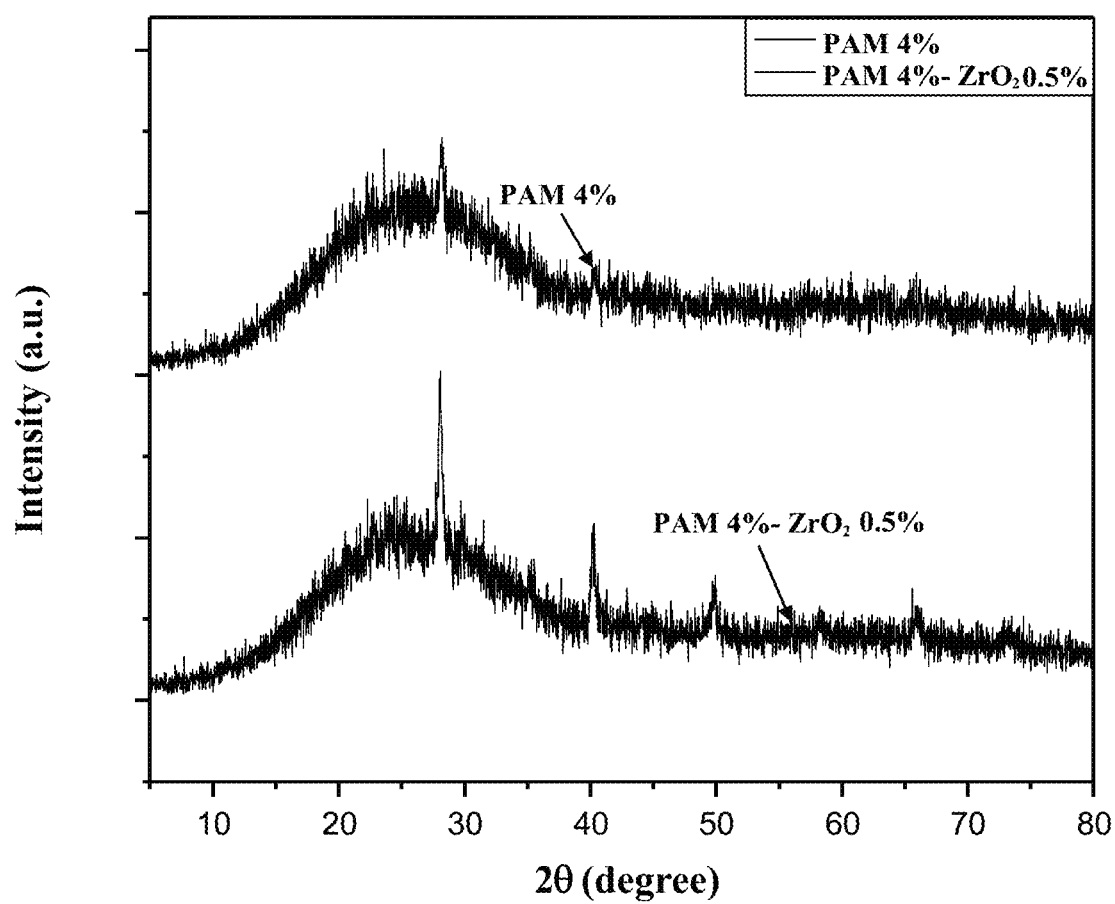
FIG. 10 shows XRD patterns of PAM polymer gels with and without zirconium oxide.

FIG. 10 shows XRD patterns of PAM polymer gels with and without zirconium oxide. The PAM polymer gel including zirconium oxide as filler displayed an amorphous nature with sharp peaks detected at 28°, 40°, 50°, and 66°. The peak at 28° for the PAM polymer gel including zirconium oxide corresponded to the peak found in PAM polymer gel without zirconium oxide, whereas the rest of the peaks were not detected in the PAM polymer gel without zirconium oxide. This difference can be attributed to the fact that PAM has amorphous nature, which is proven by the widespread peaks detected at the range of 20° to 40°. Additionally, the amount of zirconium oxide added appeared to be too small to make any significant change in the amorphous nature of the PAM polymer gel.

Figure 11:
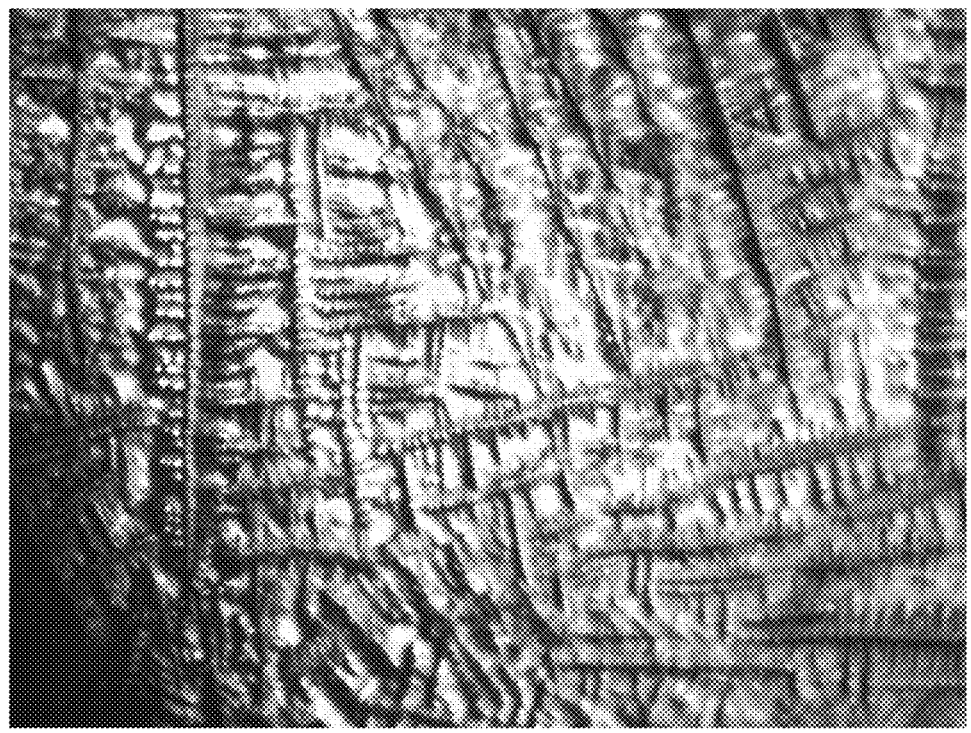
FIG. 11 shows optical microscope images of PAM polymer gels with and without zirconium oxide as filler.
Figure 11:
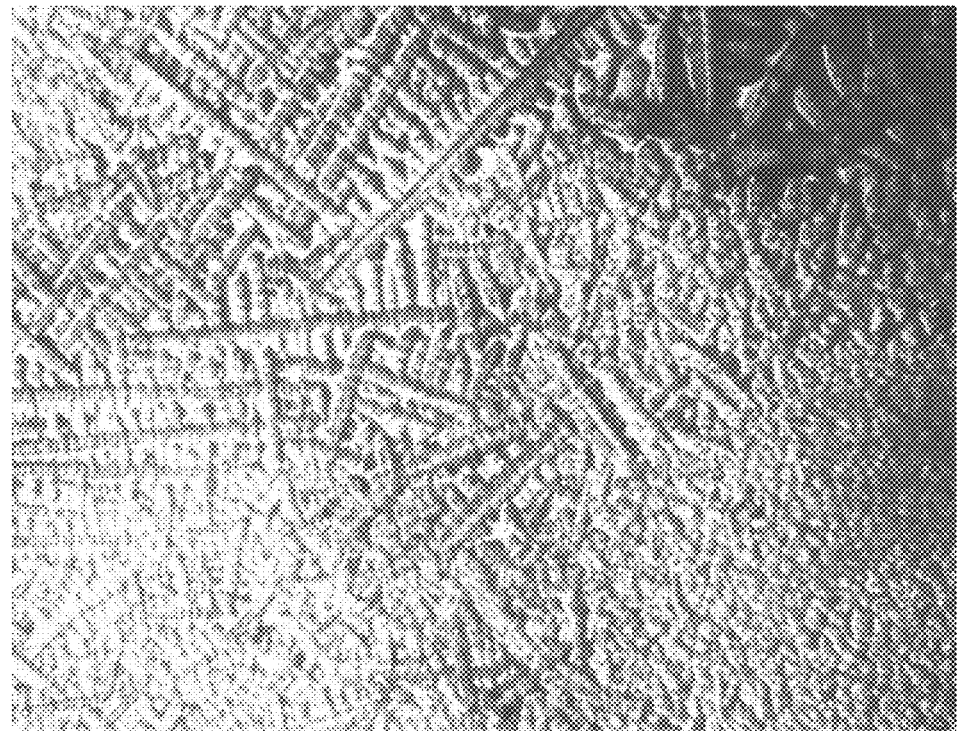

FIG. 11 shows the optical microscope images of PAM polymer gels with and without zirconium oxide as filler. Generally, the PAM polymer gel including zirconium oxide promoted comparatively shorter chains with more branches in comparison to the PAM polymer gel without zirconium oxide. These characteristics can affect the mechanical and thermal properties of the PAM polymer gel.

Figure 12:
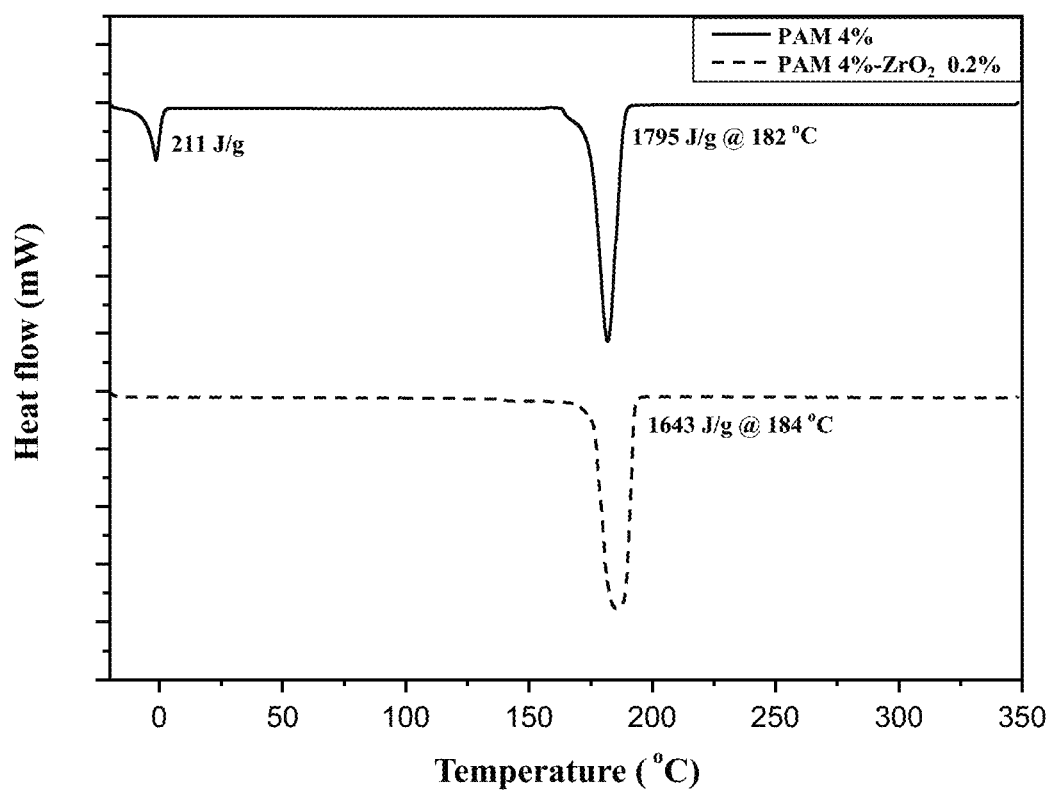
FIG. 12 shows DSC thermograms of PAM polymer gels with and without zirconium oxide as filler.

FIG. 12 shows the DSC thermograms of PAM polymer gels with and without zirconium oxide as filler. The presence of zirconium oxide in the PAM polymer gel led to 100% bound water amount. More water molecules were attached to the surface of the PAM and the filler in comparison to the PAM polymer gel without filler. This characteristic, in turn, decreased the direct interaction between the filler and PAM through covalent bonding instead of the formation of hydrogen bonding. This is reflected in the reduced degradation enthalpy of the PAM polymer gel including zirconium oxide in comparison to the PAM polymer gel without zirconium oxide. In comparison to the PAM polymer gel including zirconium hydroxide (Section 1.1), the degradation temperature for the PAM polymer gel including zirconium oxide was less by 3° C. but was still greater than that of the PAM polymer gel without filler.

Figure 13:
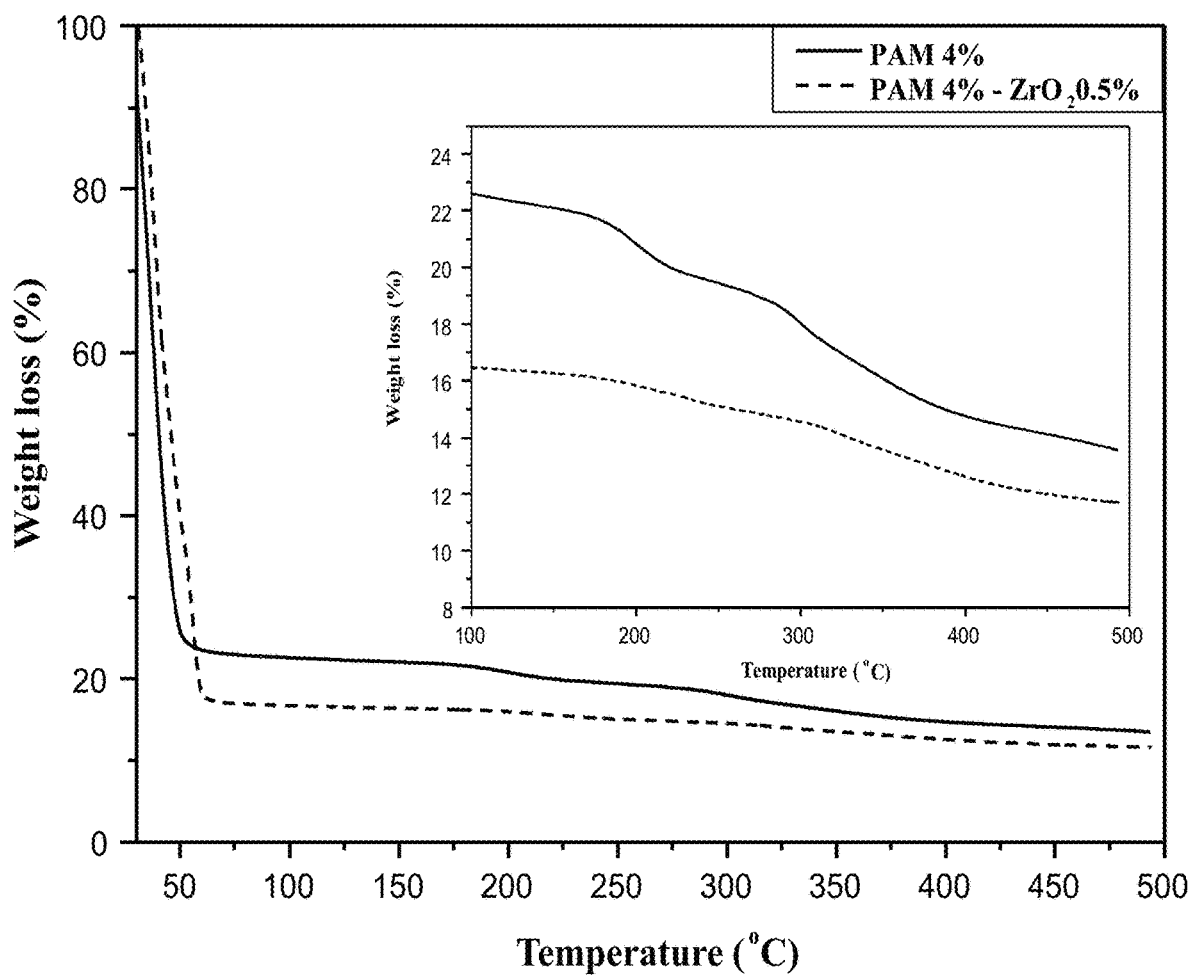
FIG. 13 shows TGA thermograms of PAM polymer gels with and without zirconium oxide as filler.

FIG. 13 shows the TGA thermograms of PAM polymer gels with and without zirconium oxide as filler. The PAM polymer gel including zirconium oxide recorded a greater water loss in comparison to the PAM polymer gel without filler. The dried PAM polymer gel including zirconium oxide (beyond 100° C.) recorded less weight loss (−5%) in comparison to the dried PAM polymer gel without filler (−8%). This difference indicates that the thermal stability of PAM polymer gel including zirconium oxide was greater than that of the PAM polymer gel without filler.

Figure 14:
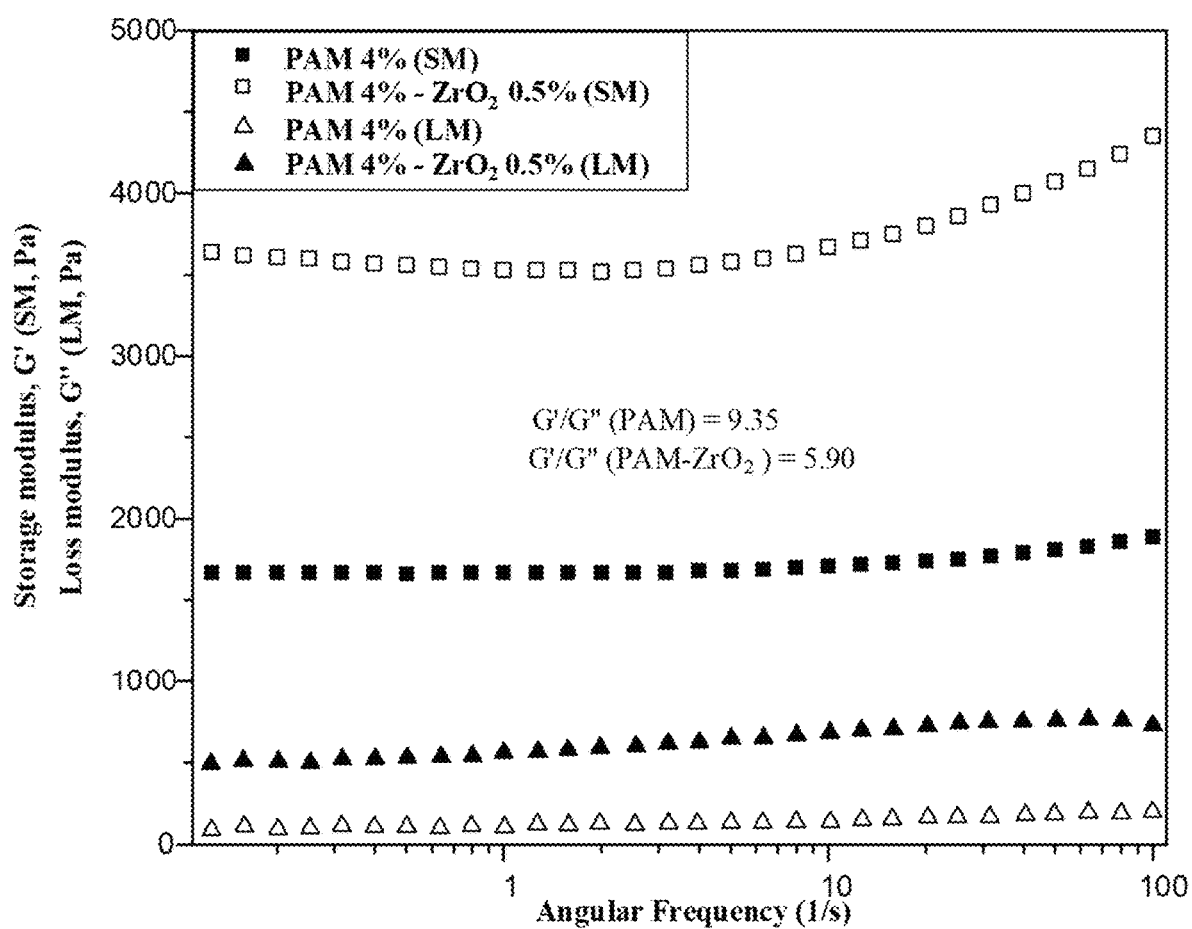
FIG. 14 shows results of a DMA of PAM polymer gels with and without zirconium oxide as filler.

FIG. 14 is a plot showing the results of a DMA of PAM polymer gels with and without zirconium oxide as filler. The elasticity (G') of the PAM polymer gel including zirconium oxide was greater by 130% than that of the PAM polymer gel without filler. The gel strength (G'/G") of the PAM polymer gel including zirconium oxide was less than that of the PAM polymer gel without filler. These differences can be attributed to the hydrogen bonding in the PAM polymer gel including zirconium oxide.

1.3. Titanium Oxide ($TiO_2$)

Figure 15:
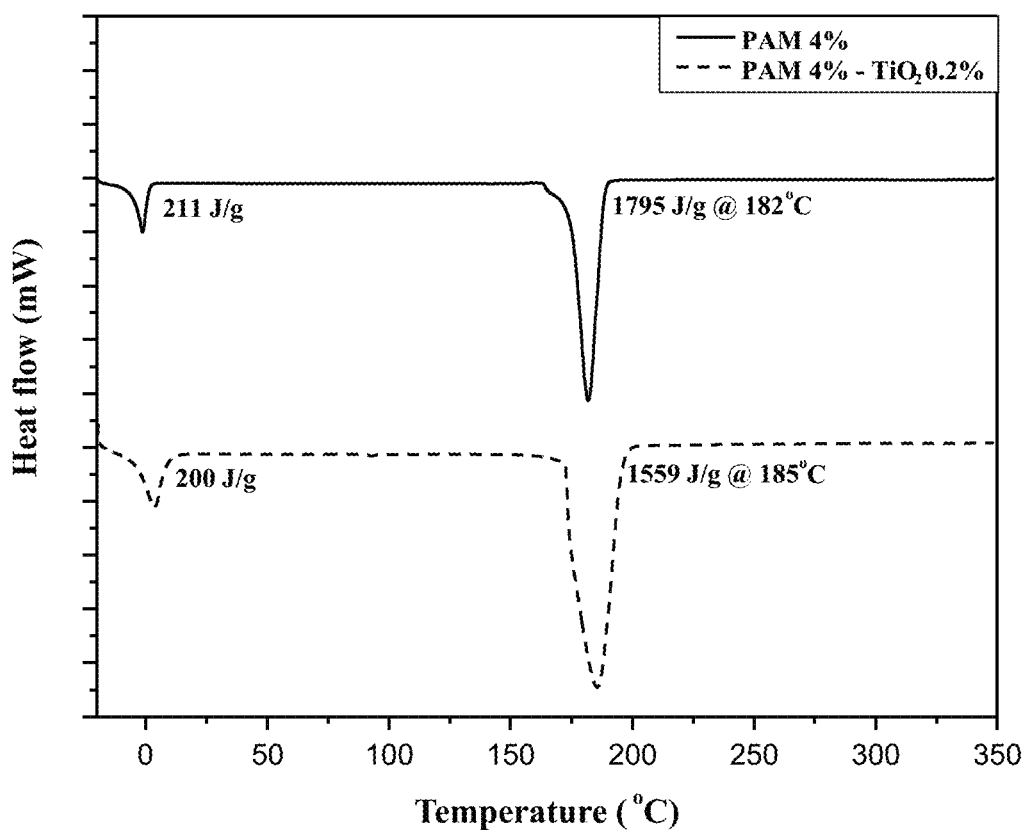
FIG. 15 shows DSC thermograms of PAM polymer gels with and without titanium oxide as filler.

The filler in this example was titanium oxide with a weight concentration of 0.2 wt. % in the aqueous dispersion. FIG. 15 shows the DSC thermograms of PAM polymer gels with and without titanium oxide as filler. The degradation enthalpy of the PAM polymer gel was noted to decrease, indicating a weaker bond interaction. This characteristic was further reflected by the increased bound water of the PAM polymer gel including titanium oxide in comparison to the PAM polymer gel without filler. The degradation temperature of the PAM polymer gel is shifted by an increase of 3° C. for the PAM polymer gel including titanium oxide in comparison to the PAM polymer gel without filler.

Figure 16:
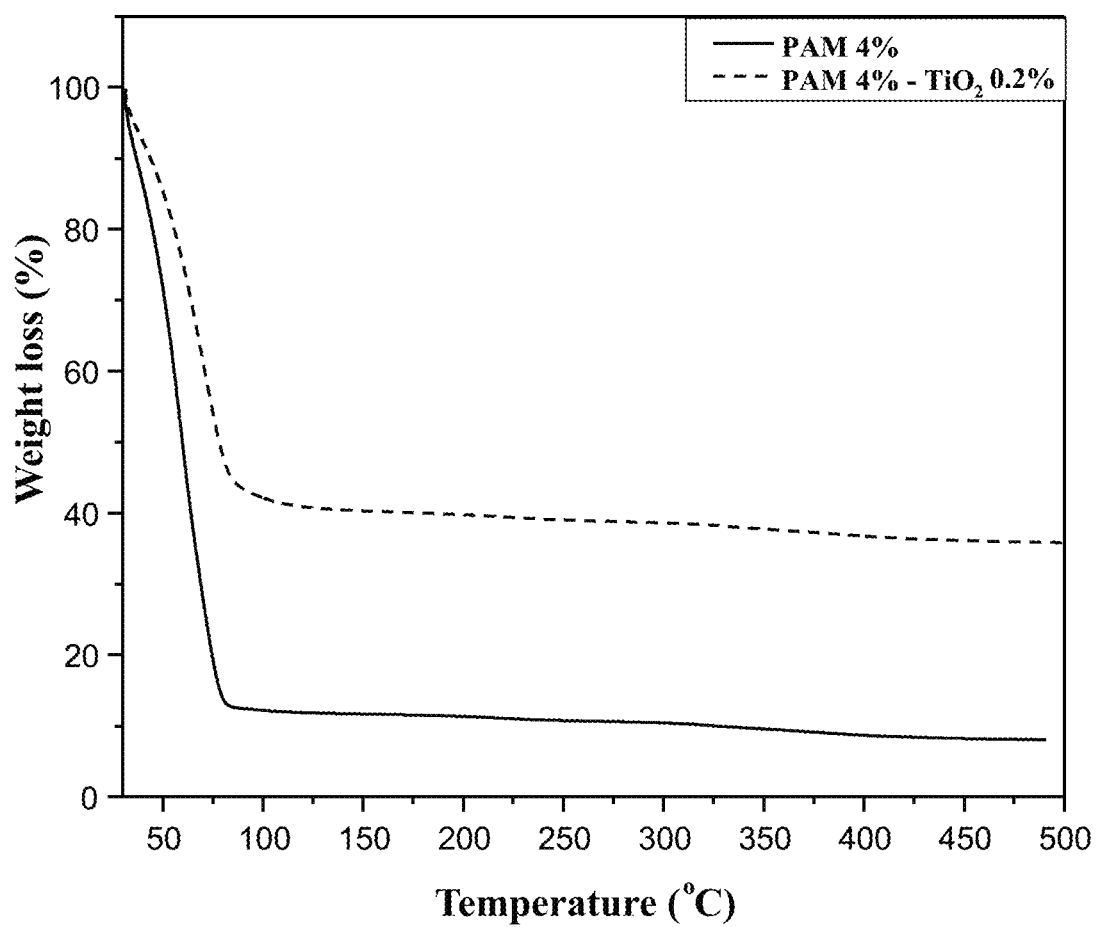
FIG. 16 shows TGA thermograms of PAM polymer gels with and without titanium oxide as filler.

FIG. 16 shows the TGA thermograms of PAM polymer gels with and without titanium oxide as filler. The PAM polymer gel including titanium oxide recorded a greater water loss (more than twice the amount) in comparison to the PAM polymer gel without filler. This difference indicates that the thermal stability of the PAM polymer gel including titanium oxide was greater than that of the PAM polymer gel without filler.

Figure 17:
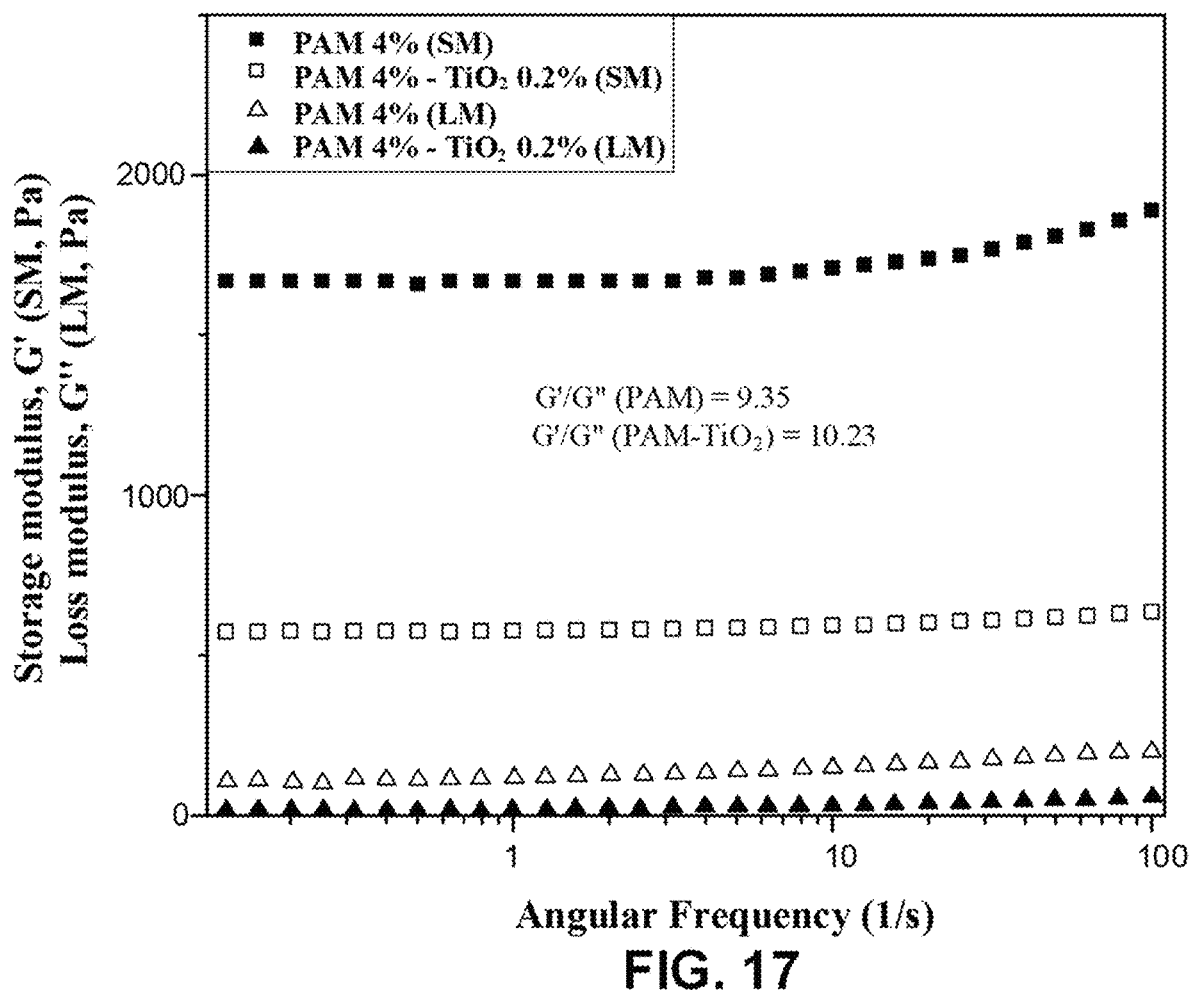
FIG. 17 shows results of a DMA of PAM polymer gels with and without titanium oxide.

FIG. 17 is a plot showing the results of a DMA of PAM polymer gels with and without titanium oxide. The elasticity (G') of the PAM polymer gel including titanium oxide was less than that of the PAM polymer gel without filler. The gel strength (G'/G") of the PAM polymer gel including titanium oxide was greater than that of the PAM polymer gel without filler.

2. Nanomaterial

The weight concentration of nanomaterial in the aqueous dispersion was varied from 0.01 wt. % to 0.5 wt. % in the example for Section 2, while the weight concentrations of PAM, crosslinker, and potassium chloride were maintained at 4 wt. %, 0.3 wt. %, and 2 wt. %, respectively. The filler in this example was graphene with a weight concentration of 0.1 wt. % in the aqueous dispersion.

Figure 18:
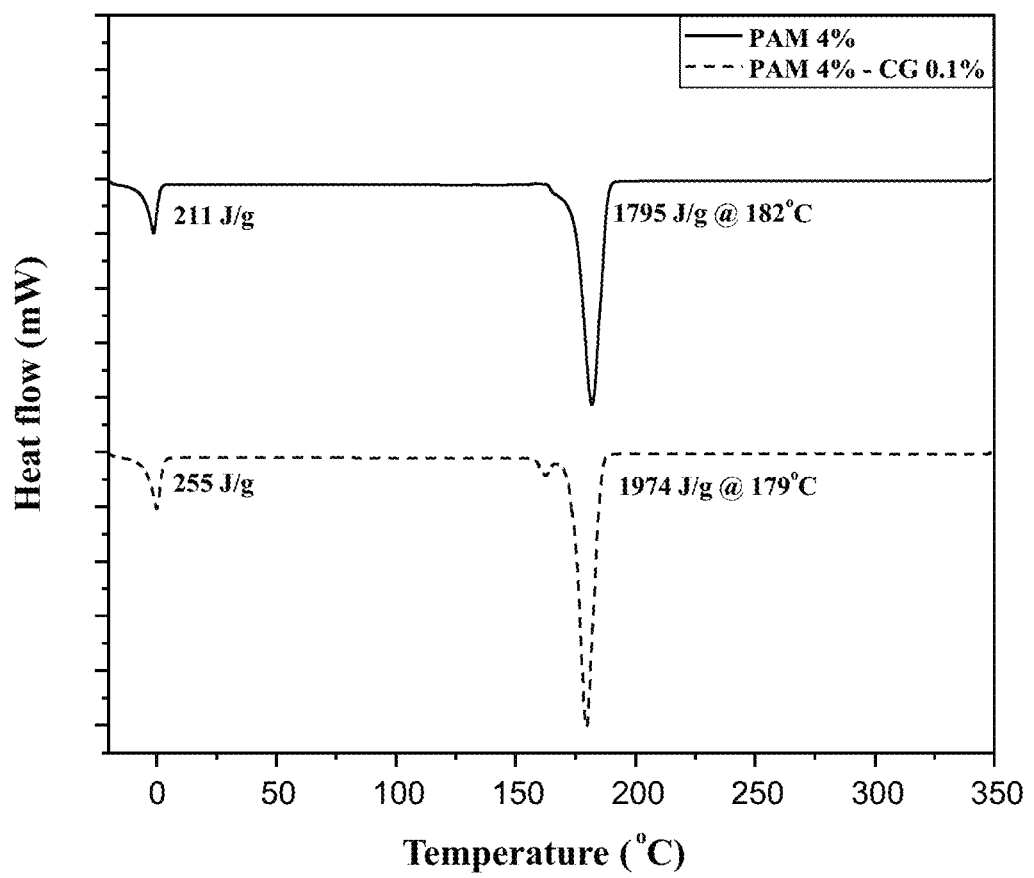
FIG. 18 shows DSC thermograms of PAM polymer gels with and without graphene as filler.

FIG. 18 shows the DSC thermograms of PAM polymer gels with and without graphene as filler. The amount of free water obtained by the PAM polymer gel including graphene was greater than that obtained by the PAM polymer gel without filler. This difference can be attributed to the stronger bond created between PAM and graphene, leading also to the increased degradation enthalpy of the PAM polymer gel including graphene in comparison to the PAM polymer gel without filler.

Figure 19:
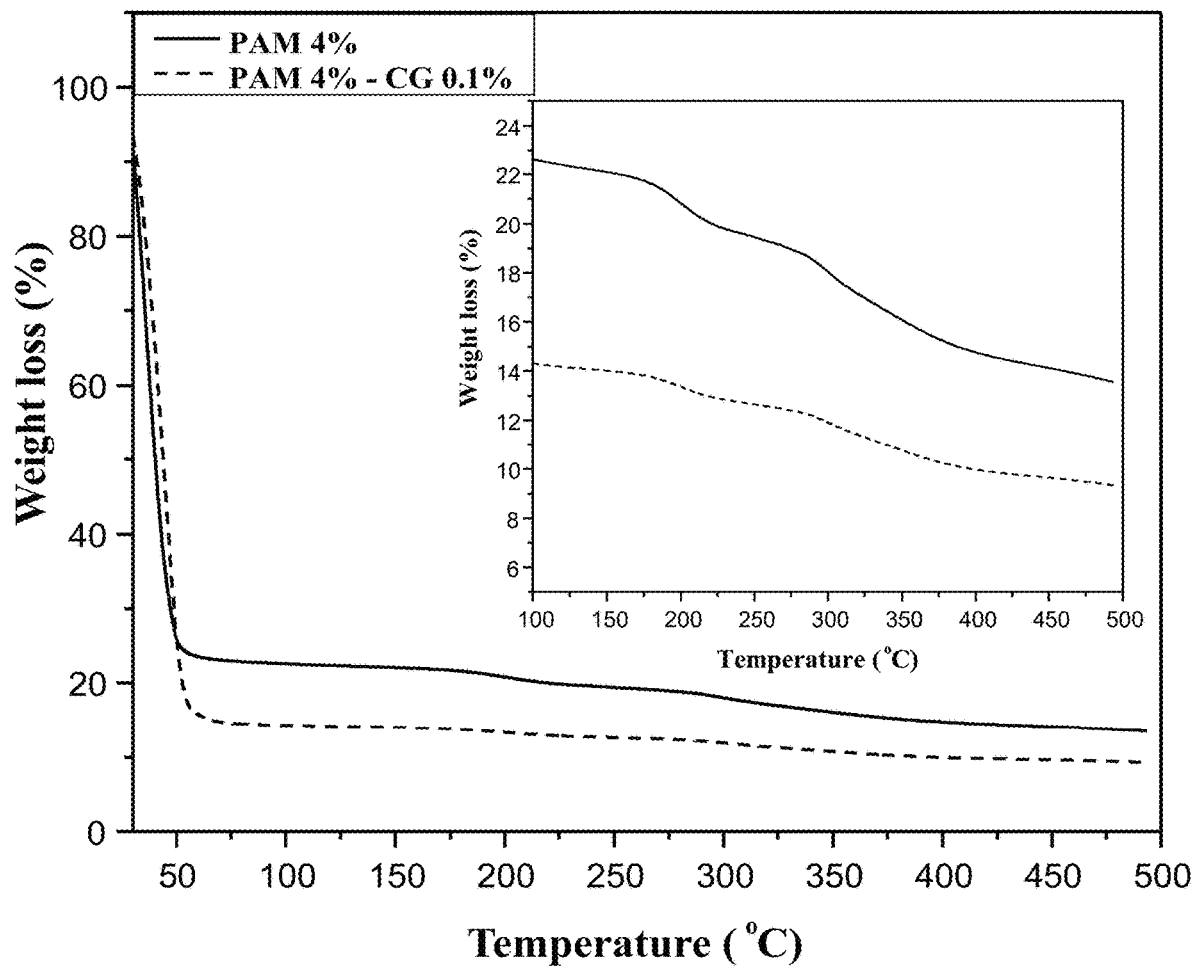
FIG. 19 shows TGA thermograms of PAM polymer gels with and without graphene as filler.

FIG. 19 shows the TGA thermograms of PAM polymer gels with and without graphene as filler. Maximum weight loss was recorded at around 100° C. due to the evaporation of water. The PAM polymer gel including graphene recorded a greater water loss in comparison to the PAM polymer gel without filler. The dried PAM polymer gel including graphene (beyond 100° C.) recorded less weight loss (−5%) in comparison to the dried PAM polymer gel without filler (−8%). This difference indicates that the thermal stability of the PAM polymer gel including graphene was greater than that of the PAM polymer gel without filler.

Figure 20:
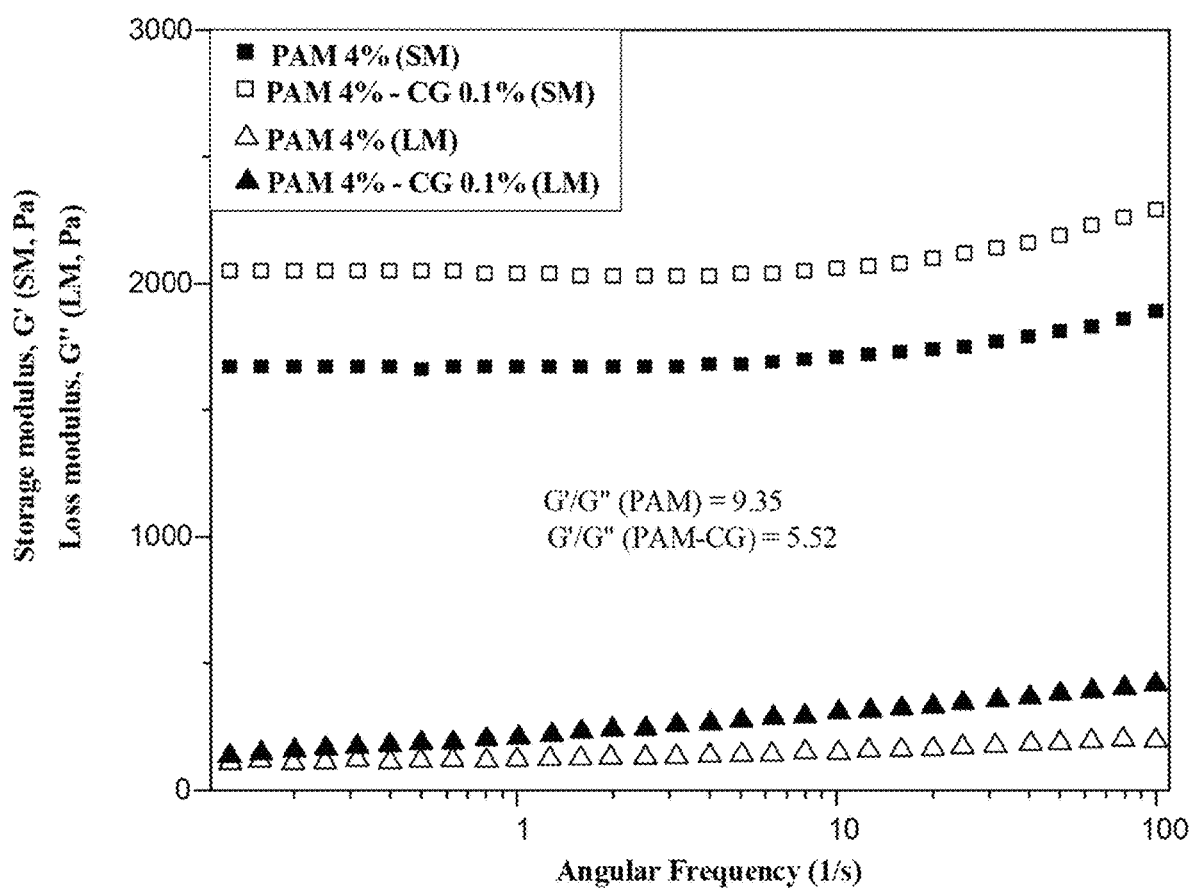
FIG. 20 shows results of a DMA of PAM polymer gels with and without graphene as filler.

FIG. 20 is a plot showing the results of a DMA of PAM polymer gels with and without graphene as filler. The elasticity (G') of the PAM polymer gel including graphene was greater than that of the PAM polymer gel without filler. The gel strength (G'/G") of the PAM polymer gel including graphene was less than that of the PAM polymer gel without filler.

3. Nanocomposite Including Metal Oxide and Nanomaterial

The weight concentration of nanocomposite in the aqueous dispersion was varied from 0.1 wt. % to 1 wt. % in the examples for Sections 3.1 and 3.2, while the weight concentrations of PAM, crosslinker, and potassium chloride were maintained at 4 wt. %, 0.3 wt. %, and 2 wt. %, respectively.

3.1. Zirconium Hydroxide and Graphene Oxide Hybrid ($Zr(OH)_4$-GO)

The filler in this example was a nanocomposite of zirconium hydroxide and graphene oxide. The filler was prepared by microwave irradiation. The filler had a weight concentration of 0.2 wt. % in the aqueous dispersion. The ratio of zirconium hydroxide to graphene oxide in the nanocomposite was 95:5 (this particular nanocomposite will be referred to as ZrG5).

Figure 21:
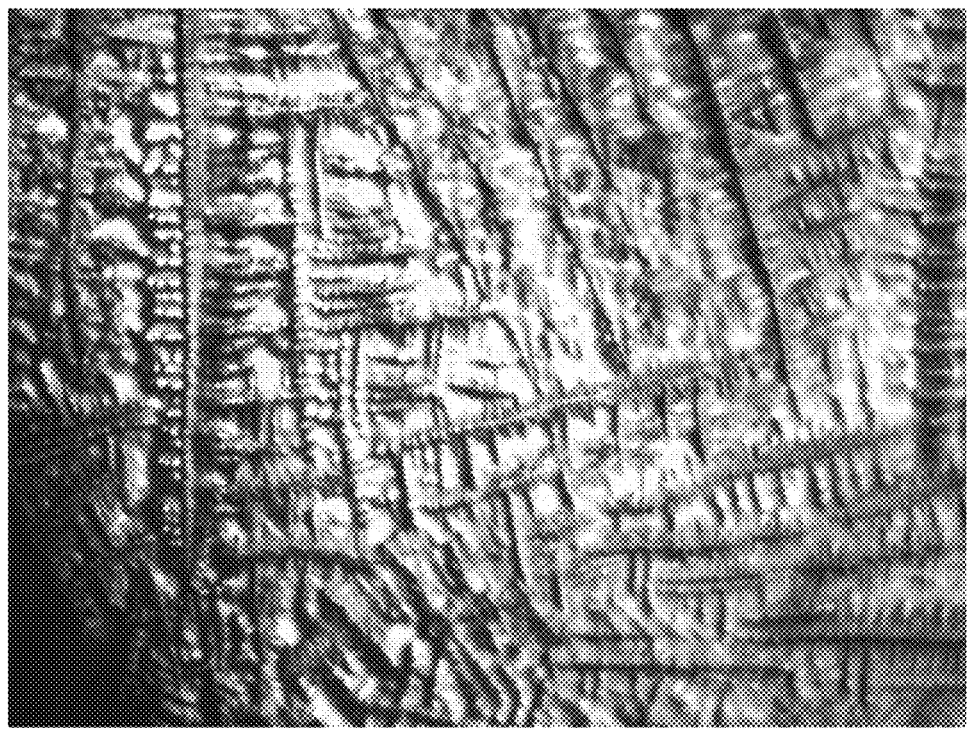
FIG. 21 shows optical microscope images of PAM polymer gels with and without a nanocomposite as filler.
Figure 21:
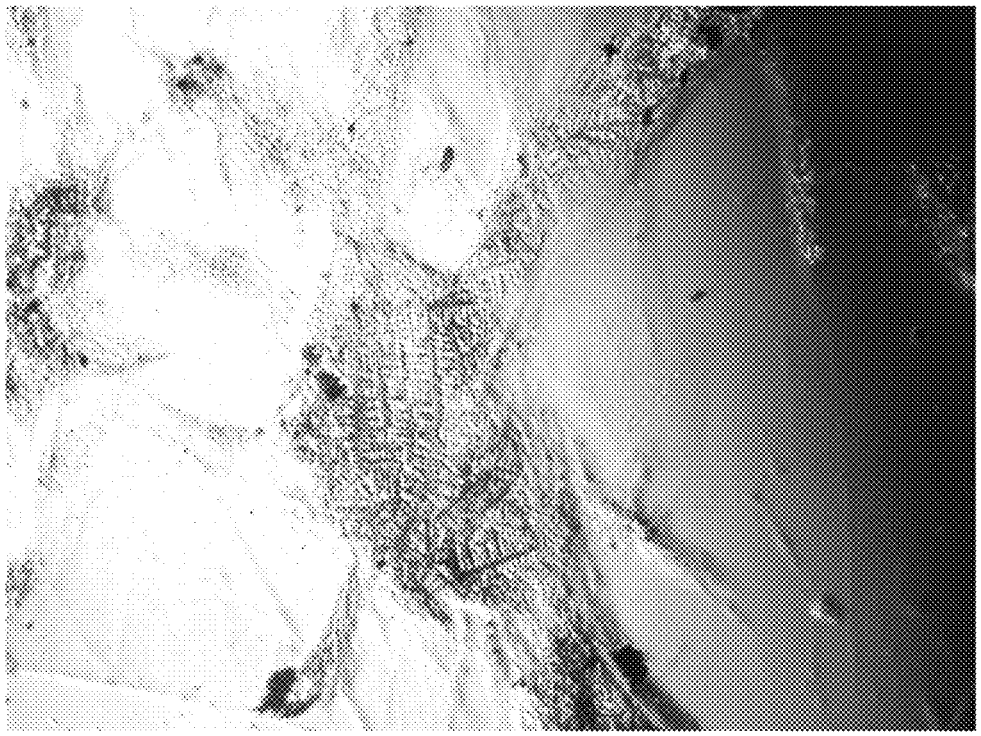

FIG. 21 shows the optical microscope images of PAM polymer gels with and without ZrG5 as filler. The PAM polymer gel including ZrG5 exhibited shorter and more entangled chains in comparison to the PAM polymer gel without filler. The entanglement shows that the PAM polymer gel crosslinked well, but the shorter chain lengths can be indicative of greater chain mobility of the PAM matrix.

Figure 22:
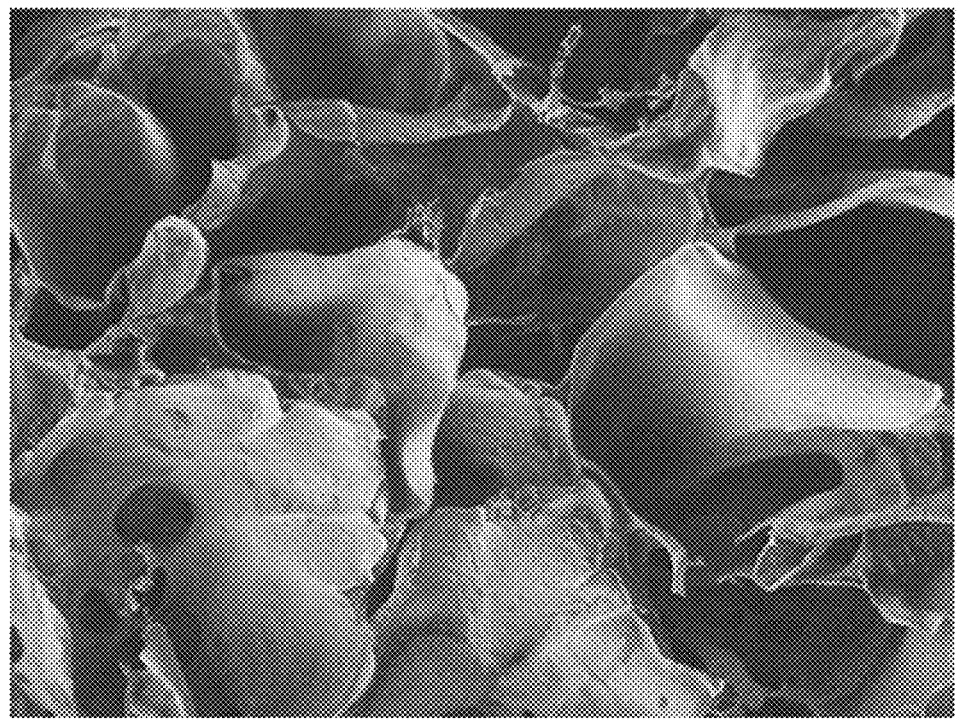
FIG. 22 shows SEM microstructural images of PAM polymer gels with and without a nanocomposite as filler.
Figure 22:
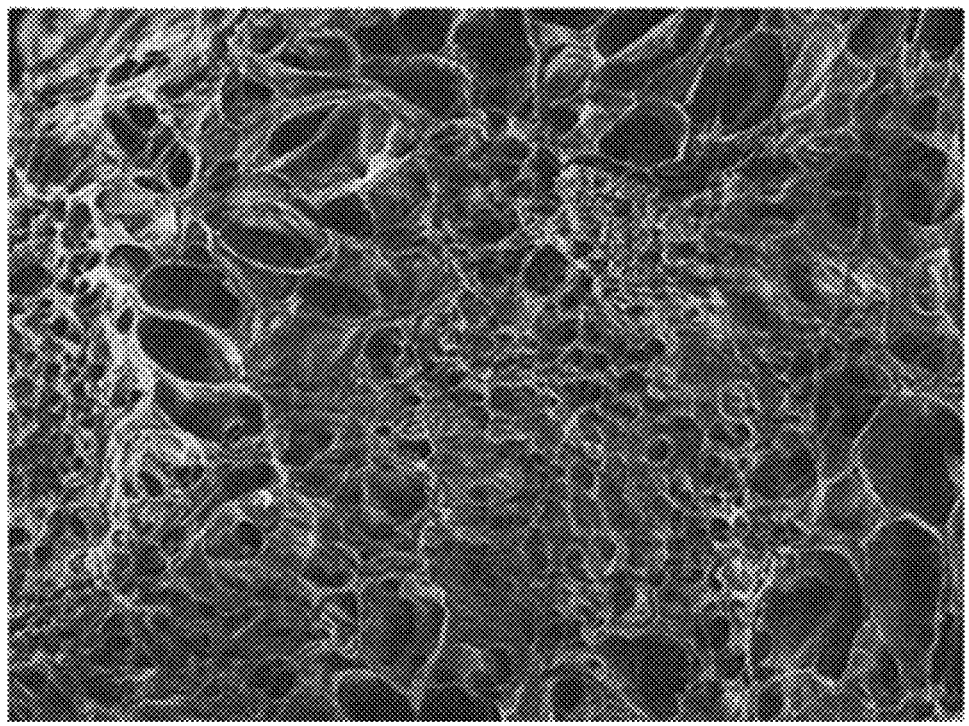

FIG. 22 shows the SEM microstructural images of PAM polymer gels with and without ZrG5 as filler. Both SEM images show porous structure. The PAM polymer gel without filler exhibited larger pores in comparison to the PAM polymer gel including ZrG5. The presence of these pores is a factor for the water holding capacity of the PAM polymer gels during the gelation process. The PAM polymer gel without filler, with its larger pores, is expected to hold more water within its crosslinked structure and therefore exhibit less thermal stability and less desirable viscoelastic properties in comparison to the PAM polymer gel including ZrG5.

The thermal and viscoelastic properties of the PAM polymer gels were compared by preparing the gels by two different procedures. In procedure one (PC1), the filler was added first, followed by PAM and then the crosslinker and salt. In procedure two (PC2), the crosslinker and salt was added first, and then the filler followed by the PAM. In procedure two, the crosslinker was allowed to interact with the filler first, thereby promoting stronger covalent bonding with PAM chains.

Figure 23:
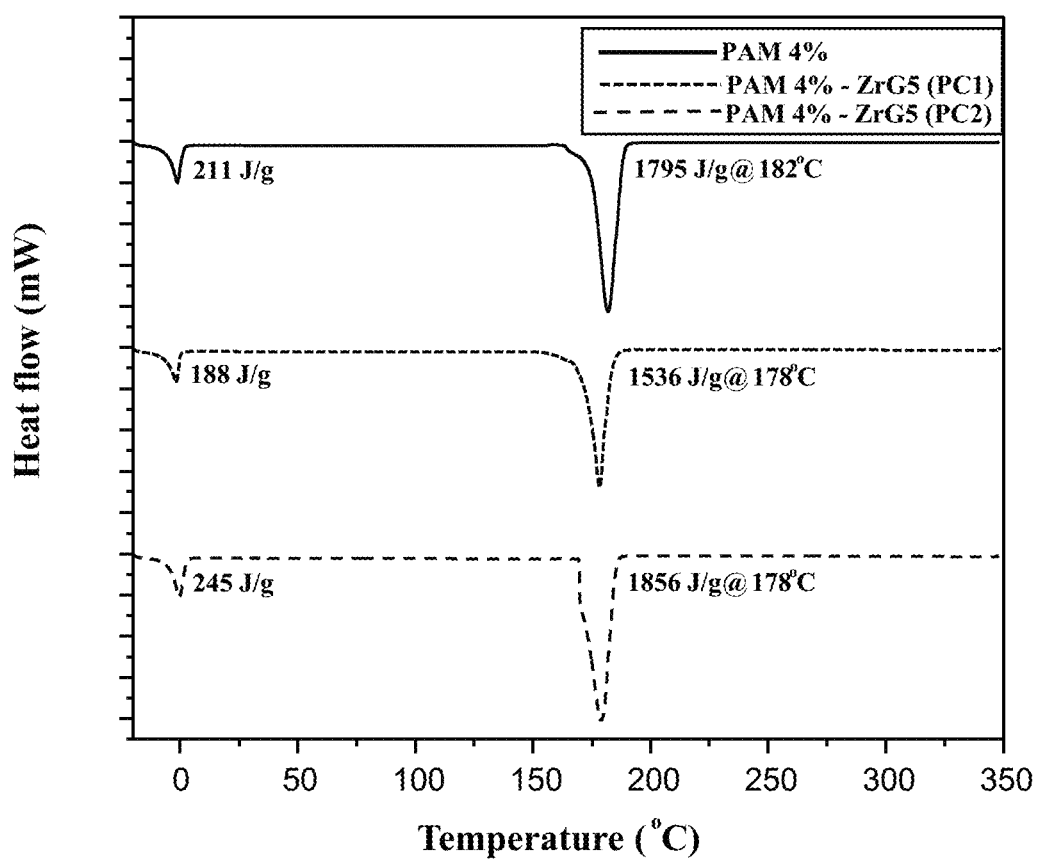
FIG. 23 shows DSC thermograms of PAM polymer gels with and without a nanocomposite as a filler, prepared via different procedures.

FIG. 23 shows the DSC thermograms of PAM polymer gels with and without ZrG5 as a filler, prepared via the two different procedures. The PAM polymer gels prepared by PC2 showed a larger amount of free water in comparison to the PAM polymer gels prepared by PC1. Moreover, the PAM polymer gels prepared by PC2 formed a stronger bond with the filler (ZrG5) as evidenced by the greater degradation enthalpy in comparison to the PAM polymer gels prepared by PC1. This difference can be attributed to the crosslinker providing more interactive sites for covalent bonding with the filler (ZrG5) prior to the addition of PAM. The different procedures did not appear to affect the degradation temperatures of the PAM polymer gels.

Figure 24:
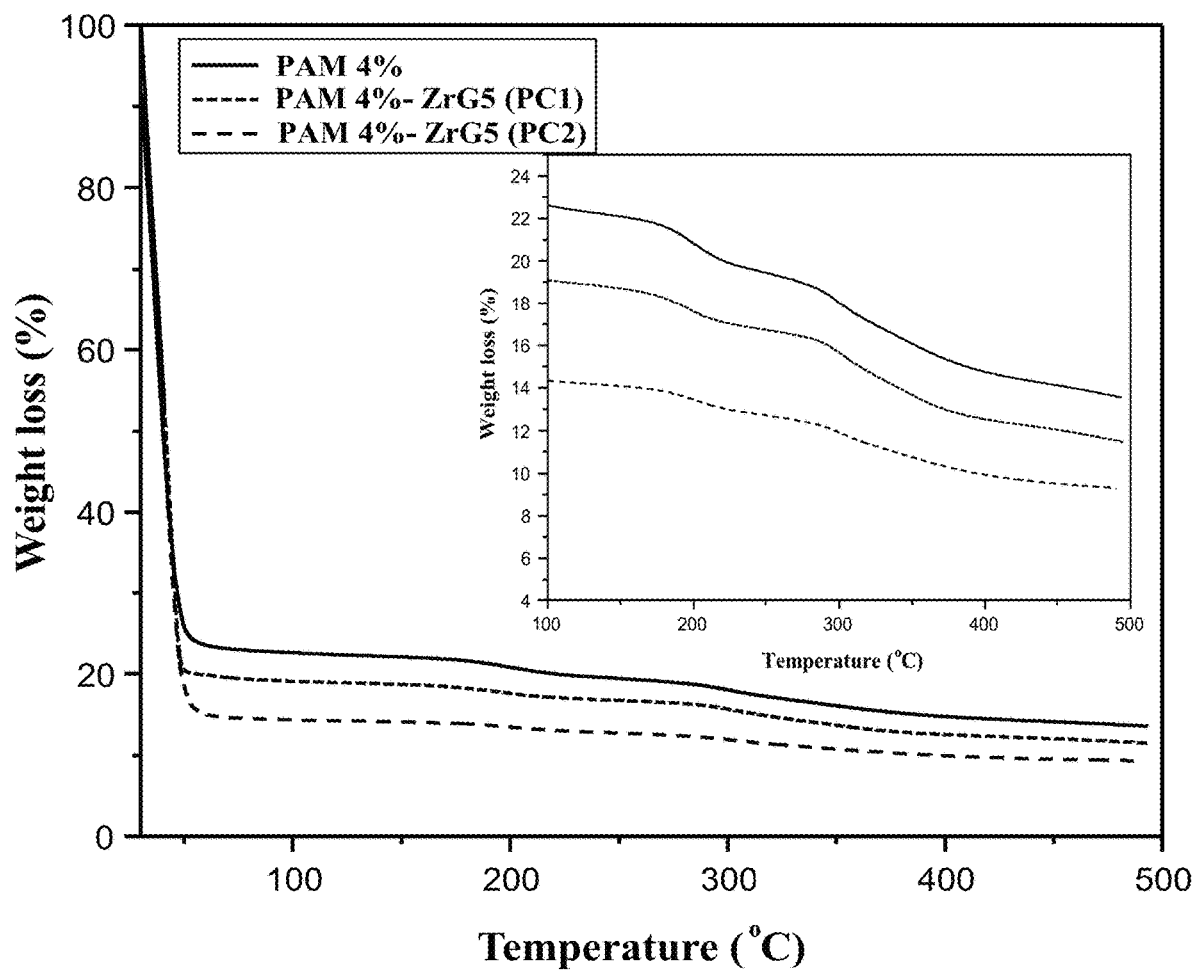
FIG. 24 shows TGA thermograms of PAM polymer gels with and without a nanocomposite as a filler, prepared via different procedures.

FIG. 24 shows the TGA thermograms of PAM polymer gels with and without ZrG5 as a filler, prepared via the two different procedures. Maximum weight loss was recorded at about 100° C. due to the evaporation of water. The weight loss of the PAM polymer gel including ZrG5 and prepared by PC2 was greater than that of the PAM polymer gel including ZrG5 and prepared by PC1. The weight loss of the PAM polymer gel including ZrG5 and prepared by PC1 was greater than that of the PAM polymer gel without filler. The dried PAM polymer gels including ZrG5 (beyond 100° C.) recorded less weight loss (−4% for that prepared by PC2 and −7% for that prepared by PC1) in comparison to the PAM polymer gel without filler (−8%). From the results obtained, it can be concluded that preparing PAM polymer gels with PC2 was more successful in producing PAM polymer gels with better thermal stability than preparing PAM polymer gels with PC1.

Figure 25:
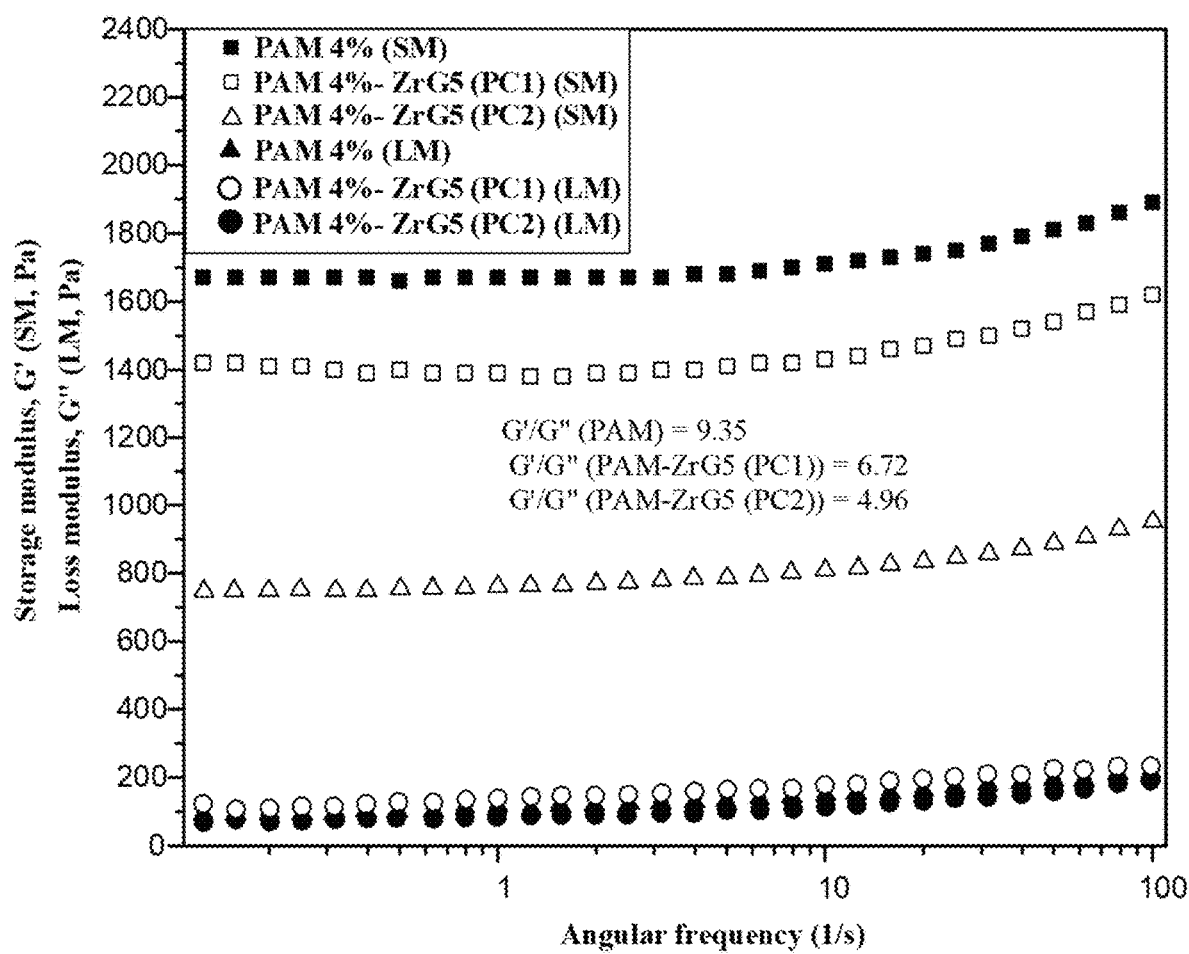
FIG. 25 shows results of a DMA of PAM polymer gels with and without a nanocomposite as a filler, prepared via different procedures.

FIG. 25 is a plot showing the results of a DMA of PAM polymer gels with and without ZrG5 as a filler, prepared via the two different procedures. The elasticity (G') and gel strength (G'/G") of the PAM polymer gels including ZrG5 was less than those of the PAM polymer gel without filler. Moreover, the PAM polymer gels prepared by PC2 appeared to produce weaker PAM polymer gels in comparison to those prepared by PC1.

3.2. Zirconium Oxide and Reduced Graphene Oxide Hybrid ($ZrO_2$-rGO)

The filler in this example was a nanocomposite of zirconium oxide and reduced graphene oxide ($ZrO_2$-rGO). The filler had a weight concentration of 0.2 wt. % in the aqueous dispersion. The ratio of zirconium oxide to reduced graphene oxide in the nanocomposite was 95:5.

Figure 26:
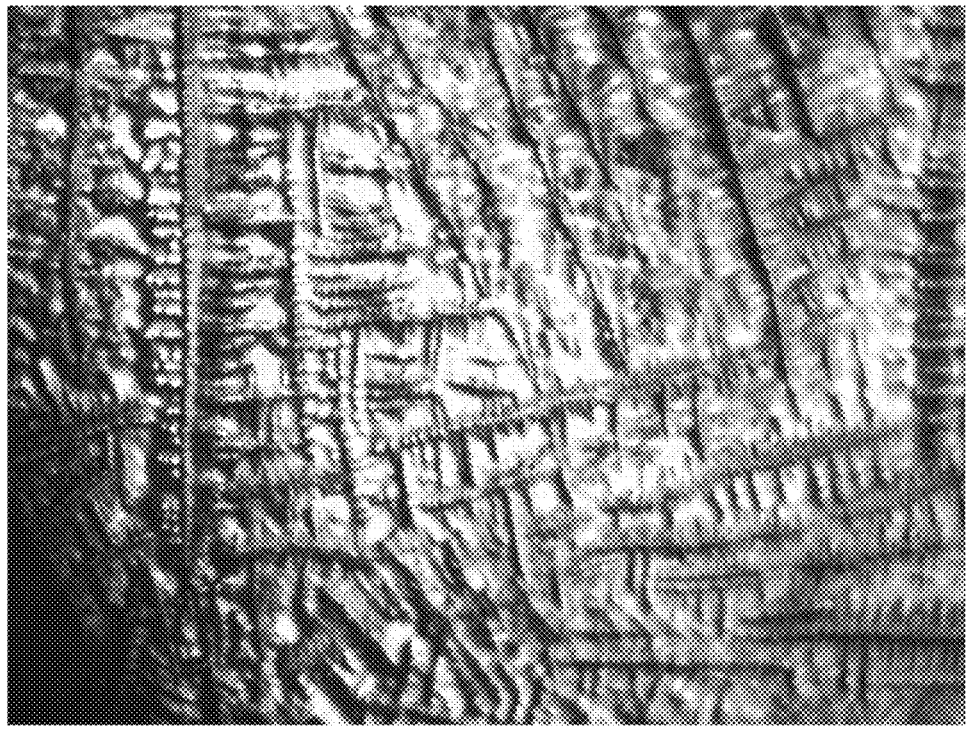
FIG. 26 shows optical microscope images of PAM polymer gels with and without a nanocomposite as filler.
Figure 26:
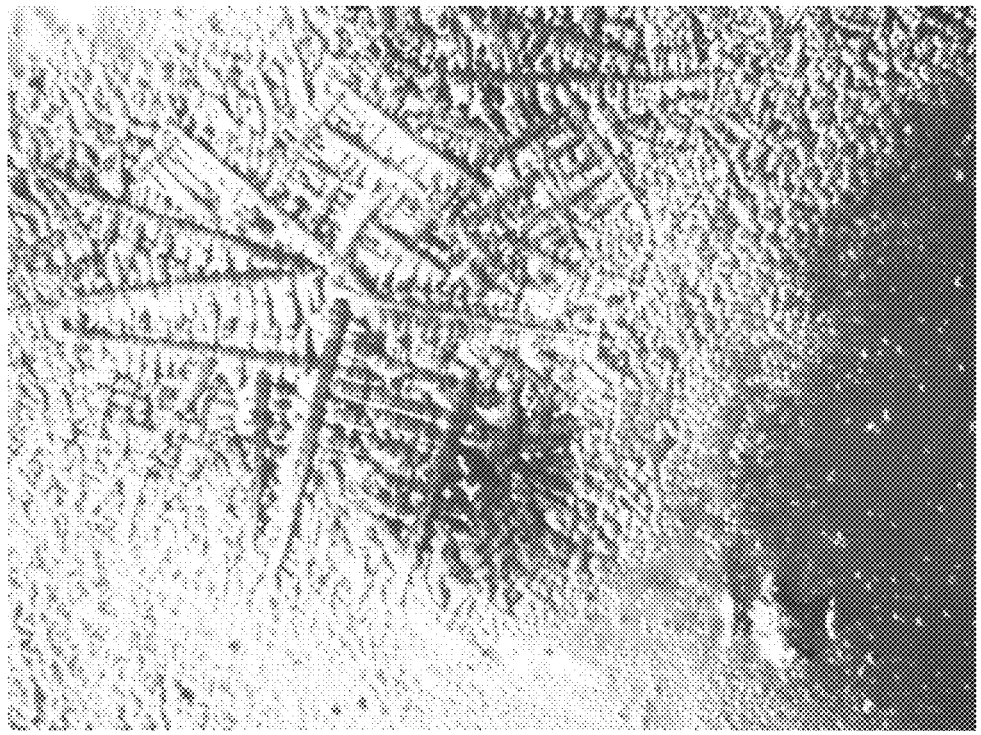

FIG. 26 shows the optical microscope images of PAM polymer gels with and without $ZrO_2$-rGO as filler. The PAM polymer gel including $ZrO_2$-rGO exhibited shorter and more entangled branched chains in comparison to the PAM polymer gel without filler.

Figure 27:
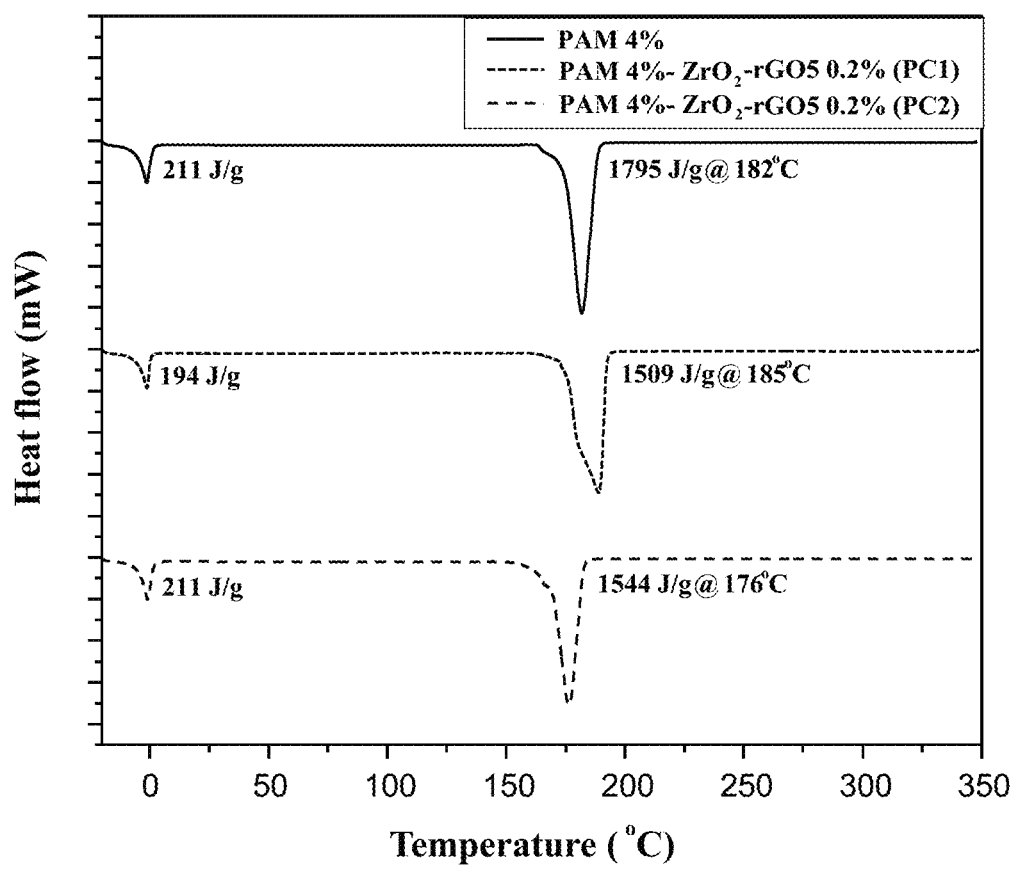
FIG. 27 shows DSC thermograms of PAM polymer gels with and without a nanocomposite as a filler, prepared via different procedures.

FIG. 27 shows the DSC thermograms of PAM polymer gels with and without $ZrO_2$-rGO as a filler, prepared via the two different procedures. The PAM polymer gels prepared by PC2 showed a larger amount of free water in comparison to the PAM polymer gels prepared by PC1. Moreover, the PAM polymer gels prepared by PC2 formed a stronger bond with the filler ($ZrO_2$-rGO) as evidenced by the greater degradation enthalpy in comparison to the PAM polymer gels prepared by PC1. This difference can be attributed to the crosslinker providing more interactive sites for covalent bonding with the filler ($ZrO_2$-rGO) prior to the addition of PAM. The degradation temperature of the PAM polymer gel including $ZrO_2$-rGO was greater by 7° C. in comparison to the PAM polymer gel including ZrG5 (Section 3.1) and greater by 3° C. in comparison to the PAM polymer gel without filler.

Figure 28:
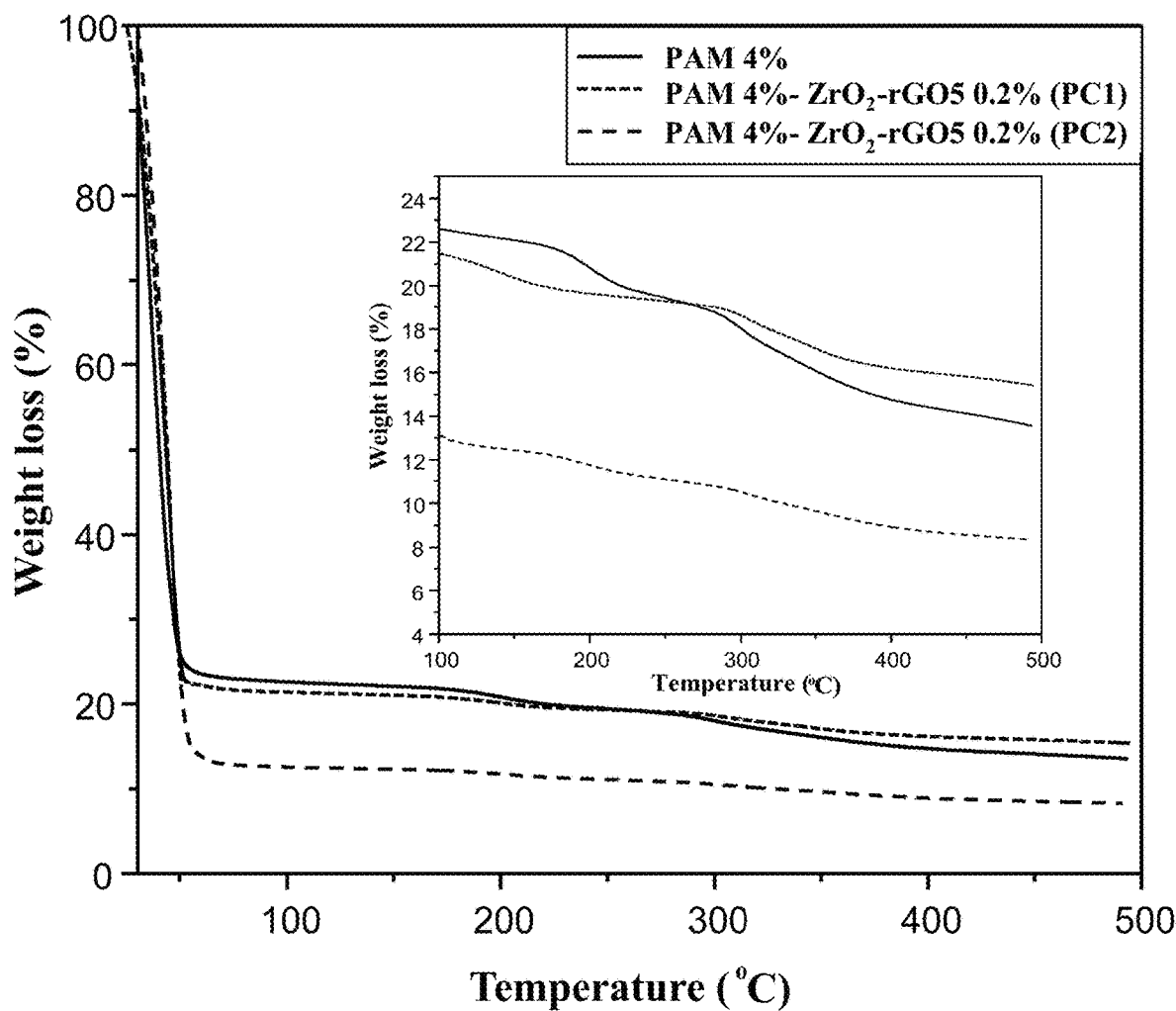
FIG. 28 shows TGA thermograms of PAM polymer gels with and without a nanocomposite as a filler, prepared via different procedures.

FIG. 28 shows the TGA thermograms of PAM polymer gels with and without $ZrO_2$-rGO as a filler, prepared via the two different procedures. Maximum weight loss was recorded at about 100° C. due to the evaporation of water. The weight loss of the PAM polymer gel including $ZrO_2$-rGO and prepared by PC2 was greater than that of the PAM polymer gel without filler. The weight loss of the PAM polymer gel without filler was greater than that of the PAM polymer gel including $ZrO_2$-rGO and prepared by PC1. The dried PAM polymer gels including $ZrO_2$-rGO (beyond 100° C.) recorded less weight loss (−3% for that prepared by PC2 and −5% for that prepared by PC1) in comparison to the PAM polymer gel without filler (−8%).

Figure 29:
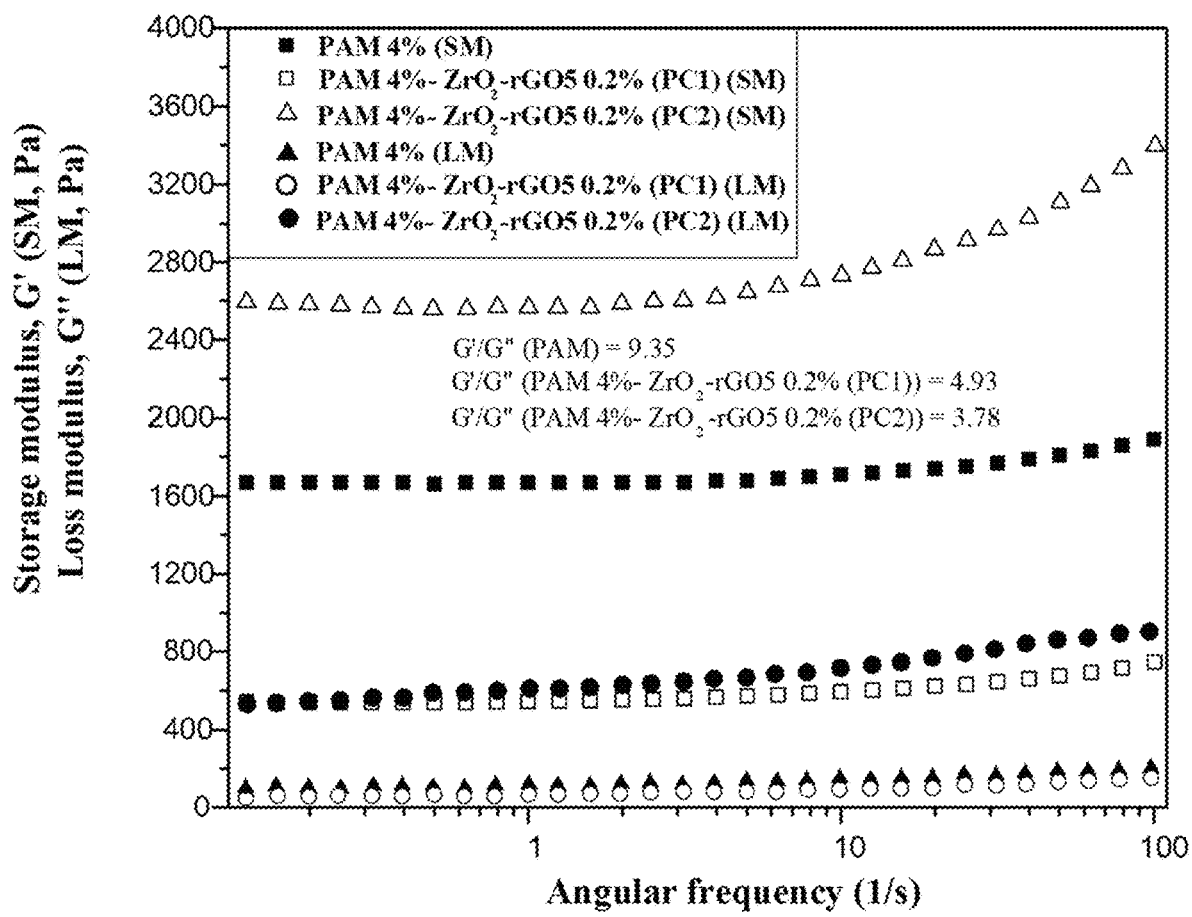
FIG. 29 shows results of a DMA of PAM polymer gels with and without a nanocomposite as a filler, prepared via different procedures.

FIG. 29 is a plot showing the results of a DMA of PAM polymer gels with and without $ZrO_2$-rGO as a filler, prepared via the two different procedures. The elasticity (G') of the PAM polymer gels prepared by PC1 was less than those prepared by PC2. This difference suggests that mixing the crosslinker with the filler prior to the addition of PAM improved the interaction between the filler and PAM. Moreover, the increase in the elasticity can be attributed to the increased amount of free water in the PAM polymer gel (for PC2) that ultimately increased hydrogen bonding in the PAM polymer gel. PC2, however, also appeared to reduce the resultant gel strength as a result of an increase in weak, secondary hydrogen bonds (also reflected by the reduced degradation enthalpy). From the results obtained, it can be concluded that preparing PAM polymer gels with PC2 was more successful in producing PAM polymer gels with better thermal stability than preparing PAM polymer gels with PC1.

4. Mixed Filler Including Metal Oxide and Nanomaterial

The synergistic effect of the metal oxide and nanomaterial was investigated by mixing them in a solution without microwave irradiation. The weight concentration of the metal oxide in the aqueous dispersion was varied from 0.1 wt. % to 1 wt. % while the weight concentration of the nanomaterial in the aqueous dispersion was varied from 0.01 wt. % to 0.1 wt. % in the example for Section 4.1. The weight concentrations of PAM, crosslinker, and potassium chloride were maintained at 4 wt. %, 0.3 wt. %, and 2 wt. %, respectively.

4.1. Mixture of Zirconium Hydroxide and Graphene Oxide

The filler in this example was a mixture of zirconium hydroxide and graphene oxide ($Zr(OH)_4$+GO). The zirconium hydroxide had a weight concentration of 0.5 wt. % in the aqueous dispersion, and the graphene oxide had a weight concentration of 0.05 wt. % in the aqueous dispersion. The results of this filler were compared with the results of the PAM polymer gel with ZrG5 as filler (Section 3.1).

Figure 30:
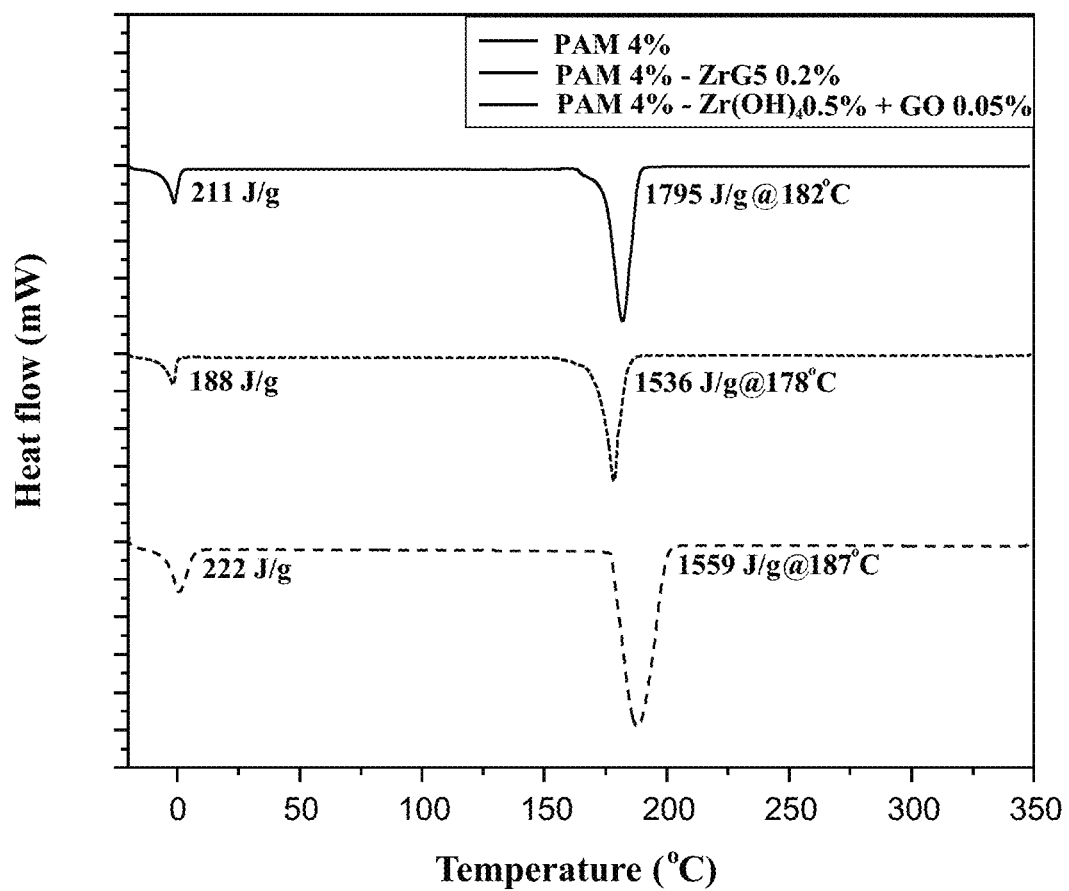
FIG. 30 shows DSC thermograms of PAM polymer gels with a mixture of metal oxide and nanomaterial versus a nanocomposite as fillers.

FIG. 30 shows the DSC thermograms of PAM polymer gels with $Zr(OH)_4$+GO versus ZrG5 as fillers. Mixing $Zr(OH)_4$ with GO in a solution ($Zr(OH)_4$+GO) prior to adding to the precursor polymer solution increased the degradation temperature and amount of free water in the resultant PAM polymer gel but lowered the degradation enthalpies in comparison to the PAM polymer gel without filler. These differences can be attributed to the increased interaction competition between the hydrophilic groups and the water molecules through hydrogen bonding instead of covalent bonding.

Figure 31:
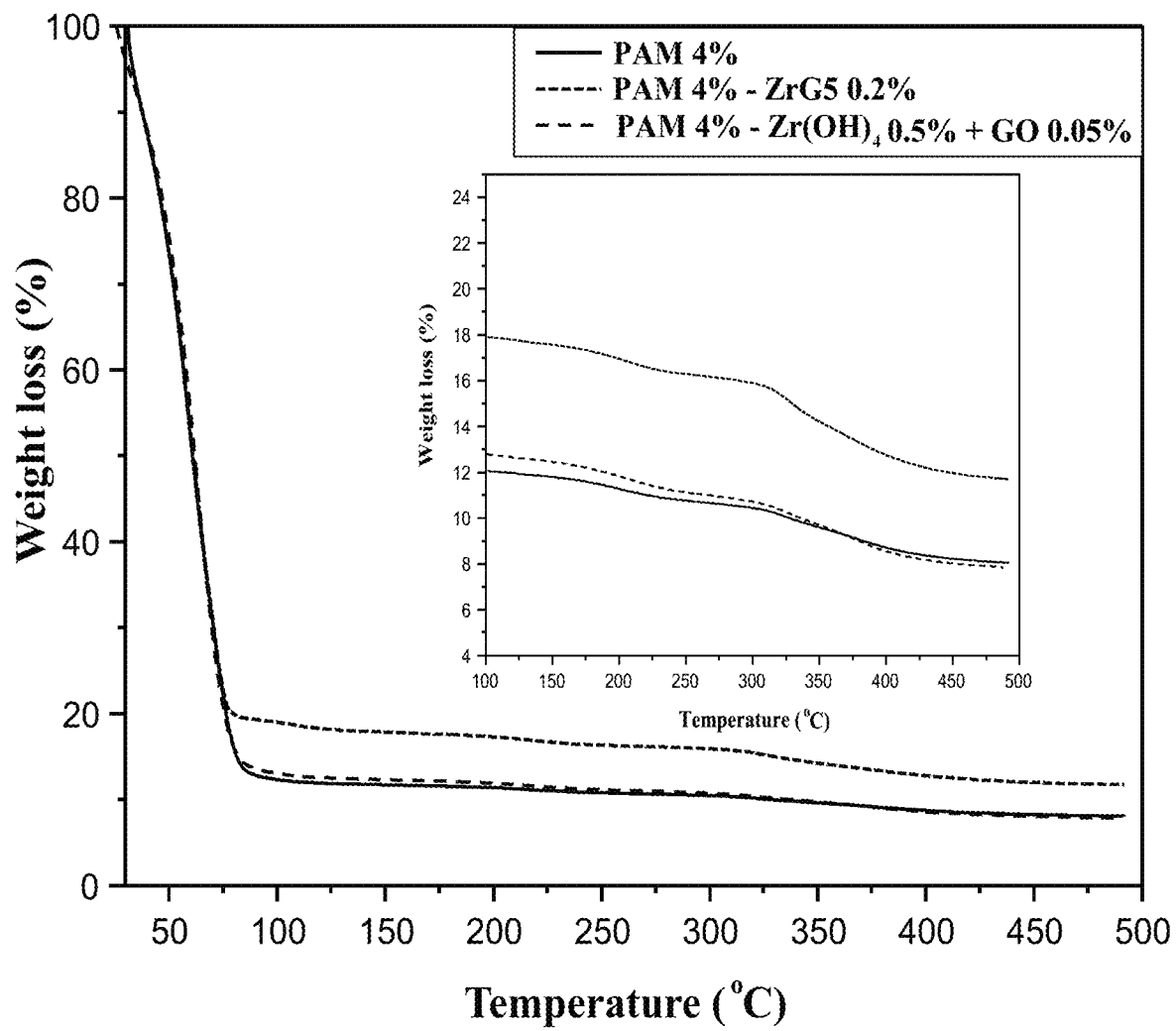
FIG. 31 shows TGA thermograms of PAM polymer gels with a mixture of metal oxide and nanomaterial versus a nanocomposite as fillers.

FIG. 31 shows the TGA thermograms of PAM polymer gels with $Zr(OH)_4$+GO versus ZrG5 as fillers. Maximum weight loss was recorded at about 100° C. due to the evaporation of water. The dried PAM polymer gels including filler (beyond 100° C.) recorded less weight loss (7% for the PAM polymer gel including ZrG5 and −5% for the PAM polymer gel including $Zr(OH)_4$+GO) in comparison to the PAM polymer gel without filler (−8%).

Figure 32:
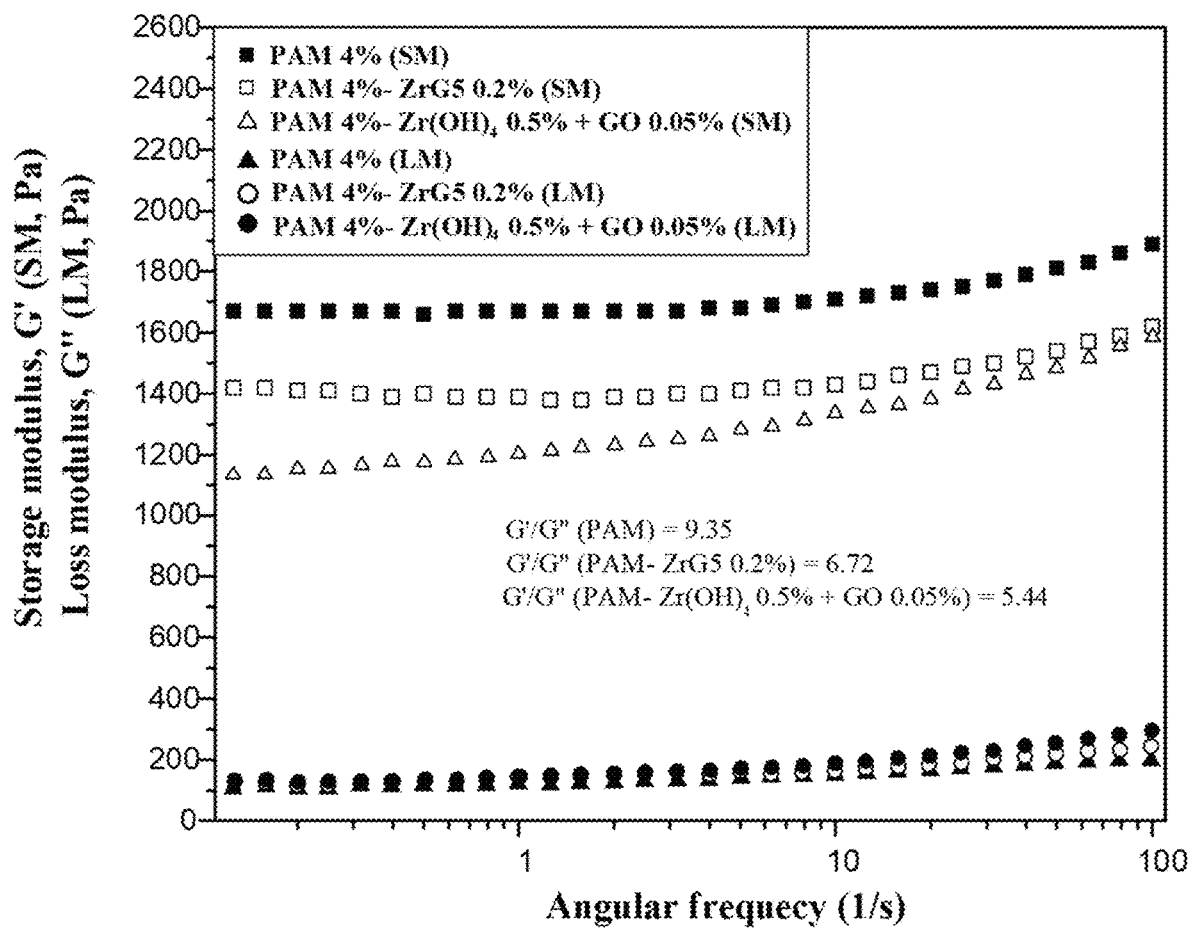
FIG. 32 shows results of a DMA of PAM polymer gels with a mixture of metal oxide and nanomaterial versus a nanocomposite as fillers.

FIG. 32 is a plot showing the results of a DMA of PAM polymer gels with $Zr(OH)_4$+GO versus ZrG5 as fillers. The larger amount of hydrophilic groups in the fillers encouraged more hydrogen bonding instead of covalent bonding. However, the elasticity (G') and gel strength (G'/G") of the PAM polymer gels including filler were less than those of the PAM polymer gel without filler. The results of the analysis show that the thermal and viscoelastic performance of the PAM polymer gels can be improved by the synergy of zirconium oxide and graphene together (for example, in a complex or hybrid as in Section 3.1) in contrast to the mere addition of graphene oxide.

5. Effect of Crosslinker

Crosslinkers are chemical compounds that can be used to covalently bond materials. However, excess amounts of crosslinker can lead to syneresis, that is, the repulsion of water out of a gel structure due to shrinkage in gel volume. Additionally, the amount of crosslinker added can affect the gelation time and gel strength. The effect of using different types of crosslinkers such as organic crosslinkers and thermo-responsive crosslinkers on the performance of PAM polymer gels was investigated at different weight concentrations ranging from 0.1 wt. % to 1 wt. %. The effect of weight ratio combinations of multiple crosslinkers on the performance of PAM polymer gels was also investigated. In this example, PAM polymer gels were prepared with organic crosslinkers: hydroquinone (HQ) and hexamethylenetetramine (HMT). The PAM polymer gels were prepared with 0.15 wt. % HQ and HMT (equal parts), 0.3 wt. % HQ and HMT (equal parts), and a HQ:HMT ratio of 1:2.

Figure 33:
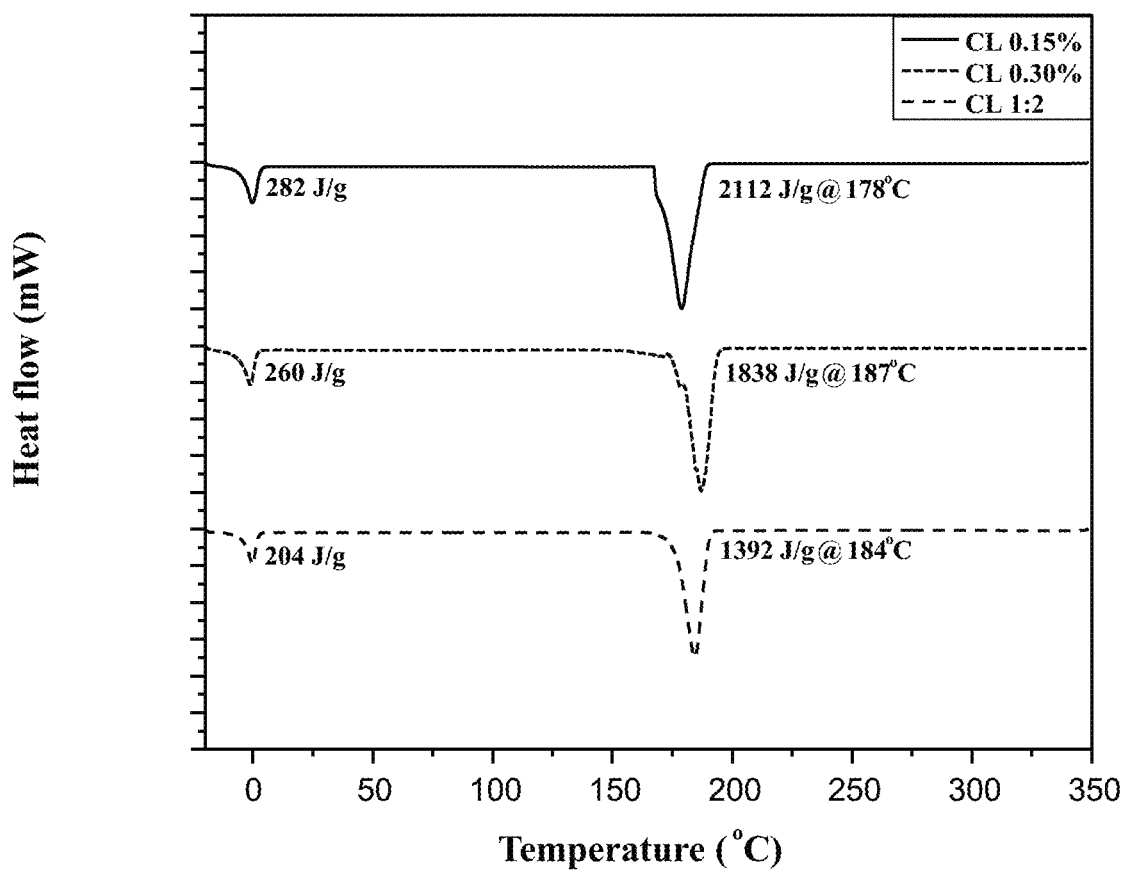
FIG. 33 shows DSC thermograms of PAM polymer gels with zirconium hydroxide as filler at various weight concentrations of organic crosslinker.

FIG. 33 shows the DSC thermograms of PAM polymer gels with zirconium hydroxide as filler (0.8 wt. %) at various weight concentrations of the organic crosslinker. The PAM polymer gels prepared with a smaller amount of organic crosslinkers (0.15 wt. %) exhibited an increased amount of free water and greater degradation enthalpy. This difference can be attributed to the slowed reaction between the crosslinker and other materials in the PAM polymer gel, thereby allowing the PAM and filler to interact with one another instead of having to compete with the excess crosslinker. However, the degradation temperature of the PAM polymer gel also decreased for smaller amounts of organic crosslinkers, indicating the formation of shorter chains in comparison to the PAM polymer gels prepared with larger amounts of organic crosslinkers. The shorter chains can exhibit greater PAM chain mobility at cooler temperatures, which can also result in quicker degradation.

Figure 34:
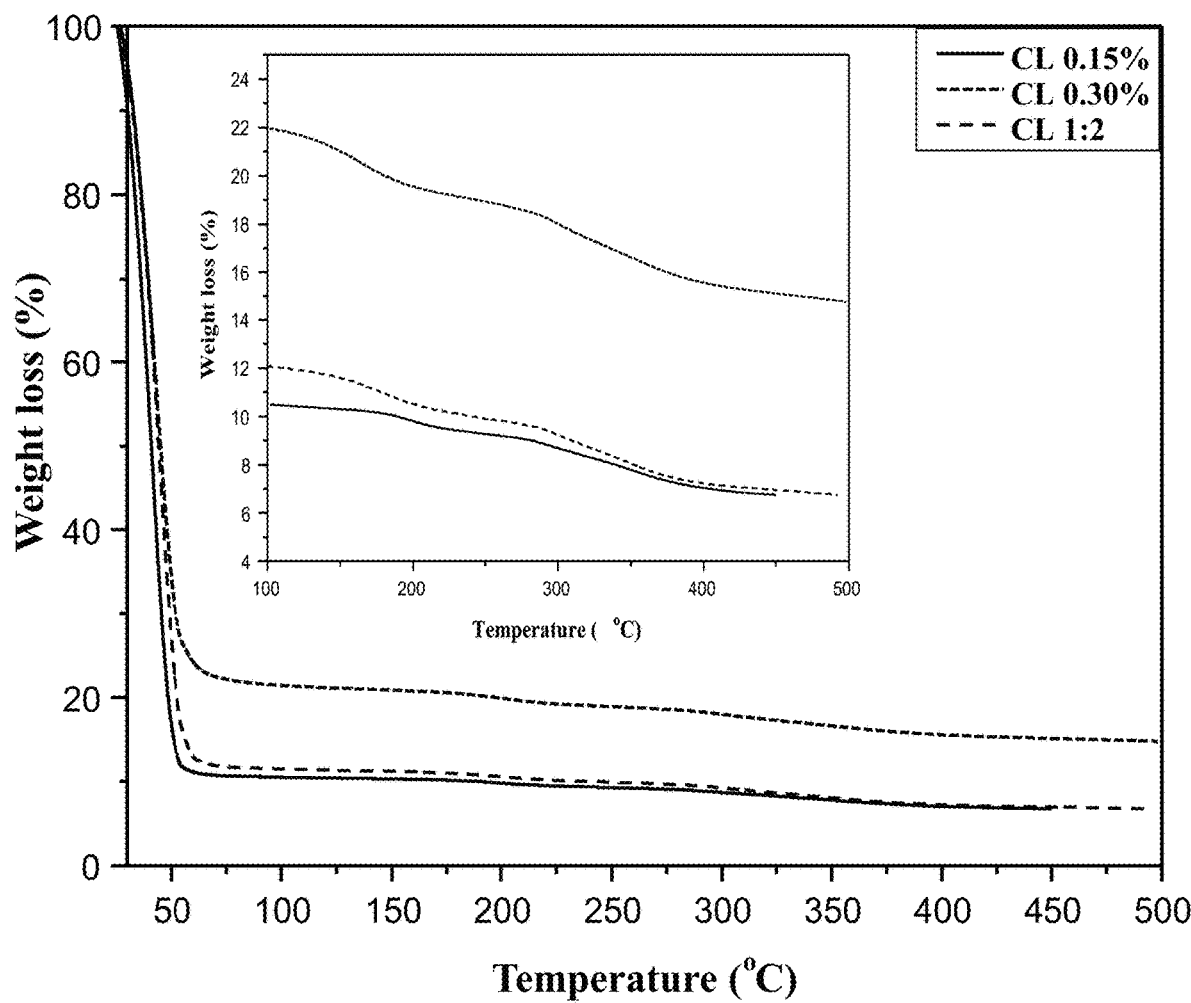
FIG. 34 shows TGA thermograms of PAM polymer gels with zirconium hydroxide as filler at various weight concentrations of organic crosslinker.

FIG. 34 shows the TGA thermograms of PAM polymer gels with zirconium hydroxide as filler (0.8 wt. %) at various weight concentrations of the organic crosslinker. Maximum weight loss was recorded at about 100° C. due to the evaporation of water. The weight loss of the PAM polymer gel including zirconium hydroxide prepared with 0.3 wt. % organic crosslinker was the greatest in comparison to that of the PAM polymer gel including zirconium hydroxide prepared with 0.15 wt. % and that of the PAM polymer gel including zirconium hydroxide prepared with organic crosslinkers with a 1:2 ratio of HQ:HMT. The dried PAM polymer gels including zirconium hydroxide (beyond 100° C.) recorded weight losses of −8% (0.15 wt. % organic crosslinker), −6% (0.3 wt. % organic crosslinker), and −4% (HQ:HMT ratio of 1:2).

Figure 35:
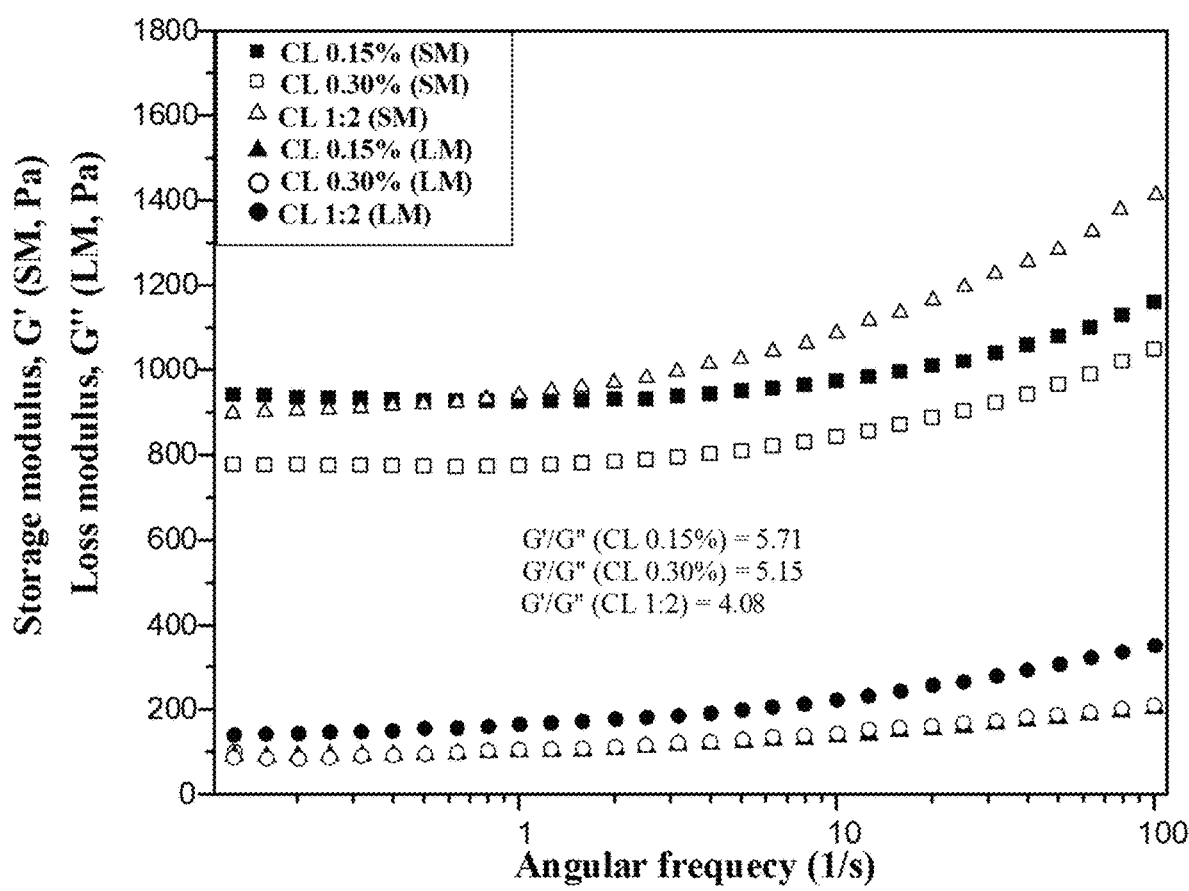
FIG. 35 shows results of a DMA of PAM polymer gels with zirconium hydroxide as filler at various weight concentrations of organic crosslinker.

FIG. 35 is a plot showing the results of a DMA of PAM polymer gels with zirconium hydroxide as filler (0.8 wt. %) at various weight concentrations of the organic crosslinker. In general, the elasticity (G') and gel strength (G'/G") of the PAM polymer gels were enhanced when prepared with less crosslinker. This characteristic can be attributed to the reduced competition between the filler and crosslinker for the interactive sites on the PAM surface. Additionally, the DMA results showed that the gel strength (G'/G") was reduced for all of the PAM polymer gels when the amount of HMT increased while keeping the amount of HQ constant (HQ:HMT ratio of 1:2).

Both properties (i.e. thermal and viscoelastic properties) of PAM hydrogels were greatly affected by ratio of HQ to HMT. This is because, when the HMT wt % is increased while maintaining the HQ wt % same (i.e. HQ at 0.15 wt % and HMT 0.3 wt %), there will be less interactive sites on the HQ for the formaldehyde groups that will be formed upon decomposition of HMT. This will lead to, the remaining formaldehyde to compete with the filler for the interactive sites on the PAM surface, thus lowering the interaction between PAM and filler.

6. Effect of Polyacrylamide Weight and Concentration

The effect of molecular weight (MW) of PAM and PAM weight concentration on PAM polymer gel performance was investigated. The molecular weights of PAM tested were small MW PAM (500,000 Dalton to 600,000 Dalton), medium MW PAM (600,001 Dalton to 1,500,000 Dalton) and large MW PAM (greater than 1,500,000 Dalton). The PAM weight concentration was varied from 0.5 wt. % to 6 wt. %. In this example, PAM polymer gels were prepared with 1 wt. % small MW PAM, 2 wt. % small MW PAM, and 4 wt. % small MW PAM. Each of the PAM polymer gels also had a weight concentration of 0.8 wt. % of zirconium hydroxide as filler. The weight concentrations of crosslinker and potassium chloride were maintained at 0.3 wt. % and 2 wt. %, respectively.

Figure 36:
FIG. 36 shows optical microscope images of PAM polymer gels with zirconium hydroxide at various weight concentrations of PAM.
Figure 36:
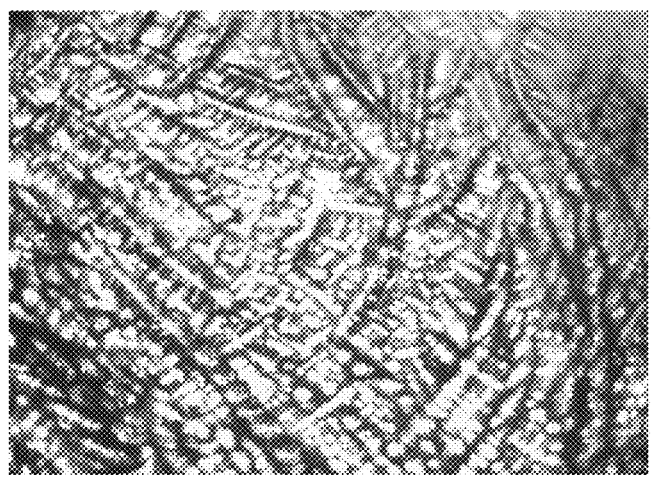
Figure 36:
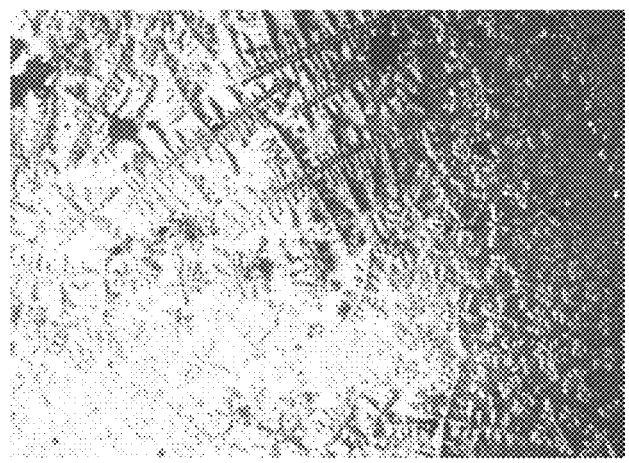

FIG. 36 shows the optical microscope images of small MW PAM polymer gels with zirconium hydroxide at various weight concentrations of PAM. Long and entangled chains were observed. These characteristics indicate that the PAM polymer gels were crosslinked well.

Figure 37:
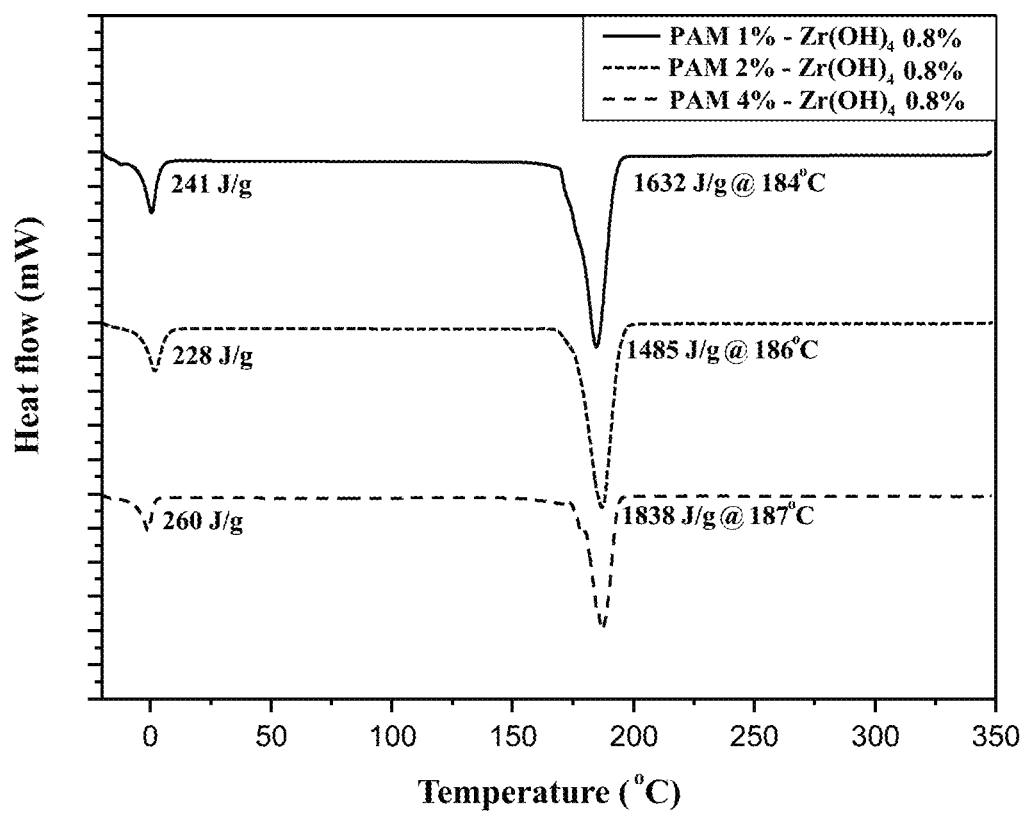
FIG. 37 shows DSC thermograms of PAM polymer gels with zirconium hydroxide at various weight concentrations of PAM.

FIG. 37 shows the DSC thermograms of small MW PAM polymer gels with zirconium hydroxide at various weight concentrations of PAM. The PAM polymer gels had similar degradation temperatures even when prepared with decreased amounts of PAM. However, the PAM polymer gel including zirconium hydroxide and prepared with 4 wt. % of PAM attained the largest degradation enthalpy. This characteristic can indicate that the increased amount of PAM resulted in stronger interactions between the components in the PAM polymer gel.

Figure 38:
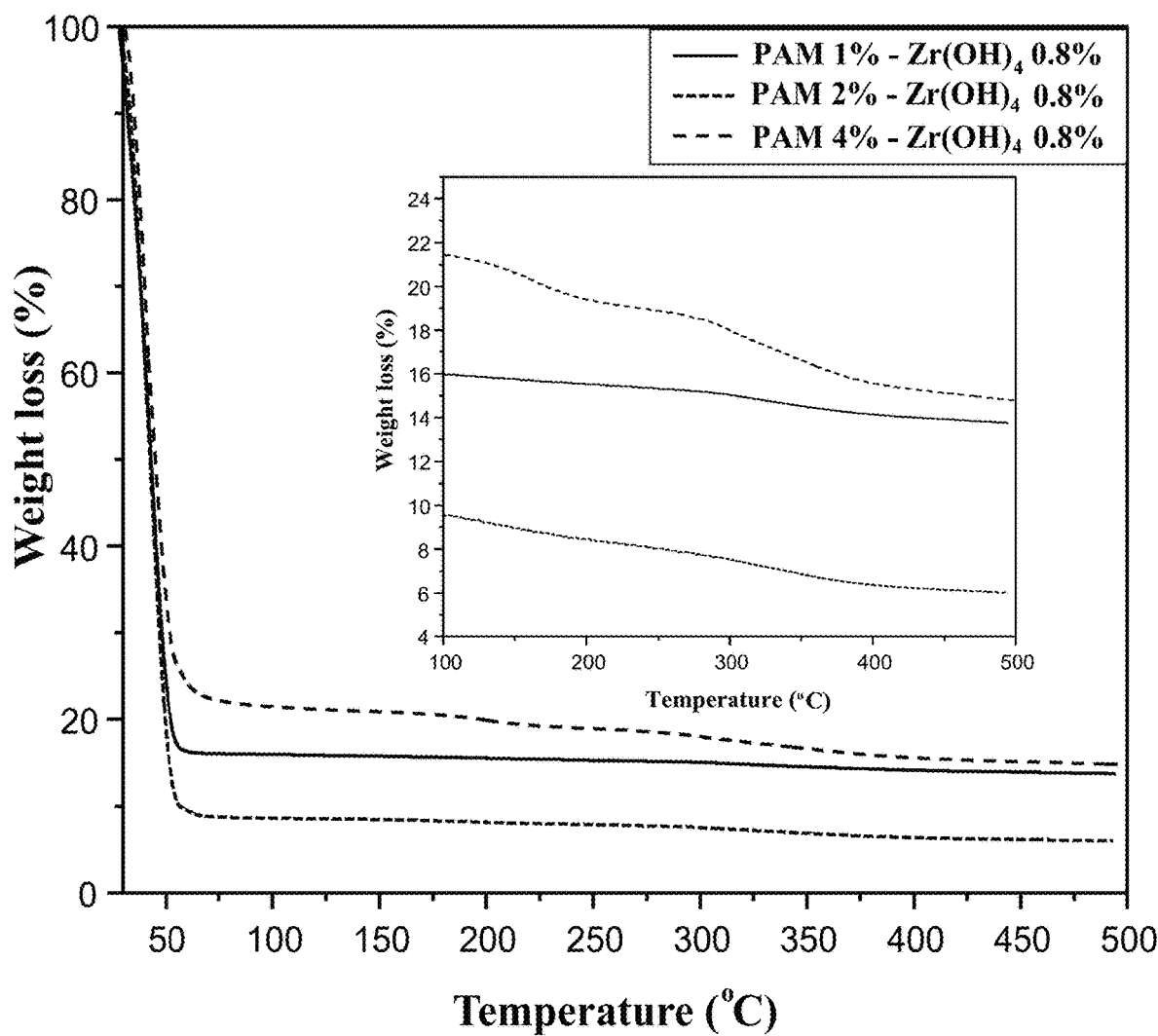
FIG. 38 shows TGA thermograms of PAM polymer gels with zirconium hydroxide at various weight concentrations of PAM.

FIG. 38 shows the TGA thermograms of small MW PAM polymer gels with zirconium hydroxide at various weight concentrations of PAM. Maximum weight loss was recorded at about 100° C. due to the evaporation of water. The weight loss of the PAM polymer gel including zirconium hydroxide and prepared with 2 wt. % PAM was the greatest, while the weight loss of the PAM polymer gel including zirconium hydroxide and prepared with 4 wt. % PAM was the least. The dried PAM polymer gels including zirconium hydroxide (beyond 100° C.) recorded weight losses of −2% (1 wt. % PAM), −3% (2 wt. % PAM), and −6% (4 wt. % PAM). The relationship of increased weight loss with the increase in PAM weight concentration can mean that the PAM polymer gels tend to degrade more easily with increasing amounts of PAM.

Figure 39:
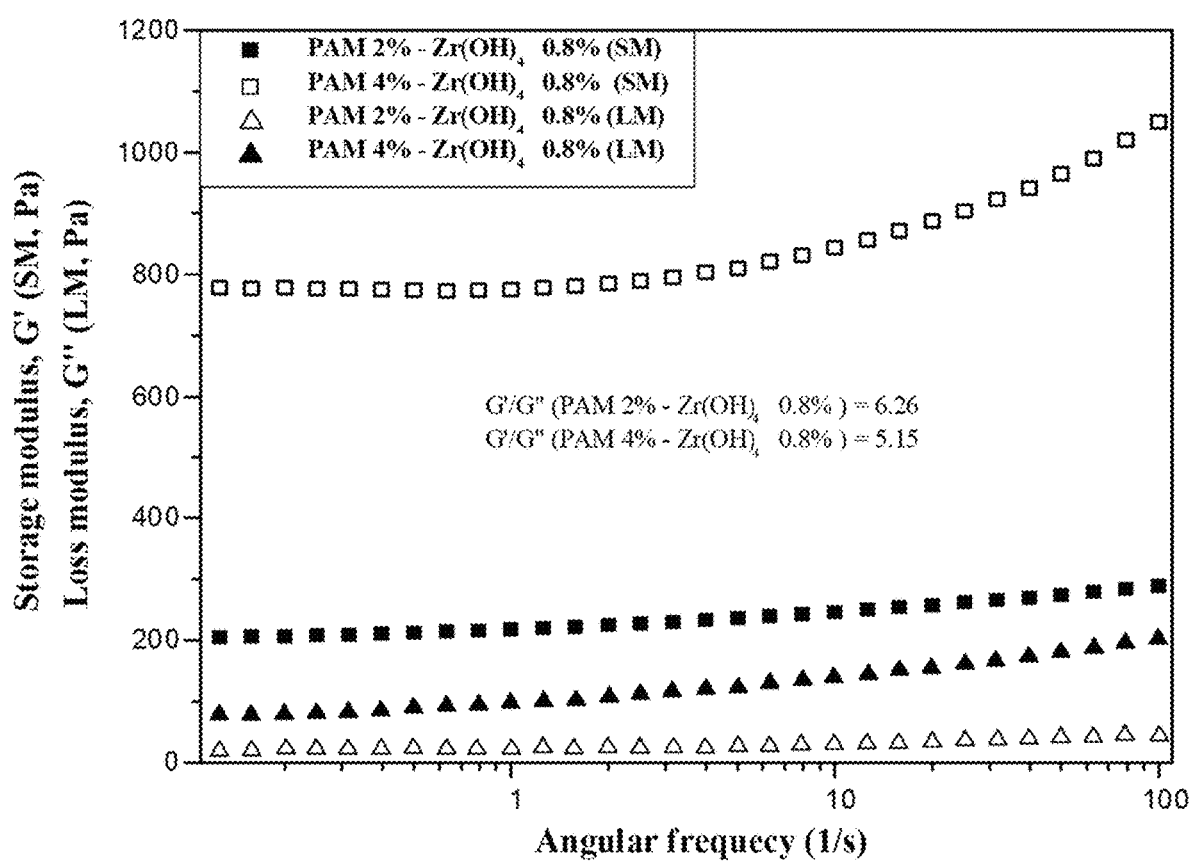
FIG. 39 shows results of a DMA of PAM polymer gels with zirconium hydroxide at various weight concentrations of PAM.

FIG. 39 is a plot showing the results of a DMA of small MW PAM polymer gels with zirconium hydroxide at various weight concentrations of PAM. The elasticity (G') and gel strength (G'/G") of the PAM polymer gel with zirconium hydroxide and prepared with 4 wt. % PAM was greater in comparison to the PAM polymer gel with zirconium hydroxide and prepared with less PAM (2 wt. % PAM). This difference can be attributed to the increased interaction between the PAM and filler due to the increased amount of PAM.

7. Effect of pH

The effect of pH on the performance of PAM polymer gels was investigated. The PAM polymer gels were tested in acidic (pH from 3 to 6) and alkaline (pH from 8 to 12) environments. The weight concentrations of the filler, crosslinker, and PAM in the aqueous dispersion were varied from 0.1 wt. % to 1 wt. %, 0.1 wt. % to 0.6 wt. %, and 1 wt. % to 6 wt. %, respectively. In this example, PAM polymer gel was prepared with 4 wt. % PAM, 0.8 wt. % zirconium hydroxide as filler, and 0.3 wt. % crosslinker. This PAM polymer gel was tested in an acidic environment (pH from 4 to 5) and an alkaline environment (pH from 10 to 11).

Figure 40:
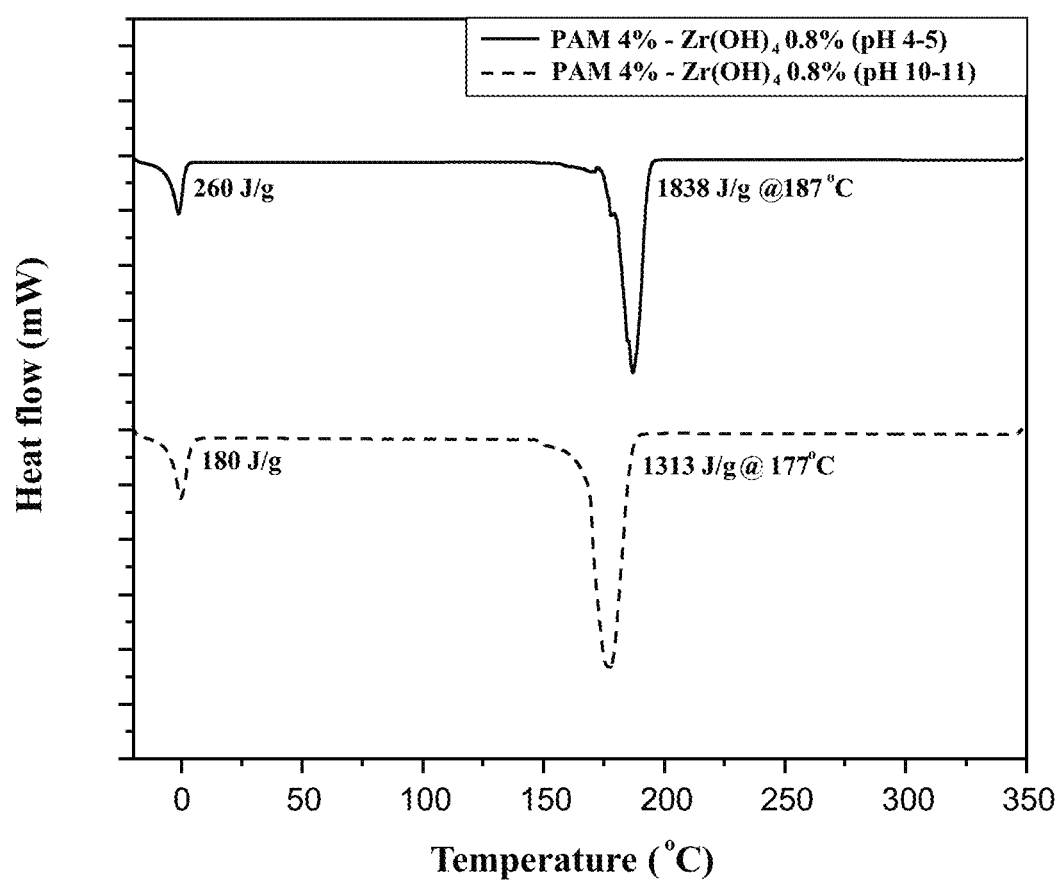
FIG. 40 shows DSC thermograms of PAM polymer gels with zirconium hydroxide as filler at various pH levels.

FIG. 40 shows the DSC thermograms of PAM polymer gels with zirconium hydroxide as filler at various pH levels. The degradation temperature and enthalpy of the PAM polymer gels were reduced at increased pH levels. This trend can be due to the alkaline environment demoting the decomposition of HMT to form formaldehyde, which in turn decreased the availability of crosslinking sites with PAM. This attribute can lead to the formation of weaker polymer chains and increase chain mobility of the PAM polymer gel at cooler temperatures.

Figure 41:
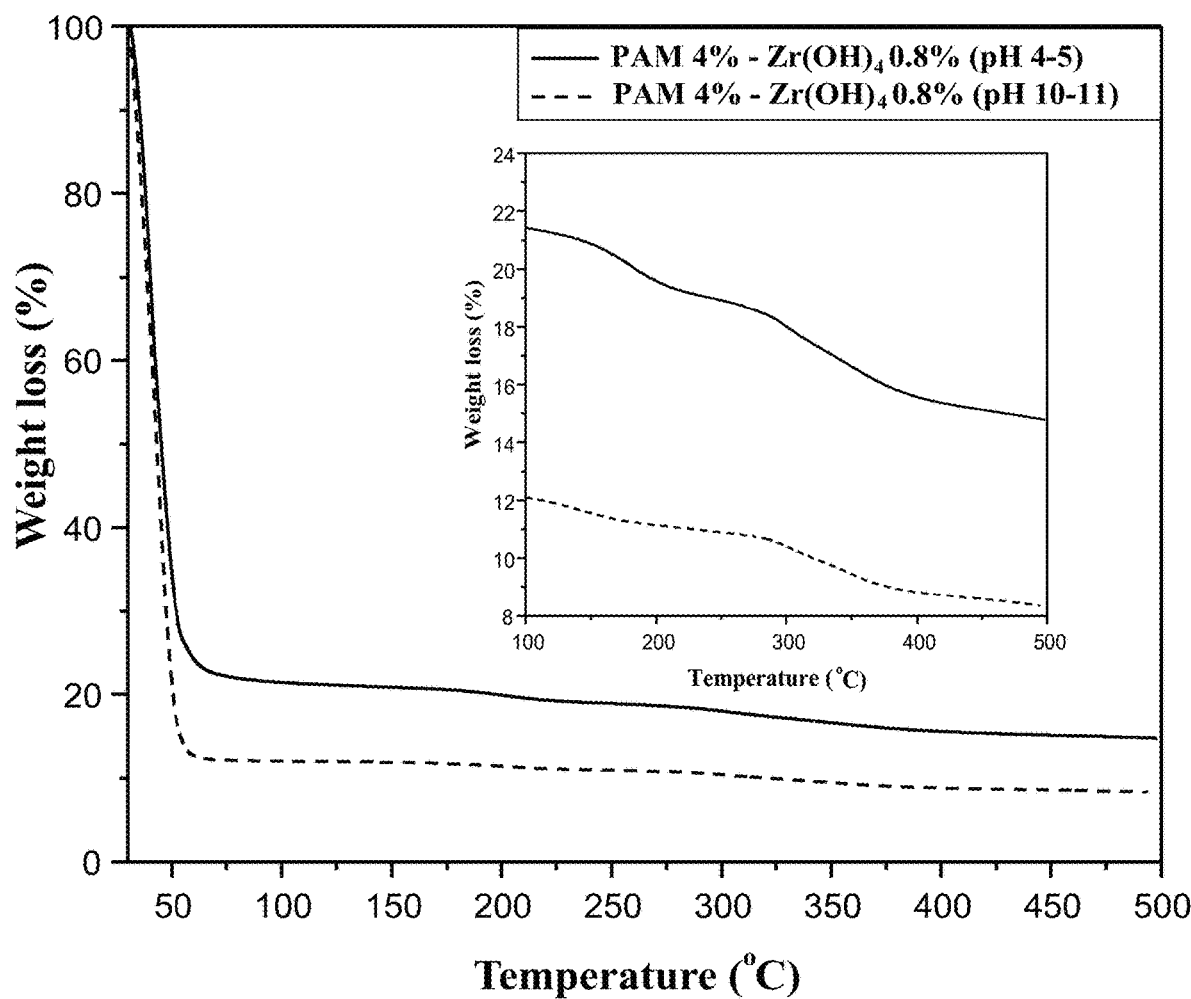
FIG. 41 shows TGA thermograms of PAM polymer gels with zirconium hydroxide as filler at various pH levels.

FIG. 41 shows the TGA thermograms of PAM polymer gels with zirconium hydroxide as filler at various pH levels. Maximum weight loss was recorded at around 100° C. due to the evaporation of water whereby alkaline environment promoted more water loss. The dried PAM-Zr(OH)$_4$ hydrogel at higher pH i.e. beyond 100° C. recorded more weight loss up to 6% in comparison to dried PAM-Zr(OH)$_4$ in lower pH that lost up to 4%. This shows that the acidic environment produced more thermal stability PAM-Zr(OH)$_4$ hydrogel.

Figure 42:
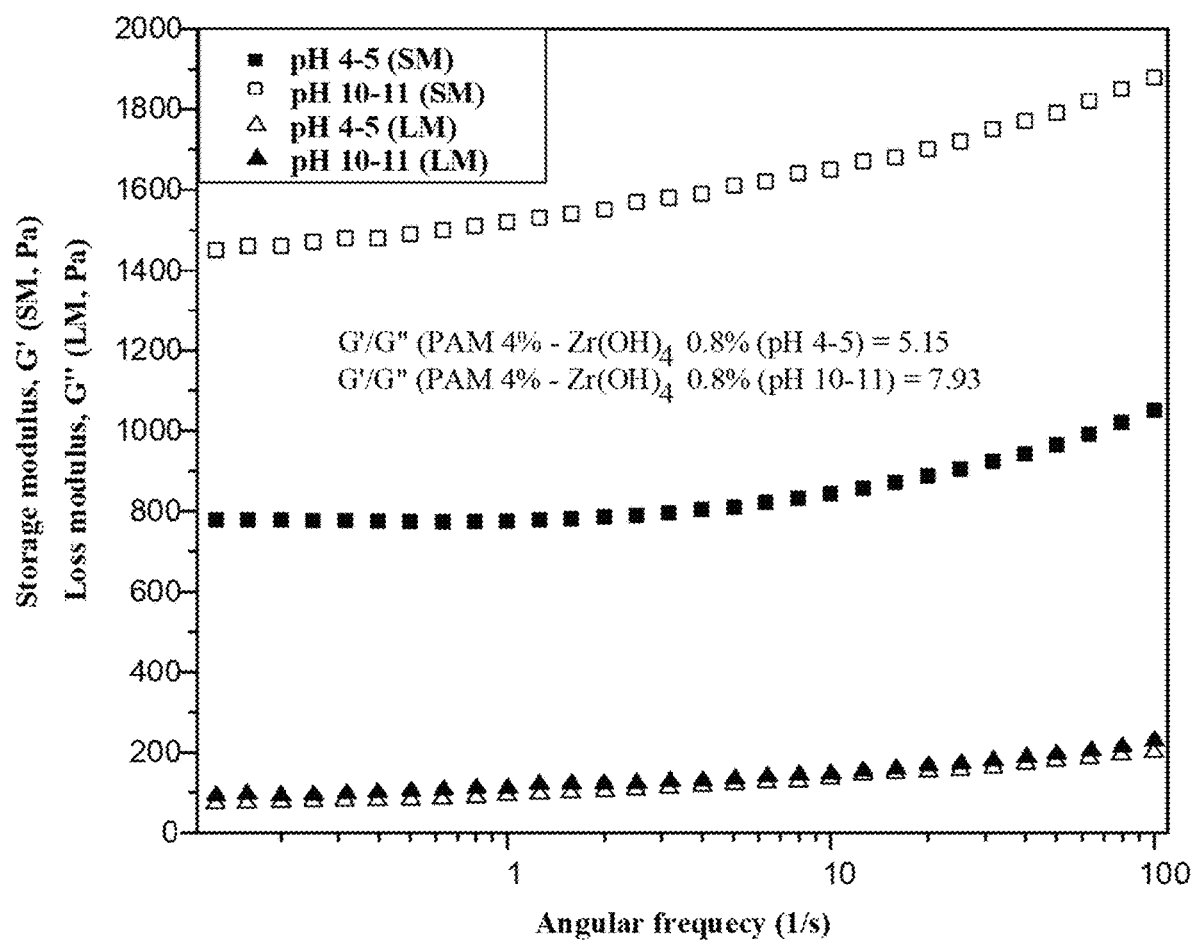
FIG. 42 shows results of a DMA of PAM polymer gels with zirconium hydroxide as filler at various pH levels.

FIG. 42 is a plot showing the results of a DMA of PAM polymer gels with zirconium hydroxide as filler at various pH levels. The elasticity (G') and gel strength (G'/G") of the PAM polymer gels were enhanced in an alkaline environment in comparison to an acidic environment. This difference can indicate that although the PAM polymer gels linked to produce shorter chains, the PAM surface still provided a greater surface area (larger phase volume) to which the filler could attach. Moreover, the reduced decomposition of HMT also encouraged more PAM and filler interaction.

In general, alkaline environments weaken PAM polymer gels without filler, thus decreasing both the degradation temperature and elasticity of the PAM polymer gel. The presence of zirconium hydroxide as filler in the PAM polymer gel improved the thermal and viscoelastic properties of the PAM polymer gel.

8. Effect of Salinity

Salt in downhole formations can lead to flocculation of polymer solutions due to the bridging effect between the cations and the anionic charges on the polymers. The acrylamide segment of PAM can be the culprit of poor thermal stability and low salt tolerance of PAM polymer gels. The hydrolysis of acrylamide at hot temperatures is a well-known mechanism that can lead to syneresis, precipitation, and collapse of the gel due to bridging effects with ions. Therefore, salinity is a factor that can affect the gelation time and gel strength. Increasing salinity of the environment in which the gel is placed can increase the gelation time but can also reduce the resultant gel strength. This is because salt can reduce hydrolysis by shielding the negative charge of the carboxylate groups of PAM. This effect is typically stronger with divalent ions than monovalent ions. In this example, PAM polymer gel was prepared with 4 wt. % PAM, 0.8 wt. % zirconium hydroxide as filler, and 0.3 wt. % crosslinker in the presence of different salts (monovalent potassium ion (K$^+$) and divalent magnesium ion (Mg$^{2+}$)). Additionally, seawater was tested for its effect on gelation, as utilizing seawater instead of deionized water can potentially lower the costs of forming the PAM polymer gel, given that PAM polymer gel properties are not affected significantly.

Figure 43:
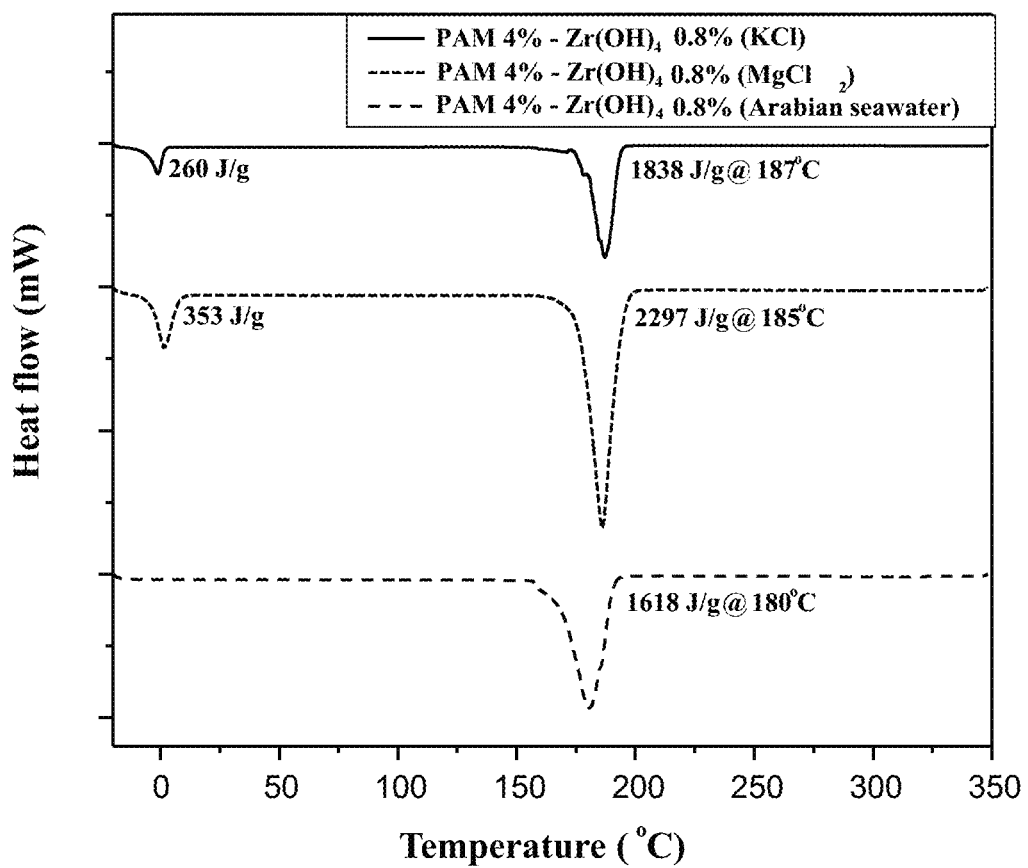
FIG. 43 shows DSC thermograms of PAM polymer gels with zirconium hydroxide including various salts.

FIG. 43 shows the DSC thermograms of PAM polymer gels with zirconium hydroxide including various salts. The PAM polymer gel including divalent salt ions (from dissolved magnesium chloride, MgCl$_2$) exhibited a greater amount of free water absorbed in comparison to the PAM polymer gel including monovalent salt ions (from dissolved potassium chloride, KCl). This difference can be attribute to the fact that monovalent ions typically take up greater volume but less charge density and therefore typically have less interaction with water molecules and less effect on the hydrogen bonding of the surrounding water molecules. On the other hand, divalent ions typically have stronger interactions with water molecules due to the greater charge density and typically form a more hydrated network. This characteristic is also reflected in the greater degradation enthalpy of the PAM polymer gel including divalent ions in comparison to the PAM polymer gel including monovalent ions.

Figure 44:
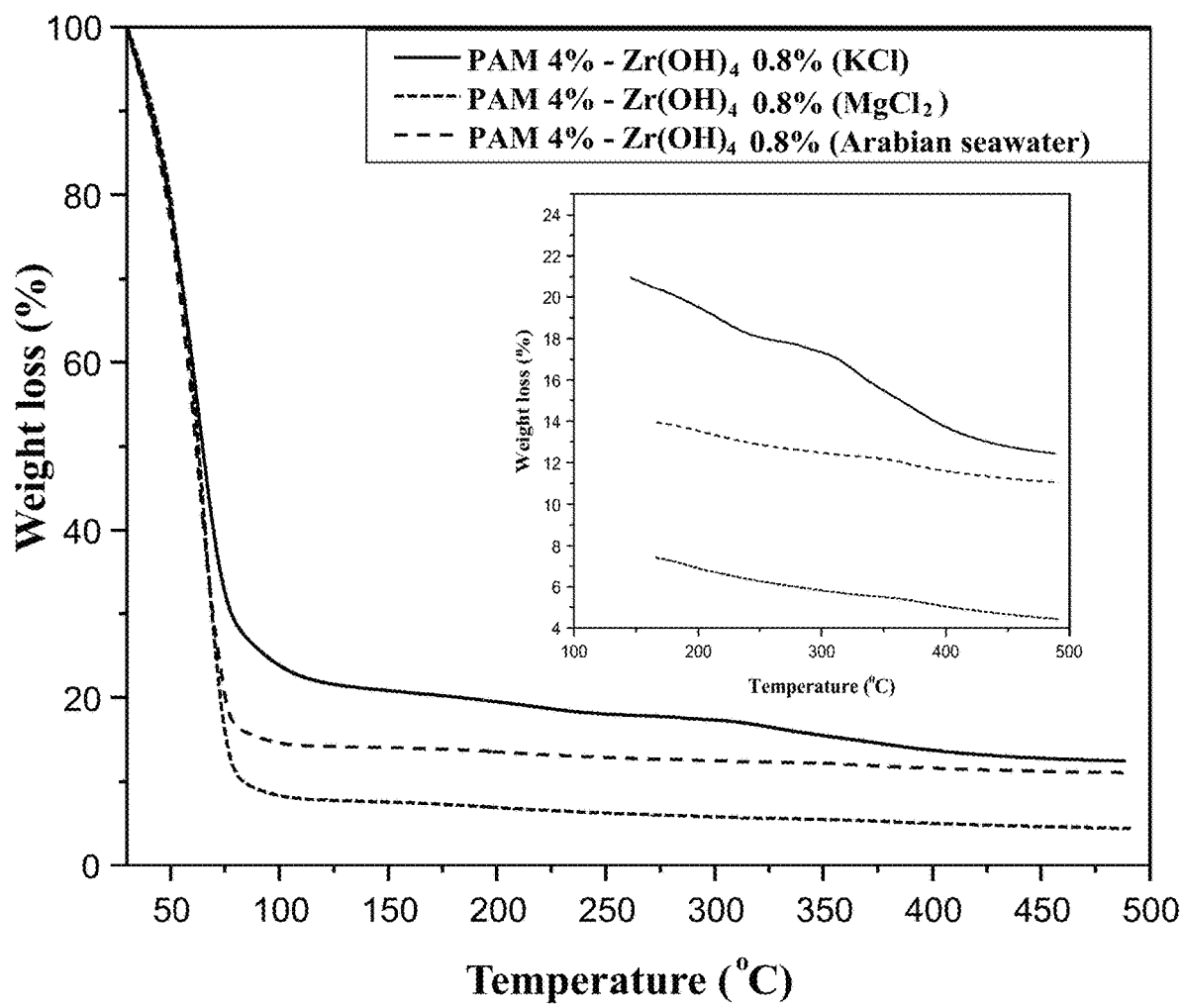
FIG. 44 shows TGA thermograms of PAM polymer gels with zirconium hydroxide including various salts.

FIG. 44 shows the TGA thermograms of PAM polymer gels with zirconium hydroxide including various salts. Maximum weight loss was recorded at about 100° C. due to the evaporation of water. The weight loss of the PAM polymer gel including divalent ions was greater than that of the PAM polymer gel including monovalent ions. The dried PAM polymer gel with zirconium hydroxide and including divalent ions (beyond 100° C.) recorded the least weight loss of −3% in comparison to the PAM polymer gel with zirconium hydroxide and including monovalent ions (−6%) and the PAM polymer gel with zirconium hydroxide and including Arabian seawater (−4%). This difference can be interpreted to mean that the presence of divalent ions produced a more thermally stable PAM polymer gel in comparison to the other ions tested.

Figure 45:
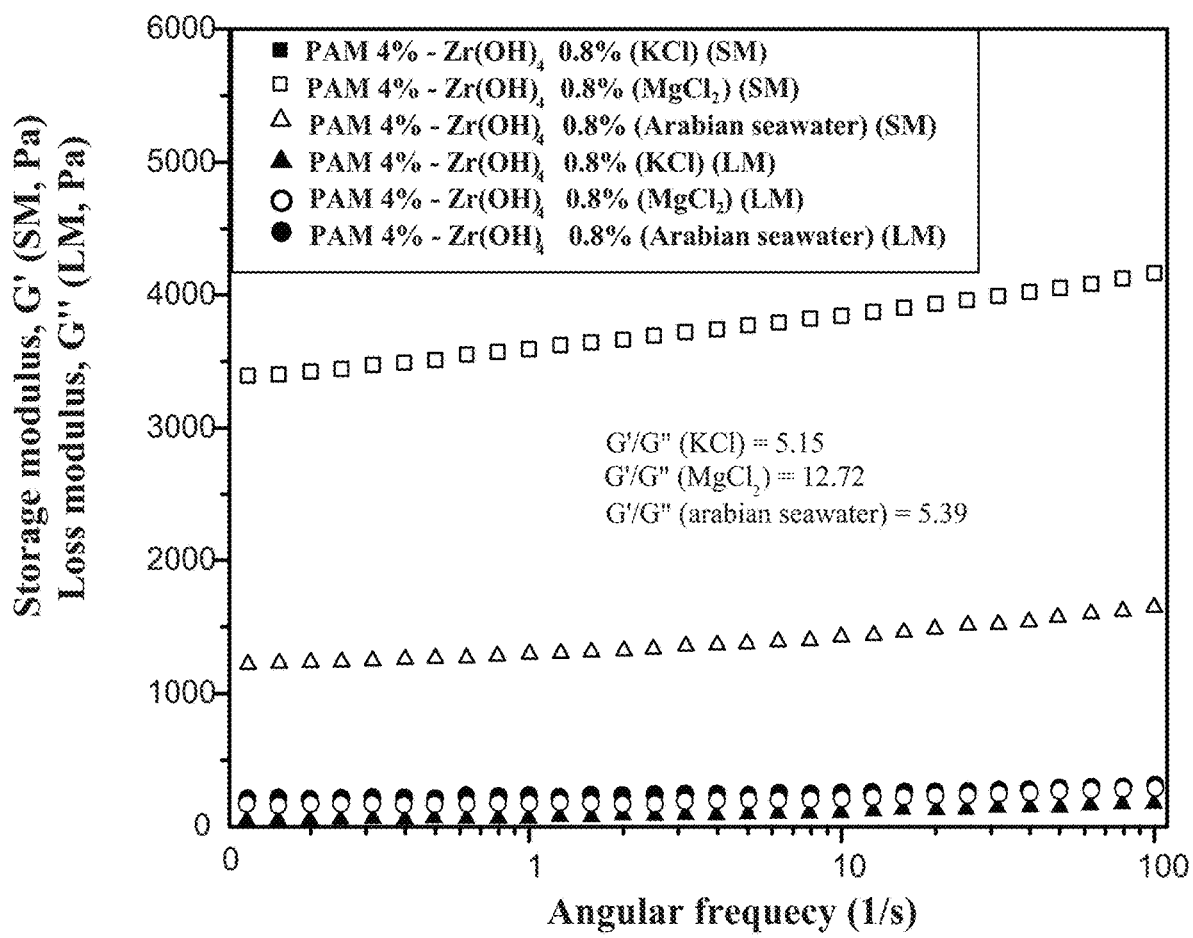
FIG. 45 shows results of a DMA of PAM polymer gels with zirconium hydroxide including various salts.

FIG. 45 is a plot showing the results of a DMA of PAM polymer gels with zirconium hydroxide including various salts. The elasticity (G') and gel strength (G'/G") of the PAM polymer gels improved when prepared with divalent ions. This characteristic can be attributed to the fact that divalent ions typically provide stronger intermolecular repulsion forces that can generate a more crosslinked structure in the polymer gel in comparison to monovalent ions. Given that Arabian seawater contained both divalent and monovalent ions, the difference can be attributed to the tendency of some of the ions sheltering the crosslinking sites. It was found that the PAM polymer gel prepared with Arabian seawater hydrogel was slightly stronger than the PAM polymer gel prepared with monovalent ions (KCl). This difference can mean that despite the influence of the electrostatic cations shielding the interactive sites, there were enough sites for the PAM to crosslink with the filler.

In general, preparation of the PAM polymer gel with monovalent ions was favorable for PAM polymer gels without filler. However, the PAM polymer gels with filler (zirconium hydroxide) appeared to be enhanced when prepared with divalent salts, proven by the enhanced thermal stability and viscoelastic properties of the PAM polymer gels including filler.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single product or packaged into multiple products.

Accordingly, the previously described example implementations do not define or constrain the present disclosure. Other changes, substitutions, and alterations are also possible without departing from the spirit and scope of the present disclosure.

What is claimed is:

1. An aqueous dispersion comprising:
   polyacrylamide;
   a crosslinker comprising at least one of hydroquinone or hexamethylenetetramine; and
   a filler comprising a metal oxide, wherein the metal oxide is selected from the group consisting of zirconium oxide, zirconium hydroxide, and titanium oxide.

2. The aqueous dispersion of claim 1, wherein a weight concentration of the filler is in a range of from about 0.1 weight % to about 1 weight %.

3. The aqueous dispersion of claim 2, wherein:
   a weight concentration of the polyacrylamide is in a range of from about 0.5 weight % to about 6 weight %; and
   a weight concentration of the crosslinker is in a range of from about 0.1 weight % to about 1 weight %.

4. The aqueous dispersion of claim 3, wherein the crosslinker comprises hydroquinone and hexamethylenetetramine, and a weight ratio of hydroquinone to hexamethylenetetramine is in a range of from about 1:2 to about 1:1.

5. An aqueous dispersion comprising:
   polyacrylamide;
   a crosslinker comprising at least one of hydroquinone or hexamethylenetetramine; and
   a filler comprising a two-dimensional (2D) nanosheet, wherein the 2D nanosheet comprises at least one of graphene, graphene oxide, or boron nitride.

6. The aqueous dispersion of claim 5, wherein a weight concentration of the filler is in a range of from about 0.1 weight % to about 0.5 weight %.

7. The aqueous dispersion of claim 6, wherein:
a weight concentration of the polyacrylamide is in a range of from about 0.5 weight % to about 6 weight %; and
a weight concentration of the crosslinker is in a range of from about 0.1 weight % to about 1 weight %.

8. The aqueous dispersion of claim 7, wherein the crosslinker comprises hydroquinone and hexamethylenetetramine, and a weight ratio of hydroquinone to hexamethylenetetramine is in a range of from about 1:2 to about 1:1.

9. An aqueous dispersion comprising:
polyacrylamide;
a crosslinker comprising at least one of hydroquinone or hexamethylenetetramine; and
a filler comprising:
  a metal oxide selected from the group consisting of zirconium oxide, zirconium hydroxide, and titanium oxide; and
  a nanomaterial selected from the group consisting of graphene, graphene oxide, and boron nitride.

10. The aqueous dispersion of claim 9, wherein:
the filler comprises a mixture of the metal oxide and the nanomaterial,
a weight concentration of the metal oxide in the aqueous dispersion is in a range of from about 0.1 weight % to about 1 weight %, and
a weight concentration of the nanomaterial in the aqueous dispersion is in a range of from about 0.01 weight % to about 0.1 weight %.

11. The aqueous dispersion of claim 10, wherein:
a weight concentration of the polyacrylamide is in a range of from about 0.5 weight % to about 6 weight %; and
a weight concentration of the crosslinker is in a range of from about 0.1 weight % to about 1 weight %.

12. The aqueous dispersion of claim 11, wherein the crosslinker comprises hydroquinone and hexamethylenetetramine, and a weight ratio of hydroquinone to hexamethylenetetramine is in a range of from about 1:2 to about 1:1.

13. The aqueous dispersion of claim 12, wherein the filler is a mixture of zirconium hydroxide and graphene oxide.

14. The aqueous dispersion of claim 9, wherein:
the filler comprises a nanocomposite comprising the metal oxide and the nanomaterial,
a weight concentration of the nanocomposite in the aqueous dispersion is in a range of from about 0.1 weight % to about 1 weight %, and
a weight ratio of metal oxide to nanomaterial in the nanocomposite is in a range of from about 99:1 to about 9:1.

15. The aqueous dispersion of claim 14, wherein:
a weight concentration of the polyacrylamide is in a range of from about 0.5 weight % to about 6 weight %; and
a weight concentration of the crosslinker is in a range of from about 0.1 weight % to about 1 weight %.

16. The aqueous dispersion of claim 15, wherein the crosslinker comprises hydroquinone and hexamethylenetetramine, and a weight ratio of hydroquinone to hexamethylenetetramine is in a range of from about 1:2 to about 1:1.

17. The aqueous dispersion of claim 16, wherein the filler is a nanocomposite of zirconium hydroxide and graphene oxide.

18. The aqueous dispersion of claim 16, wherein the filler is a nanocomposite of zirconium oxide and graphene oxide.

* * * * *